(12) United States Patent
Tsukagoshi

(10) Patent No.: US 8,848,036 B2
(45) Date of Patent: Sep. 30, 2014

(54) STEREOSCOPIC IMAGE DATA TRANSMISSION DEVICE, STEREOSCOPIC IMAGE DATA TRANSMISSION METHOD, STEREOSCOPIC IMAGE DATA RECEPTION DEVICE AND STEREOSCOPIC IMAGE DATA RECEPTION METHOD

(75) Inventor: Ikuo Tsukagoshi, Tokyo (JP)

(73) Assignee: Sony Corporation (JP)

( * ) Notice: Subject to any disclaimer, the term of this patent is extended or adjusted under 35 U.S.C. 154(b) by 354 days.

(21) Appl. No.: 12/737,779

(22) PCT Filed: Jun. 22, 2010

(86) PCT No.: PCT/JP2010/060588
§ 371 (c)(1),
(2), (4) Date: Feb. 14, 2011

(87) PCT Pub. No.: WO2011/001860
PCT Pub. Date: Jan. 6, 2011

(65) Prior Publication Data
US 2011/0134213 A1 Jun. 9, 2011

(30) Foreign Application Priority Data

Jun. 29, 2009 (JP) ............... P2009-153686
Feb. 22, 2010 (JP) ............... P2010-036720

(51) Int. Cl.
*H04N 13/00* (2006.01)
*H04N 19/597* (2014.01)
*G09G 5/02* (2006.01)

(52) U.S. Cl.
CPC ......... *H04N 13/0048* (2013.01); *H04N 13/007* (2013.01); *H04N 13/0066* (2013.01); *H04N 2213/005* (2013.01); *H04N 19/00769* (2013.01); *H04N 13/0059* (2013.01)
USPC .......................................... 348/43; 345/629

(58) Field of Classification Search
USPC .......................................................... 348/43
See application file for complete search history.

(56) References Cited

U.S. PATENT DOCUMENTS 8,013,873 B2 * 9/2011 Barenbrug et al. ........... 345/629
2008/0192067 A1 8/2008 Barenbrug et al.
(Continued)

FOREIGN PATENT DOCUMENTS

JP 11-289555 A 10/1999
JP 2004-274125 A 9/2004
(Continued)

OTHER PUBLICATIONS

Supplementary European Search Report from EP Application No. 10794030, dated Dec. 4, 2012.
(Continued)

*Primary Examiner* — Sath V Perungavoor
*Assistant Examiner* — Howard D Brown, Jr.
(74) *Attorney, Agent, or Firm* — Lerner, David, Littenberg, Krumholz & Mentlik, LLP

(57) ABSTRACT

[Object] To provide suitable disparity using a disparity information set adapted to the type of superposition information. [Solution] A disparity information set creating unit 131 creates predetermined sets of disparity information sets. Examples of the disparity information sets include general-purpose disparity information sets, and disparity information sets for particular service application. Each set of the disparity information sets that is created at the disparity information set creating unit 131 and transmitted along with stereoscopic image data is added with identification information indicating the type of superposition information regarding which disparity information included in this disparity information set should be used. The predetermined sets of disparity information sets are transmitted to the reception side, for example, by being inserted in a user data region of a video data stream. With the reception side, suitable disparity may be provided to the same superposition information (closed caption information, subtitle information, graphics information, text information, etc.) to be superimposed on a left eye image and a right eye image using the disparity information set adapted to the type of this superposition information based on the identification information.

20 Claims, 94 Drawing Sheets

10

(56) References Cited

U.S. PATENT DOCUMENTS

| | | | |
|---|---|---|---|
| 2009/0142041 A1* | 6/2009 | Nagasawa et al. | 386/124 |
| 2011/0134213 A1* | 6/2011 | Tsukagoshi | 348/43 |
| 2011/0242296 A1* | 10/2011 | Ishihara et al. | 348/54 |

FOREIGN PATENT DOCUMENTS

| | | |
|---|---|---|
| JP | 2005-006114 A | 1/2005 |
| JP | 2006-325165 A | 11/2006 |
| JP | 2006325173 A | 11/2006 |
| JP | 2008164367 A | 7/2008 |
| JP | 2009010557 A | 1/2009 |
| JP | 2009017198 A | 1/2009 |
| JP | 2009101822 A | 5/2009 |
| JP | 2009-135686 A | 6/2009 |
| JP | 2010510558 T | 4/2010 |
| WO | 2004021285 A1 | 3/2004 |
| WO | 2007116549 A1 | 10/2007 |
| WO | 2008044191 A2 | 4/2008 |
| WO | 2009008808 A1 | 1/2009 |
| WO | 2010064118 A1 | 6/2010 |
| WO | 2010095074 A1 | 8/2010 |

OTHER PUBLICATIONS

Office Action from Japanese Application No. 2009-248357, dated Feb. 26, 2013.
Office Action from China Application No. 201080009821.1, dated Aug. 29, 2013.
Office Action from Japanese Application No. 2009-246179, dated Sep. 10, 2013.
Office Action from China Application No. 201080002832.7, dated Jul. 24, 2013.
Office Action from China Application No. 201080009863.5, dated Jul. 17, 2013.
Office Action from Japanese Application No. 2009-288433, dated Sep. 10, 2013.
Office Action from Japanese Application No. 2010-010536, dated Sep. 10, 2013.
Office Action from Japanese Application No. 2009-248357, dated Jul. 30, 2013.

* cited by examiner

FIG. 3
STEREOSCOPIC IMAGE DATA EXAMPLE
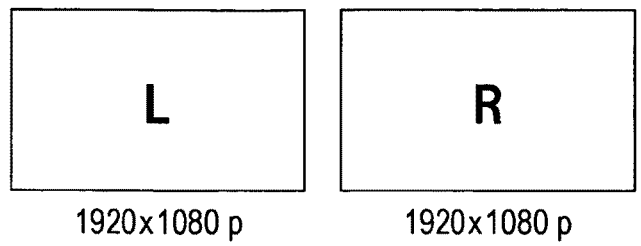
FIG. 4
(a) "Top & Bottom" METHOD
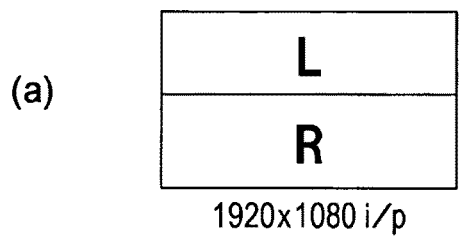
(b) "Side By Side" METHOD
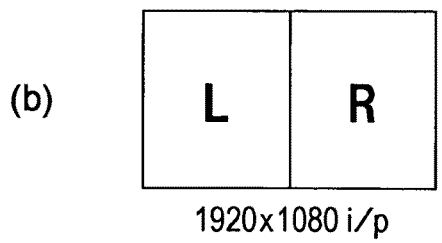
(c) "Frame Sequential" METHOD
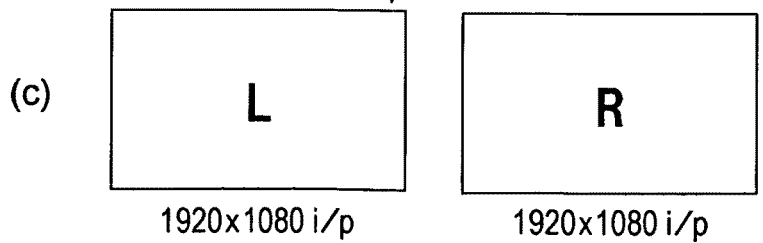

FIG. 7
DISPARITY VECTOR EXAMPLE
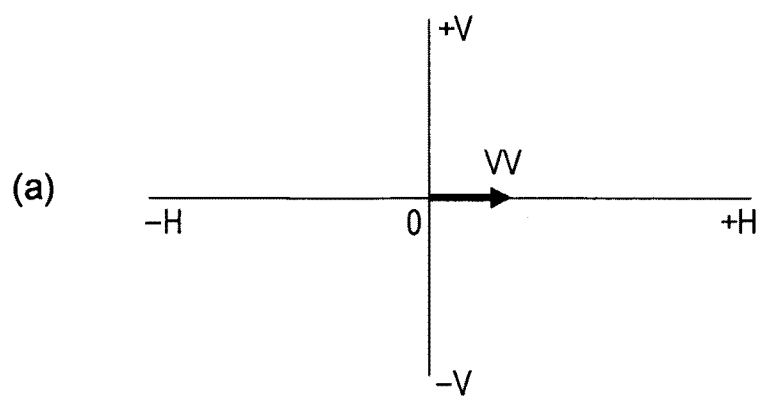
(a)
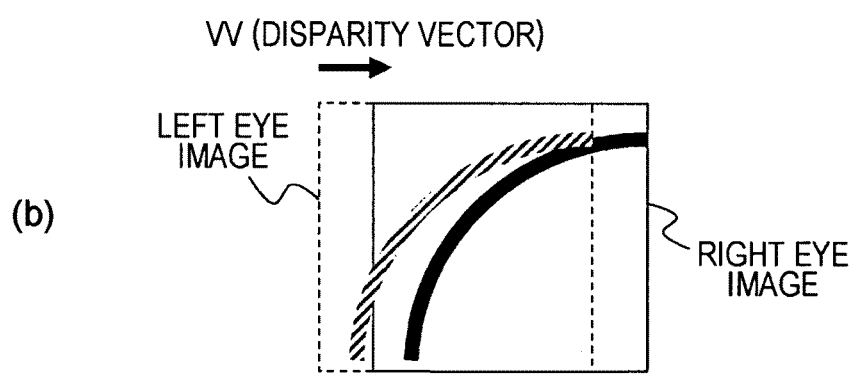
(b)

FIG. 8

DISPARITY VECTOR TRANSMISSION CONTENT

```
Number_of_ViewBlocks N                16 bits
For (i=0; i<N; i++) {
        ID_Block(i)                   16 bits
        Vertical_Position             16 bits
        Horizontal_Position           16 bits
        View_Vector_Vertical          16 bits
        View_Vector_Horizontal        16 bits

DISPARITY DETECTED BLOCK POSITION COORDINATES

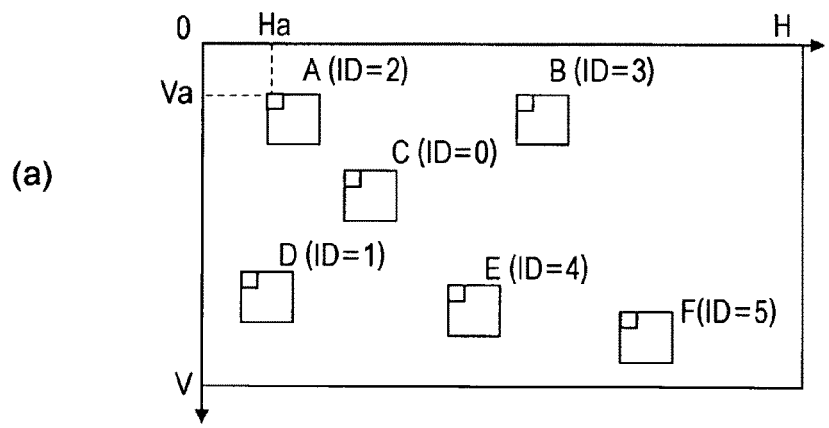

(a)

(b)

```
ID2: Block_A:    (Ha, Va),    DISPARITY VECTOR a
ID3: Block_B:    (Hb, Vb),    DISPARITY VECTOR b
ID0: Block_C:    (Hc, Vc),    DISPARITY VECTOR c
ID1: Block_D:    (Hd, Vd),    DISPARITY VECTOR d
ID4: Block_E:    (He, Ve),    DISPARITY VECTOR e
ID5: Block_F:    (Hf, Vf),    DISPARITY VECTOR f
```

DISPARITY VECTOR (EVERY PIXEL)

PICTURE

DOWNSIZING PROCESSING

FIG. 27

| Disparity_Sequence_id | Description |
|---|---|
| 0 | Indicates disparity which is created from pre-assigned disparity archive for generic use. No need to associate with disparity_linkage_descriptor unless the corresponding disparity set is linked to any service component. |
| 1 THROUGH 255 | Created for specific service with disparity_linkage_descriptor. |

FIG. 32

Component_Linked_Info

| Component_Element ID | Patition_Position_ID |
|---|---|
| Caption Window 0 | P7 |

FIG. 34

Component_Linkage_Info

| Component_Element ID | Partition_Position_ID |
|---|---|
| Caption Window 0 | P6 |
| Caption Window 0 | P7 |
| Caption Window 1 | P7 |
| Caption Window 1 | P8 |

FIG. 37

| Component_Linked_Info ||
|---|---|
| Component_Element ID | Patition_Position_ID |
| Caption Window 0<br>Caption Window 1 | C0<br>C1 |

DVB Subtitles Link Relation

STRUCTURE OF Video Elementary Stream

FIG. 42

STRUCTURE OF USER DATA

MPEG2 video (a)
```
User_data(){
        user_data_start_code         32
        user_identifier              32
        user_structure()
}
```

H.264 AVC video (b)
```
User_data_registered_itu_t_t35 (payloadSize){
        itu_t_t35_country_code       8
        itu_t_t35_provider_code      16
        user_identifier              32
        user_structure()
}
or
user_data_unregistered( payloadSize ) {
        uuid_iso_iec_11578           128
        for( i = 16; i < payloadSize; i++ )
                user_identifier      32
                user_structure()
}
```

VC-1 video (c)
```
User_data(){
        VC1_user_data_start_code     32
        user_identifier              32
        user_structure()
}
```

FIG. 43

```
Disparity_Linkage_descriptor() {
    descriptor_tag                                      8       0xD0
    descriptor_length                                   8       uimsbf
    reserved                                            3       '111'
    number_of_Linked_Streams                            5       uimsbf
    for (i=0; i< number_of_linked_Streams; i++) {
        ElementaryPID_of_disparity[i]                  13       uimsbf
        ElementaryPID_of_Service_Component[i]          13       uimsbf number_of_linked_sequences[i]                   5       uimsbf
        reserved                                        1       '1'
        Service_id[i]                                  32       uimsb
        Data_Type[i]                                    8       bslbf for (k=0; k< number_of_linked_sequences[i]; k++) {
            Disparity_Sequence_id[i,k]                  8       uimsbf
            Service_page_id[i,k]                        8       uimsbf
        }
    }
}
```

FIG. 44

Semantics descriptor_tag - An 8-bit field that identifies the type of descriptor.
For the Disparity_Linkage_descriptor() the value is 0xD0.

descriptor_length - An 8-bit count of the number of bytes following the descriptor_length itself.

number_of_Linked_Streams - An unsigned 5-bit integer in the range 0 to 31 that indicates the number of linked elementary streams that defines the linking of two streams in terms of disparity data.

ElementaryPID_of_disparity - A 13-bit field indicates PID of elementary stream that contains disparity data.

ElementaryPID_of_Service_Component - A 13-bit field indicates PID of elementary stream that contains service component, such as subtitles, or caption, text or graphics.

number_of_linked_sequences - An unsigned 5-bit integer in the range 0 to 15 that indicates the number of linked disparity information in the associated stream.

Disparity_Sequence_id - An 8-bit field specifies the service that utilizes disparity data to its components.

Service_id - A 32 bit field specifies unique word of service identifier.
(Ex) "0x47413934" is assigned for ATSC or DVB defined as user_identifier.

Data_Type - An 8 bit field that identifies the type of data under the specified service.
(Ex) "0x03" is assigned for Closed Caption data.

Service_page_id (8)
Specifies the service like Subtitle page id.

FIG. 45
Type A Insertion
(a)
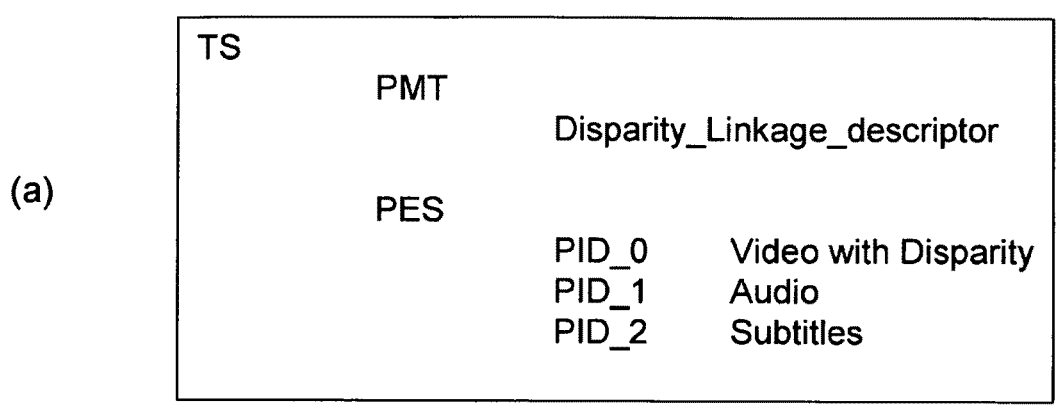
Type B Insertion
(b)
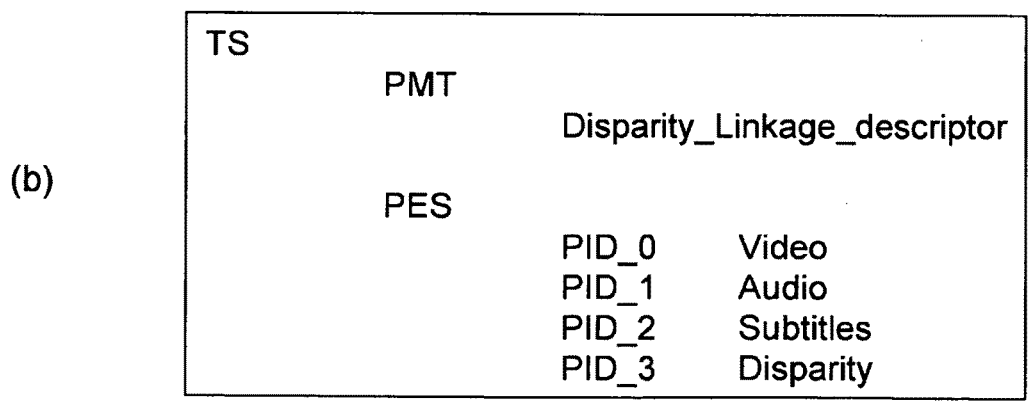

FIG. 46
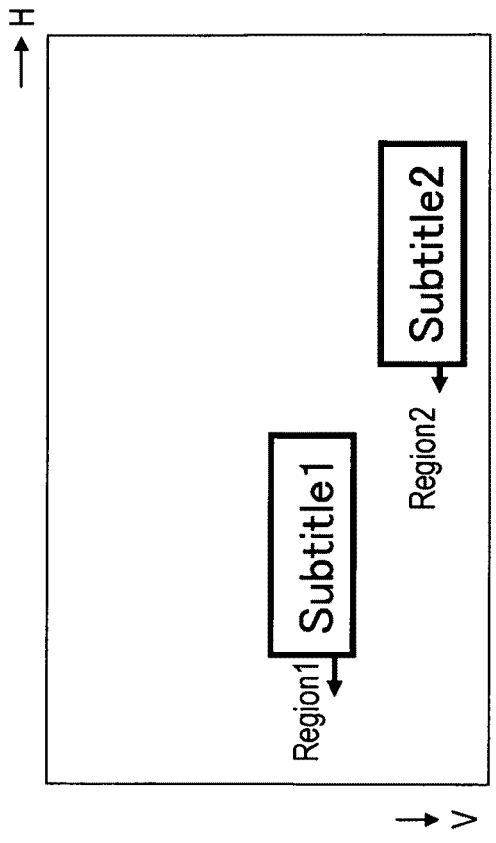
(a)
Disparity_Sequence_id = 1
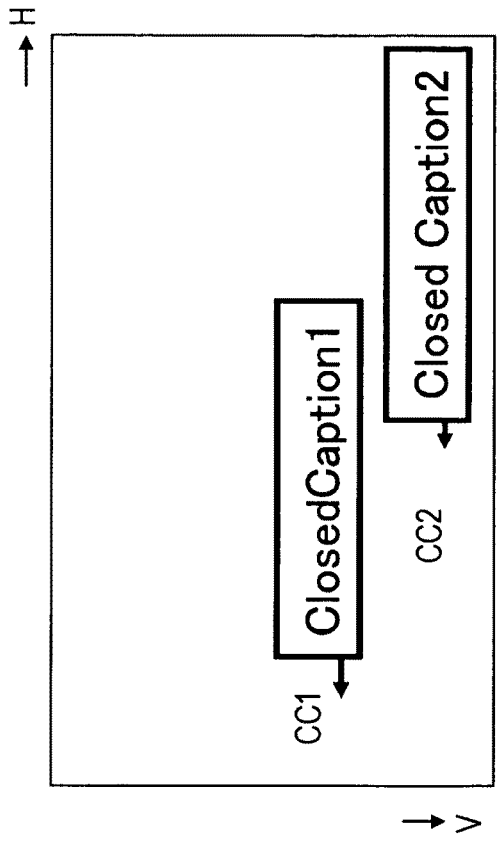
(b)
Disparity_Sequence_id = 2

FIG. 51

Interface to Video stream user_data

```
user_data() {
    user_data_start_code                                          32
    Disparity_Information_identifier                              32
    while( nextbits() != '0000 0000 0000 0000 0000 0000 0000 0001' ) {
        Disparity_Information()
    }
    next_start_code()
}
```

FIG. 52

Syntax of Disparity Information Set (1)

```
Disparity_Information() {
    Disparity_Information_Data
}
```

FIG. 53

```
Disparity_Service_Link_Information()
{
    Disparity_Info_Length              16 bits
    Disparity_Info_Type                 2 bits    "0x0" Disparity Service Link Info (DSL)
    Reserved                            1 bit     '1'
    number_of_Linked_Streams            5         uimsbf
    for (i=0; i< number_of_linked_Streams; i++) {
        ElementaryPID_of_disparity[i]   13        uimsbf
        ElementaryPID_of_Service_Component[i]  13
        number_of_linked_sequences      5         uimsbf
        Reserved                        1         uimsbf
        Service_id[i]                   32        "1"
        Data_Type[i]                    8         uimsb
                                                  bslbf
        for (k=0; k< number_of_linked_sequences; k++) {
            Disparity_Sequence_id[i,k]  8         uimsbf
            Service_page_id[i,k]        8         uimsbf
        }
    }
}
```

FIG. 54        Disparity Header Information (DHI)

```
Disparity_Information()
{
    Disparity_Info_Length              16 bits
    Disparity_Info_Type                2 bits    "0x1" Disparity Header Information (DHI)
    Reserved                           3 bits
    Views_offset                       1 bit
    Disparity_precision                2 bits Disparity_Sequence_id              8 bits
    Service_Linked_flag                1 bit     "1" if there's disparity linked service in DSL
                                                 "0" if there's no service linking the disparity.

Target_Resolution_Type             2 bits
    Block_Size                         2 bits Link_source                        1 bit     "1" Link source is partitioned disparity.
                                                 "0" Link source is disparity on
                                                     service component element.

Reserved                           2 bits
    Partition                          3 bits
    Number_of_Component_Elements P     13 bits   // P is the number of either partitions or blocks,
                                                 // or component elements in the linked service.

if( Service_Linked_flag == "1" ){
        Component_Linkage_Info()
    }
}
```

FIG. 55

Disparity Header Information (DHI) (continued)

```
Component_Linkage_Info()
{
    For (i=0; i<P i++) {
        Component_Element[i]                                          8 bits
        Element_Linkage_Length                                        8 bits
        Reserved                                                      4 bits
        number_of_mutiple_link[i]                                     4 bits
        for (m=0; m < number_of_mutiple_link[i]; m++ ){
            reserved                                                  3 bits
            Partition_Position_id[i][m]                              13 bits
        }
    }
}
```

FIG. 56

Disparity Data Set ( DDS )

```
Disparity_Information()
{
    Disparity_Info_Length                              16 bits
    Disparity_Info_Type                                 2 bits   "0x2" Disparity Data Set (DDS)
    Reserved                                            6 bits
    Disparity_Sequence_id                               8 bits
    Number_of_Component_Elements P                     13 bits
                                                                // P is the number of either partitions or blocks,
                                                                // or component elements in the linked service.
    Reserved                                            3 bits   "111"
    Disparity_sets_in_period                            8 bits
    For (t=0; t < Disparity_sets_in_period; t++){
        Offset_Frame_In_disparity_set[t]                8 bits
        For (i=0; i<P; i++) {
            Disparity_Vector_Horizontal[t,i]            8 bits
        }
    }
}
```

FIG. 57

Semantics

Disparity_Info_Type (4)
  Specifies the type of disparity information
  "0x0"     Disparity Service Link Information (DSL)
  "0x1"     Disparity Header Information (DHI)
  "0x2"     Disparity Data Set (DDS)
  Others    Reserved

Service_Linked_flag (1)
  "1"   if there's disparity linked service in DSL
  "0"   if there's no service linking the disparity.

Disparity_Sequence_id (8)
  Identifier of the sequence of disparity

Target_Resolution_Type (2)
  Specifies the resolution of the coded disparity data set to target video.
  "0x0"     1920x1080
  "0x1"     1440x1080
  "0x2"     1280x 720
  "0x3"     Reserved

Link_source (1)
  "1"   Link source is partitioned disparity.
  "0"   Link source is disparity on service component element.

FIG. 58

Semantics (continued)

Partition(3)
Specifies the picture partition pattern
- "0x0"  One disparity is sent for the entire picture
- "0x1"  Picture Divided into four partitions and disparity is sent each partition beginning from top-left to bottom-right.
- "0x2"  Picture Divided into nine partitions and disparity is sent each partition beginning from top-left to bottom-right.
- "0x3"  Picture Divided into sixteen partitions and disparity is sent each partition beginning from top-left to bottom-right.
- "0x7"  Picture Divided into blocks and disparity is sent each block beginning from top-left to bottom-right.

Other Value is reserved.

Block_Size (2)
Specifies the block size for disparity data in a picture
- "0x0"  16 x 16
- "0x1"  32 x 32
- "0x2"  64 x 64
- "0x3"  128x128

Number_of_Component_Elements P (13)
Specifies the number of component elements for the service or partition number, block number.

Component_Element (8)
Service Component Element is mapped to WindowID in Closed Caption, or region_id in DVB subtitling.

number_of_mutiple_link (4)
Specifies the number of linked disparity data to the corresponding component element.

FIG. 59

Semantics (continued)

Partition_Position_id (13)
Specifies the linking of n-th partition disparity defined by Partition and Block_Size.
Disparity_sets_in_period (8)
Specifies the number of offset disparity sets in the target display period.
"1" being only 1 disparity is allocated in the corresponding display period.

Offset_Frame_In_disparity_set (8)
Specifies the frame count offset from the first picture display timing.
(Offset_frame_in_disparity_set = 0 means thet disparity set for the 1st picture)
(Offset_frame_in_disparity_set = 1 means the disparity set for the 2nd picture)
(Offset_frame_in_disparity_set = 0xE means the disparity set for the 15th picture)
Disparity_Vector_Horizontal(8)
Specifies the pixel precision disparity between the stereo view rendering.
8 bit Signed Integer Value.
Service_page_id (8)
Specifies the service like Subtitle page id or closed caption service.

FIG. 60

Semantics (continued)

Views_offset (1)

"1" denotes that disparity is applied for both views with different directions directed by sign-bit.

"0" denotes that disparity is only applied for the second view.

Disparity_precision (2)

"0" denotes disparity vector value is on ½ pixel on Target_Resolution_Type

"1" denotes disparity vector value is on a pixel on Target_Resolution_Type.

"2" denotes disparity vector value is on a two-pixel-pair on Target_Resolution_Type.

"3" denotes disparity vector value is on a three-pixel-pair on Target_Resolution_Type.

FIG. 61

(a) "0x0" — One disparity is sent for the entire picture (b) "0x1" — Picture Divided into four partitions and disparity is sent each partition beginning from top-left to bottom-right.

(c) "0x2" — Picture Divided into nine partitions and disparity is sent each partition beginning from top-left to bottom-right.

(d) "0x3" — Picture Divided into sixteen partitions and disparity is sent each partition beginning from top-left to bottom-right.

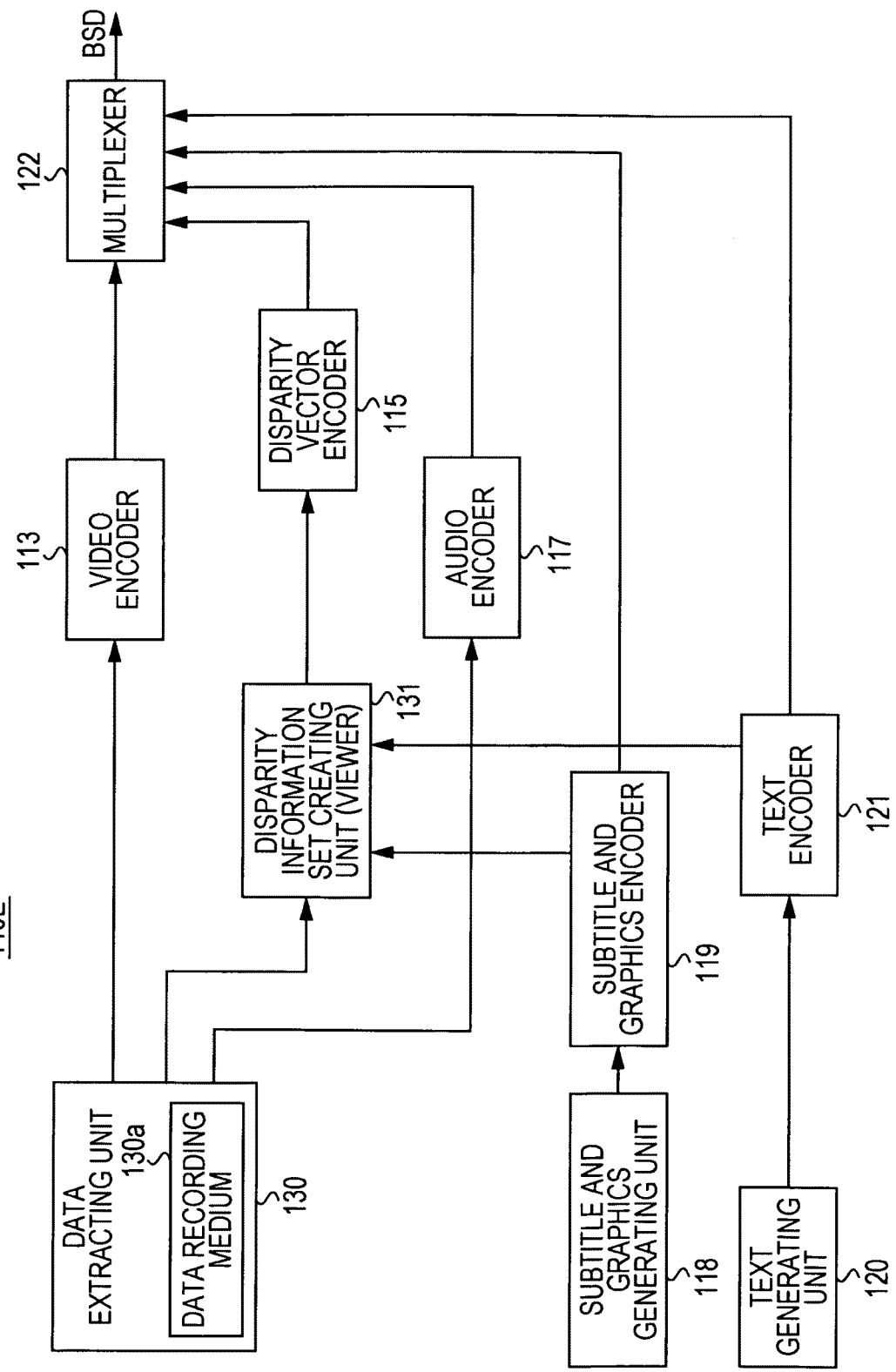

FIG. 90

HDMI PIN ALIGNMENT (CASE OF Type-A)

| PIN | Signal Assignment | PIN | Signal Assignment |
|---|---|---|---|
| 1 | TMDS Data2+ | 2 | TMDS Data2 Shield |
| 3 | TMDS Data2− | 4 | TMDS Data1+ |
| 5 | TMDS Data1 Shield | 6 | TMDS Data1− |
| 7 | TMDS Data0+ | 8 | TMDS Data0 Shield |
| 9 | TMDS Data0− | 10 | TMDS Clock+ |
| 11 | TMDS Clock Shield | 12 | TMDS Clock− |
| 13 | CEC | 14 | Utility/HEAC+ |
| 15 | SCL | 16 | SDA |
| 17 | DDC/CEC Ground/HEAC Shield | 18 | +5 V Power |
| 19 | Hot Plug Detect/HEAC− | | |

EDID DATA STRUCTURE OF HDMI

FIG. 92

Vendor Specific Data Block

| Byte# | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1 | 24-bit IEEE Registration Identifier (0x000C03) (least significant byte first) | | | | | | | |
| 2 | | | | | | | | |
| 3 | | | | | | | | |
| 4 | A | | | | | B | | |
| 5 | C | | | | | D | | |
| 6 | Supports_AI | DC_48 bit | DC_36 bit | DC_30 bit | DC_Y444 | Rsvd (0) | Rsvd (0) | DVI_Dual |
| 7 | Max_TMDS_Clock | | | | | | | |
| 8 | Latency_Fields_Present | I_Latency_Fields_Present | HDMI_Video_present | Rsvd (0) | Rsvd (0) | Rsvd (0) | Rsvd (0) | Rsvd (0) |
| (9) | Video_Latency | | | | | | | |
| (10) | Audio_Latency | | | | | | | |
| (11) | Interlaced_Video_Latency | | | | | | | |
| (12) | Iterlaced_Audio_Latency | | | | | | | |
| (13) | 3D_present | Rsvd (0) | Rsvd (0) | Rsvd (0) | Rsvd (0) | Rsvd (0) | Rsvd (0) | Rsvd (0) |
| (14) | HDMI_VIC_LEN | | | HDMI_3D_LEN | | | | |
| ...N | ... | | | | | | | |

3D Video Format
(Frame packing)

3D Video Format
(Line alternative)

3D Video Format (Side-by-Side(Full))

… # STEREOSCOPIC IMAGE DATA TRANSMISSION DEVICE, STEREOSCOPIC IMAGE DATA TRANSMISSION METHOD, STEREOSCOPIC IMAGE DATA RECEPTION DEVICE AND STEREOSCOPIC IMAGE DATA RECEPTION METHOD

CROSS-REFERENCES TO RELATED APPLICATIONS

The present application is a national phase entry under 35 U.S.C. §371 of International Application No. PCT/JP2010/060588 filed Jun. 22, 2010, published on Jan. 6, 2011 as WO 2011/001860 A1, which claims priority from Japanese Patent Application No. JP 2009-153686 filed in the Japanese Patent Office on Jun. 29, 2009 and Japanese Patent Application No. JP 2010-036720 filed in the Japanese Patent Office on Feb. 22, 2010.

TECHNICAL FIELD

The present invention relates to a content recording system, a content recording method, a content recording device, and a content receiving device.

BACKGROUND ART

For example, with PTL 1, a transmission method employing television broadcast radio waves of stereoscopic image data has been proposed. In this case, stereoscopic image data including image data for the left eye and image data for the right eye are transmitted, and stereoscopic image display taking advantage of binocular disparity is performed at a television receiver.

FIG. 98 illustrates relationship between the display positions of left and right images of an object on a screen, and the playback position of the stereoscopic image thereof. For example, with regard to an object A displayed with a left image La being shifted to the right side and a right image Ra being shifted to the left side on the screen as illustrated in the drawing, the left and right visual lines intersect in front of the screen surface, so the playback position of the stereoscopic image thereof is in front of the screen surface. DPa represents a disparity vector in the horizontal direction relating to the object A.

Also, for example, as illustrated on the screen, with regard to an object B where a left image Lb and a right image Rb are displayed on the same position, the left and right visual lines intersect on the screen surface, so the playback position of the stereoscopic image thereof is on the screen surface. Further, for example, with regard to an object C with a left image Lc being shifted to the left side and a right image Ra being shifted to the right side on the screen as illustrated in the drawing, the left and right visual lines intersect in the back from the screen surface, so the playback position of the stereoscopic image is in the back from the screen surface. DPc represents a disparity vector in the horizontal direction relating to the object C.

CITATION LIST

Patent Literature

PTL 1: Japanese Unexamined Patent Application Publication No. 2005-6114

SUMMARY OF INVENTION

Technical Problem

As described above, with stereoscopic image display, a viewer usually recognizes the perspective of a stereoscopic image by taking advantage of binocular disparity. There is expectation that superposition information to be superimposed on an image, for example, such as closed caption information, subtitle information, graphics information, text information, and so forth, will also be subjected to rendering in conjunction with stereoscopic image display as not only two-dimensional spatial sense but also three-dimensional depth perception.

For example, in the event that captions that are closed caption information or subtitle information are subjected to superposition display (overlay display), unless the captions are displayed in front of the nearest object within an image as used in the field of perspective, the viewer may sense conflict of perspective. Also, in the even that another graphics information or text information is displayed on an image in a superimposed manner as well, it has also been expected to subject this to disparity adjustment according to the perspective of each object within the image, and to maintain the consistency of perspective.

The object of the present invention is to realize maintenance of consistency of perspective between objects within an image regarding display of superposition information such as closed caption information, subtitle information, graphics information, text information, and so forth.

Solution to Problem

A concept of the present invention is a stereoscopic image data transmission device including: a disparity information creating unit configured to create predetermined sets of disparity information sets; and a data transmission unit configured to transmit the predetermined sets of disparity information sets created at the disparity information creating unit along with stereoscopic image data including left eye image data and right eye image data; with each set of the disparity information sets including disparity information belonging to a predetermined number of screen regions for providing disparity to superposition information to be superimposed on an image made up of the left eye image data and the right eye image data; and with each set of the disparity information sets being added with identification information indicating the type of the superposition information regarding which disparity information included in this disparity information set should be used.

With the present invention, predetermined sets of disparity information sets are created by the disparity information creating unit. Each set of the disparity information sets includes disparity information belonging to a predetermined number of screen regions for providing disparity to superposition information to be superimposed on an image made up of left eye image data and right eye image data. The predetermined sets of disparity information sets created at the disparity information creating unit is transmitted by the data transmission unit along with telescopic image data including left eye image data and right eye image data. In this case, for example, each set of the disparity information sets created at the disparity information set creating unit is transmitted by being included in a user data region within a header portion of the data stream of the telescopic image data.

Each set of the disparity information sets is added with identification information indicating the type of superposition information regarding which disparity information included in this disparity information set should be used. According to this identification information, determination is made whether or not the disparity information set is a general-purpose disparity information set or disparity information set for a particular service application. Examples of for a particular service application includes for closed captions, and for subtitles.

In this way, with the present invention, predetermined sets of disparity information sets, to which identification information indicating the type of superposition information, regarding which the corresponding disparity information should be used is added along with telescopic image data including left eye image data and right eye image data for displaying a stereoscopic image, are transmitted. Therefore, with the reception side, suitable disparity can be added to the same superposition information (closed caption information, subtitle information, graphics information, text information, etc.) to be superimposed on a left image and a right image using a disparity information set suitable for the type of this superposition information. Accordingly, with display of superposition information, the consistency of perspective between objects within an image can be kept in the optimal state.

With the present invention, for example, information indicating a screen region to which a predetermined number of sets of disparity information belong may be applied to a disparity information set. Examples of the information indicating a screen region include information indicating the number of screen partitions. Examples of the number of partitions include zero partition, four partitions, and nine partitions. Also, the information indicating a screen region is, for example, information indicating the size (block size) of a region, for example, such as 16×16, 32×32, 64×64, or the like. In this way, according to the information indicating a screen region to which a predetermined number of sets of disparity information belong being added, disparity information with necessary space density can be included in a disparity information set, and with the reception side, the space density of disparity information included in the disparity information set, and a screen region to which each piece of the disparity information belongs can be recognized, and the disparity information of a necessary screen region can readily be extracted and used.

Also, with the present invention, for example, table information indicating correspondence relationship between a region regarding which the type of superposition information indicated by identification information should be displayed, and disparity information to be used for providing disparity to superposition information to be displayed in this region, may be added to a disparity information set. According to such table information being applied, with the reception side, as to superposition information to be displayed in a predetermined region, suitable disparity with disparity information corresponding to the region thereof can be added.

Note that, with the present invention, for example, an arrangement may be made wherein each set of the disparity information sets to be output at the disparity information output unit is a predetermined unit-based disparity information of image data, and the data transmission unit sections the image data for each certain period of time, transmits the predetermined unit-based disparity information set corresponding to the image data for each certain period of time prior to transmission of the image data for each certain period of time, and with the predetermined unit-based disparity information set corresponding to the image data for each certain period of time, time information indicating timing for this disparity information being used is added.

In this case, with the reception side, during a superposition period of time of superposition information, disparity according to the corresponding disparity information set can be added to superposition information for each of predetermined unit of image data. That is to say, disparity to be added to superposition information can dynamically be changed in conjunction with change in image content. Also, with the predetermined unit-based disparity information set corresponding to the image data for each certain period of time, time information indicating timing for this disparity information set being used is added, so with the reception side, a predetermined unit-based disparity information set can be used at correct timing.

Also, a concept of the present invention is a stereoscopic image data reception device including: a data reception unit configured to receive predetermined sets of disparity information sets, which includes stereoscopic image data including left eye information data and right eye information data, and disparity information belonging to a predetermined number of screen regions for providing disparity to superposition information to be superimposed on an image made up of the left eye image data and the right eye image data, and also to which identification information indicating the type of the superposition information that uses the disparity information is added; and an image data processing unit configured to provide disparity to superposition information to be superimposed on an image made up of the left eye image data and the right eye image data included in the stereoscopic image data received at the data reception unit using disparity information included in a disparity information set corresponding to the type of this superposition information out of the predetermined sets of disparity information sets received at the data reception unit based on the identification information to obtain the data of a left eye image on which the superposition information is superimposed, and the data of a right eye image on which the superposition information is superimposed.

With the present invention, according to the data reception unit, predetermined sets of disparity information sets are received along with stereoscopic image data including left eye image data and right eye image data. Each set of the disparity information sets includes disparity information belonging to a predetermined number of screen regions for providing disparity to superposition information to be superimposed on an image made up of left eye image data and the right eye image data.

Also, with each set of the disparity information sets, identification information indicating the type of superposition information regarding which disparity information included in this disparity information set should be used is added. According to this identification information, determination is made whether or not the disparity information set is a general-purpose disparity information set or disparity information set for a particular service application. Examples of for a particular service application includes for closed captions, and for subtitles.

According to the image data processing unit, disparity is added to the same superposition information to be superimposed on a left eye image and a right eye image using the left eye image data, the right eye image data, and the disparity information sets, and the data of the left eye image on which the superposition information is superimposed, and the data of the right eye image on which the superposition information is superimposed are obtained. In this case, disparity is added using disparity information included in the disparity information set corresponding to the type of superposition information out of the predetermined sets of disparity information sets based on identification information.

Therefore, suitable disparity can be added to superposition information (closed caption information, subtitle information, graphics information, text information, etc.) to be superimposed on a left image and a right image using a disparity information set suitable for the type of this superposition information. Accordingly, with display of superposition information, the consistency of perspective between objects within an image can be kept in the optimal state.

With the present invention, for example, information indicating a screen region to which a predetermined number of sets of disparity information belong is added. Examples of the information indicating a screen region include information indicating the number of screen partitions. Examples of the number of partitions include zero partition, four partitions, and nine partitions. Also, the information indicating a screen region is, for example, information indicating the size (block size) of a region, for example, such as 16×16, 32×32, 64×64, or the like. In this way, according to the information indicating a screen region to which a predetermined number of sets of disparity information belong being added, the space density of disparity information included in the disparity information set, and a screen region to which each disparity information belongs can be recognized, and the disparity information of a necessary screen region can readily be extracted and used.

Also, with the present invention, for example, table information indicating correspondence relationship between a region regarding which the type of superposition information indicated by identification information should be displayed, and disparity information to be used for providing disparity to superposition information to be displayed in this region may be added to a disparity information set. According to such table information being applied, as to superposition information to be displayed in a predetermined region, suitable disparity with disparity information corresponding to the region thereof can be added.

Also, with the present invention, for example, an arrangement is made wherein the disparity information sets received at the data reception unit are predetermined unit-based disparity information sets of image data, the data reception unit receives the predetermined unit-based disparity information set corresponding to the image data for each certain period of time prior to transmission of the image data for each certain period of time, and with the predetermined unit-based disparity information set corresponding to the image data for each certain period of time, time information indicating timing for this disparity information being used is added, and the data processing unit adds, during a superposition period of time of superposition information, disparity according to the corresponding disparity information set to superposition information for each of predetermined unit of image data.

In this case, during a superposition period of time of superposition information, disparity according to the corresponding disparity information set can be applied to superposition information for each of predetermined unit of image data. That is to say, disparity to be added to superposition information can dynamically be changed in conjunction with change in image content. Also, with the predetermined unit-based disparity information set corresponding to the image data for each certain period of time, time information indicating timing for this disparity information set being used is added, so a predetermined unit-based disparity information set can be used at correct timing.

Advantageous Effects of Invention

According to the present invention, suitable disparity can be added to superposition information (closed caption information, subtitle information, graphics information, text information, etc.) to be superimposed on a left image and a right image using a disparity information set suitable for this superposition information, and with display of the superposition information, the consistency of perspective between objects within an image can be kept in the optimal state.

BRIEF DESCRIPTION OF DRAWINGS

FIG. 3 is a diagram illustrating image data in a pixel format of 1920×1080 p.

FIG. 4 is a diagram for describing a "Top & Bottom" method, a "Side By Side" method, and a "Frame Sequential" method that are stereoscopic image data (3D image data) transmission methods.

FIG. 7 is a diagram illustrating an example of a disparity vector VV in a predetermined position within an image, to be detected at a disparity vector detecting unit.

FIG. 8 is a diagram illustrating the transmission content of a disparity vector.

FIG. 9 is a diagram illustrating a disparity detection block example, and the transmission content of a disparity vector in this case.

FIG. 27 is a diagram for describing disparity sequence ID (Disparity_Sequence_id).

FIG. 32 is a diagram illustrating an example of association information (Component_Linked_Info) between a component element ID and a disparity vector.

FIG. 34 is a diagram illustrating an example of association information (Component_Linked_Info) between a component element ID and a disparity vector.

FIG. 37 is a diagram illustrating an example of association information (Component_Linked_Info) between a component element ID and a disparity vector.

FIG. 42 is a diagram illustrating a structure example of user data according to each encoding method of MPEG2, H.264 AVC, and VC-1.

FIG. 43 is a diagram illustrating a structure example of a disparity linkage descriptor (Disparity_Linkage_Descriptor) that associates between a disparity sequence ID (Disparity_Sequence_id) and a service.

FIG. 44 is a diagram illustrating the content of each piece of information of the disparity linkage descriptor (Disparity_Linkage_Descriptor).

FIG. 45 is a diagram illustrating an example of PID in the event that a disparity information set is transmitted to the reception side by being inserted into a user data region of a image data stream, and in the event that the elementary stream (PES) of a disparity vector including a disparity information set is transmitted to the reception side by being multiplexed with another stream.

FIG. 46 is a diagram illustrating an example wherein a disparity information set to which "Disparity_Sequence_id=1" is added is associated with (linked to) a subtitle, and an example wherein a disparity information set to which "Disparity_Sequence_id=2" is added is associated with (linked to) a closed caption.

FIG. 51 is a diagram illustrating an example of the detailed structure of user data including disparity information (Disparity_Information).

FIG. 52 is a diagram illustrating the structure of disparity information (Disparity_Information).

FIG. 53 is a diagram illustrating the structure of DSL (Disparity_Information_Link_Information) included in disparity information data (Disparity_Information_Data).

FIG. 54 is a diagram illustrating the structure of DHI (Disparity_Header_Information) included in disparity information data (Disparity_Information_Data).

FIG. 55 is a diagram illustrating the structure of the DHI (Disparity_Header_Information) included in the disparity information data (Disparity_Information_Data).

FIG. 56 is a diagram illustrating the structure of a DDS (Disparity Data Set) included in disparity information data (Disparity_Information_Data).

FIG. 57 is a diagram illustrating the content of each piece of information in DSL, DHI, and DDS.

FIG. 58 is a diagram illustrating the content of each piece of the information in the DSL, DHI, and DDS.

FIG. 59 is a diagram illustrating the content of each piece of the information in the DSL, DHI, and DDS.

FIG. 60 is a diagram illustrating the content of each piece of the information in the DSL, DHI, and DDS.

FIG. 61 is a diagram for describing the information of "Partition" included in the DHI.

FIG. 62 is a block diagram illustrating another configuration example of the transmission data generating unit in the broadcasting station.

FIG. 90 is a diagram illustrating the pin alignment of an HDMI terminal to which the HDMI cables of a source device and a sink device are connected.

FIG. 92 is a diagram illustrating a data structure example of a Vender Specific region (HDMI Vendor Specific Data Block).

DESCRIPTION OF EMBODIMENTS

Figure 1:
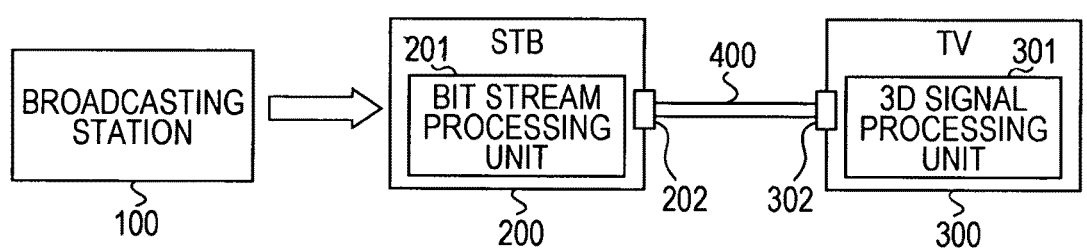
FIG. 1 is a block diagram illustrating a configuration example of a stereoscopic image display system serving as an embodiment of the present invention.

Hereafter, a mode for implementing the present invention (hereafter, referred to as "embodiment") will be described. Note that description will be made in the following sequence.
1. Embodiment
2. Modification 1. Embodiment Configuration Example of Stereoscopic Image Display System FIG. 1 illustrates a configuration example of a stereoscopic image display system 10 serving as an embodiment. This stereoscopic image display system 10 includes a broadcasting station 100, a set top box (STB: Set Top Box) 200, and a television receiver 300.

The set top box 200 and the television receiver 300 are connected via an HDMI (High Definition Multimedia Interface) cable 400. With the set top box 200, an HDMI terminal 202 is provided. With the television receiver 300, an HDMI terminal 302 is provided. One end of the HDMI cable 400 is connected to the HDMI terminal 202 of the set top box 200, and the other end of this HDMI cable 400 is connected to the HDMI terminal 302 of the television receiver 300.

[Description of Broadcasting Station]

The broadcasting station transmits bit stream data by carrying this on broadcast waves. This bit stream data includes stereoscopic image data including left eye image data and right eye image data, audio data, superposition information data, further disparity information (disparity vector), and so forth. Here, the superposition information data includes closed caption data, subtitle data, graphics data, text data, and so forth.

[Configuration Example of Transmission Data Generating Unit]

Figure 2:
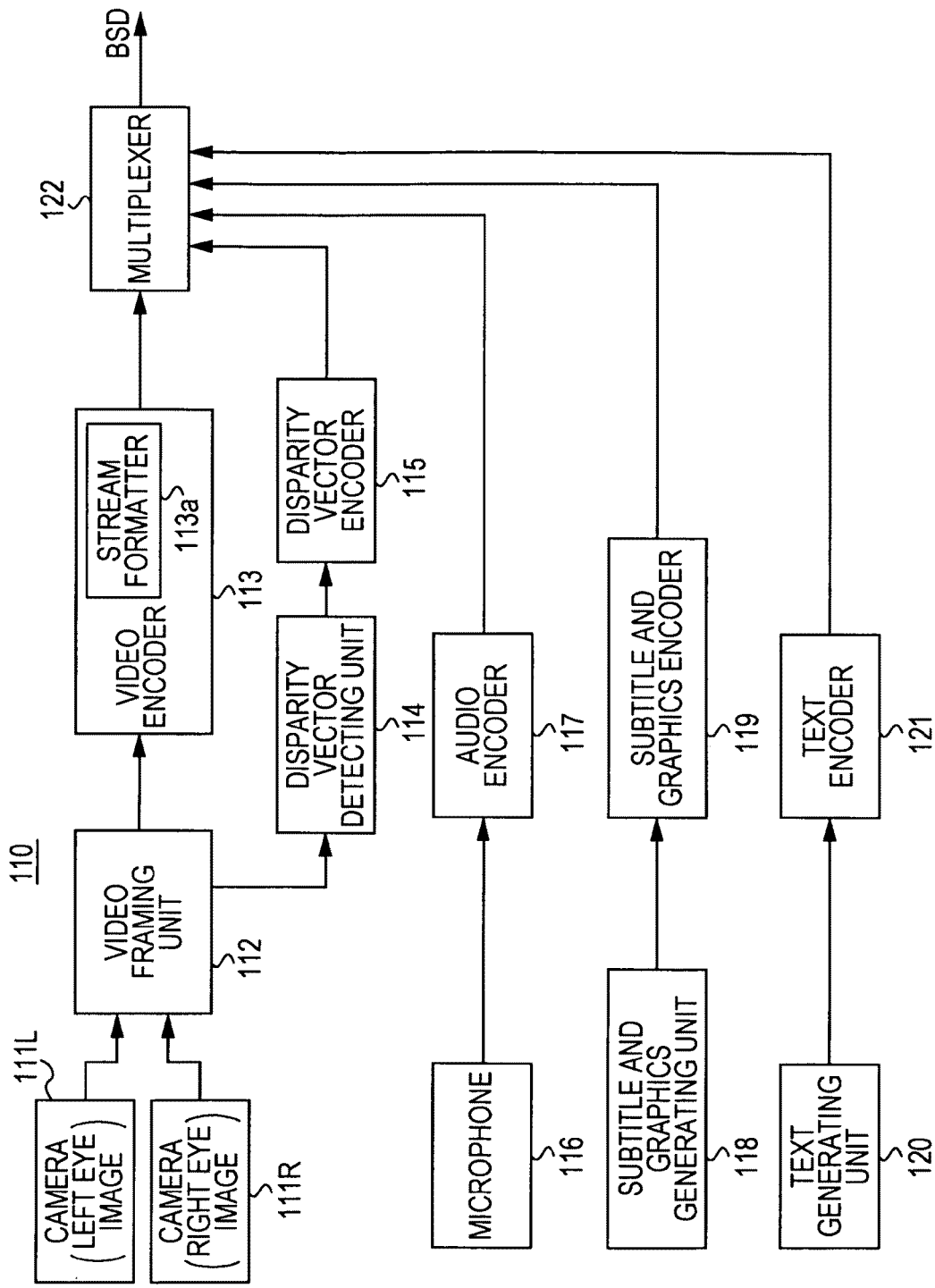
FIG. 2 is a block diagram illustrating a configuration example of a transmission data generating unit in a broadcasting station.

FIG. 2 illustrates a configuration example of a transmission data generating unit 110 for generating the above bit stream data. This configuration example is an example where a disparity vector is transmitted as numeric information. This transmission data generating unit 110 includes cameras 111L and 111R, a video framing unit 112, a video encoder 113, a disparity vector detecting unit 114, and a disparity vector encoder 115.

Also, this transmission data generating unit 110 includes a microphone 116, an audio encoder 117, a subtitle and graphics generating unit 118, a subtitle and graphics encoder 119, a text generating unit 120, a text encoder 121, and a multiplexer 122. Note that, with the present embodiment, the text generating unit 120 will also serve as a unit for generating closed caption data. This closed caption data is text data for performing caption display of closed captions.

The camera 111L takes a left eye image to obtain left eye image data for stereoscopic image display. The camera 111R takes a right eye image to obtain right eye image data for stereoscopic image display. The video framing unit 112 processes the left eye image data obtained at the camera 111L, and the right image data obtained at the camera 111R into a state according to a transmission method.

[Transmission Method Example of Stereoscopic Image Data]

Now, the following first through third methods will be cited as transmission methods of stereoscopic image data (3D image data), but may be a transmission method other than these. Here, as illustrated in FIG. 3, description will be made regarding a case where each piece of image data of the left eye (L) and the right eye (R) is image data with determined resolution, e.g., a pixel format of 1920×1080 p as an example.

The first transmission method is a "Top & Bottom" method, and is, as illustrated (a) in FIG. 4, a method for transmitting the data of each line of left eye image data in the first half of the vertical direction, and transmitting the data of each line of left eye image data in the second half of the vertical direction. In this case, the lines of the left eye image data and right eye image data are thinned out to ½, so the vertical resolution is reduced to half as to the original signal.

The second transmission method is a "Side By Side" method, and is, as illustrated (b) in FIG. 4, a method for transmitting the data of each line of left eye image data in the first half of the horizontal direction, and transmitting the data of each line of right eye image data in the second half of the horizontal direction. In this case, with each piece of the left eye image data and right eye image data, the pixel data in the horizontal direction is thinned out to ½, so the horizontal resolution is reduced to half as to the current signal.

The third transmission method is a "Frame Sequential" method, and is, as illustrated (c) in FIG. 4, a method for transmitting left eye image data and right eye image data by sequentially switching these for each field.

Returning to FIG. 2, the video encoder 113 subjects the stereoscopic image data processed at the video framing unit 112 to encoding, such as MPEG4-AVC, MPEG2, VC-1, or the like, to obtain encoded video data. Also, the video encoder 113 includes a stream formatter 113a on the subsequent stage. According to this stream formatter 113a, an elementary stream of video of which the payload portion includes video data is generated.

The disparity vector detecting unit 114 detects, based on left eye image data and right eye image data, a disparity vector that is the other disparity information as to one of the left image and right image in a predetermined position within an image. Here, the predetermine position within an image is all the pixel positions, the representative position of each region made up of multiple pixels, or the representative position of a region where, of superposition information, here, graphics information or text information is superimposed, or the like.

[Detection of Disparity Vector]

Figure 5:
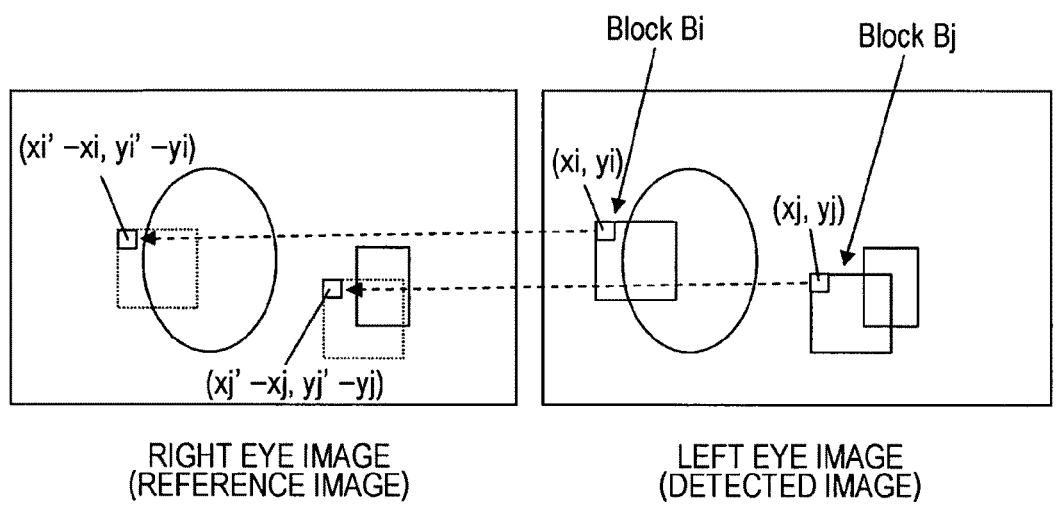
FIG. 5 is a diagram for describing an example to detect the disparity vector of a right eye image corresponding to a left eye image.

A detection example of a disparity vector will be described. Here, description will be made regarding a case where a disparity vector of a right eye image as to a left eye image is detected. As illustrated in FIG. 5, the left eye image will be taken as a detection image, and the right eye image will be taken as a reference image. With this example, disparity vectors in the positions of (xi, yi) and (xj, yj) will be detected.

Description will be made regarding a case where the disparity vector in the position of (xi, yi) is detected, as an example. In this case, a pixel block (disparity detection block) Bi of, for example, 8×8 or 16×16 with the pixel position of (xi, yi) as upper left is set to the left eye image. Subsequently, with the right eye image, a pixel block matched with the pixel block Bi is searched.

In this case, a search range with the position of (xi, yi) as the center is set to the right eye image, and a comparison block of, for example, 8×8 or 16×16 that is similar to the above pixel block Bi is sequentially set with each pixel within the search range sequentially being taken as the pixel of interest.

Figure 6:
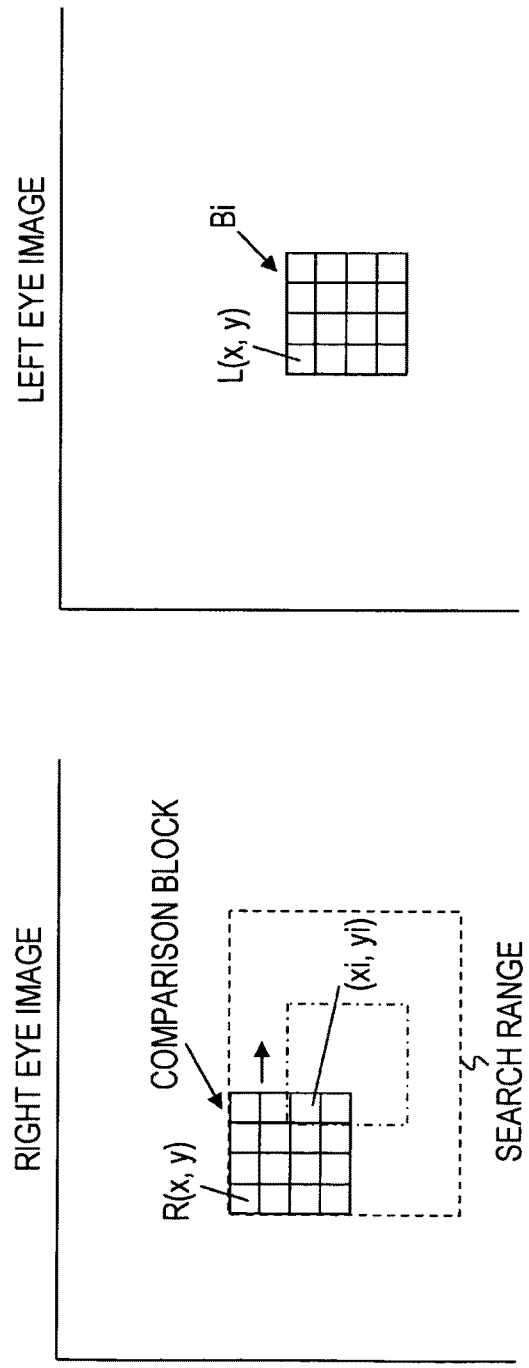
FIG. 6 is a diagram for describing obtaining a disparity vector using a block matching method.

Summation of the difference absolute value for each of the corresponding pixels between the pixel block Bi and a comparison block sequentially set is obtained. Here, as illustrated in FIG. 6, if we say that the pixel value of the pixel block Bi is L(x, y), and the pixel value of a comparison block is R(x, y), the summation of the difference absolute value between the pixel block Bi and the certain comparison block is represented with $\Sigma |L(x, y) - R(x, y)|$.

When n pixels are included in the search range set to the right eye image, finally, n summations S1 through Sn are obtained, of which the minimum summation Smin is selected. Subsequently, the position (xi', yi') of an upper left pixel is obtained from the comparison block from which the summation Smin has been obtained. Thus, the disparity vector in the position of (xi, yi) is detected such as (xi'−xi, yi'−yi) in the position of (xi, yi). While detailed description will be omitted, with regard to the disparity vector in the position (xj, yj) as well, a pixel block (disparity detection block) Bj of, for example, 8×8 or 16×16 with the pixel position of (xj, yj) as upper left is set to the left eye image, and detection is made in the same process.

(a) in FIG. 7 illustrates an example of a disparity vector VV in a predetermined position within an image, to be detected at the disparity vector detecting unit 114. This case means that, as illustrated in (b) in FIG. 7, with the predetermined position within this image, when shifting the left eye image (detection image) by the disparity vector VV, the right eye image (reference image) is overlaid.

Returning to FIG. 2, the disparity vector encoder 115 generates the elementary stream of a disparity vector including a disparity vector detected at the disparity vector detecting unit 114, and so forth. Here, the elementary stream of a disparity vector includes the following content. Specifically, ID (ID_Block), vertical position information (Vertical_Position), horizontal position information (Horizontal_Position), and a disparity vector (View_Vector) are set as one set. Subsequently, this one set is repeated by N number of times that is the number of disparity detection blocks.

FIG. 8 illustrates the transmission content of a disparity vector. A disparity vector includes a vertical direction component (View_Vector_Vertical) and a horizontal direction component (View_Vector_Horizontal).

Note that the vertical and horizontal positions of the disparity detection block become offset values in the vertical direction and horizontal direction from the origin of upper left of the image to the pixel of upper left of the block. The reason why the ID of the disparity detection block is added to transmission of each disparity vector is to link to a superposition information pattern, such as closed caption information, subtitle information, graphics information, text information, or the like, to be superimposed and displayed on the image.

For example, as illustrated in (a) in FIG. 9, when there are disparity detection blocks A through F, the transmission content includes, as illustrated (b) in FIG. 9, the IDs of the disparity detection blocks A through F, vertical and horizontal position information, and a disparity vector. For example, in (b) in FIG. 9, with regard to the disparity detection block A, ID2 indicates the ID of the disparity detection block A, (Ha, Va) indicates the vertical and horizontal position information of the disparity detection block A, and a disparity vector a indicates the disparity vector of the disparity detection block A.

Now, timing for detecting and transmitting a disparity vector will be described. With regard to this timing, for example, the following first through fourth examples can be conceived.

Figure 10:
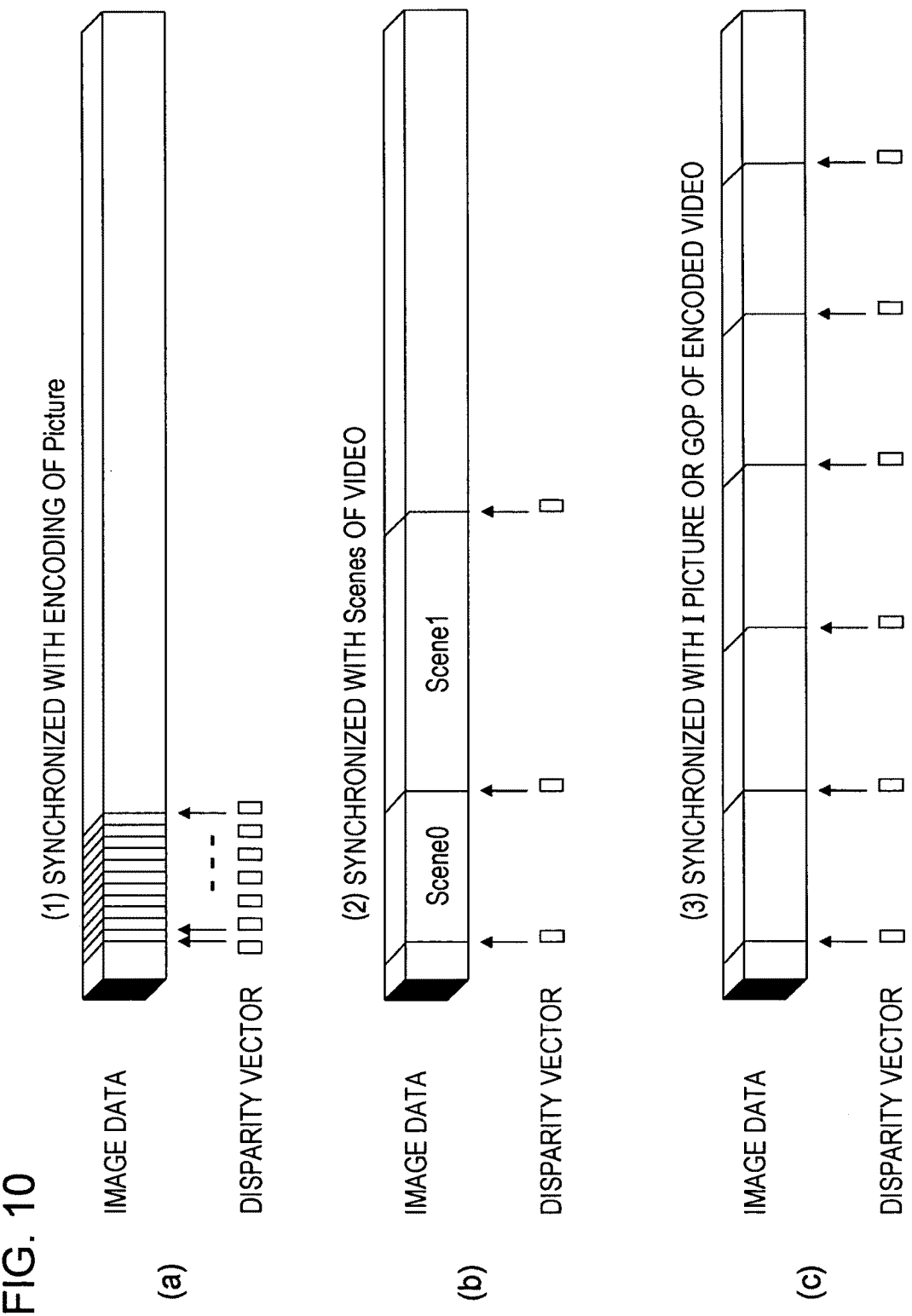
FIG. 10 is a diagram illustrating an example of timing for detecting and transmitting a disparity vector.

With the first example, as illustrated in (a) in FIG. 10, the timing is synchronized with encoding of a picture. In this case, a disparity vector is transmitted in increments of pictures. The increments of pictures are the finest increments at the time of transmitting a disparity vector. With the second example, as illustrated in (b) in FIG. 10, the timing is synchronized with a scene of video. In this case, a disparity vector is transmitted in increments of scenes.

Figure 11:
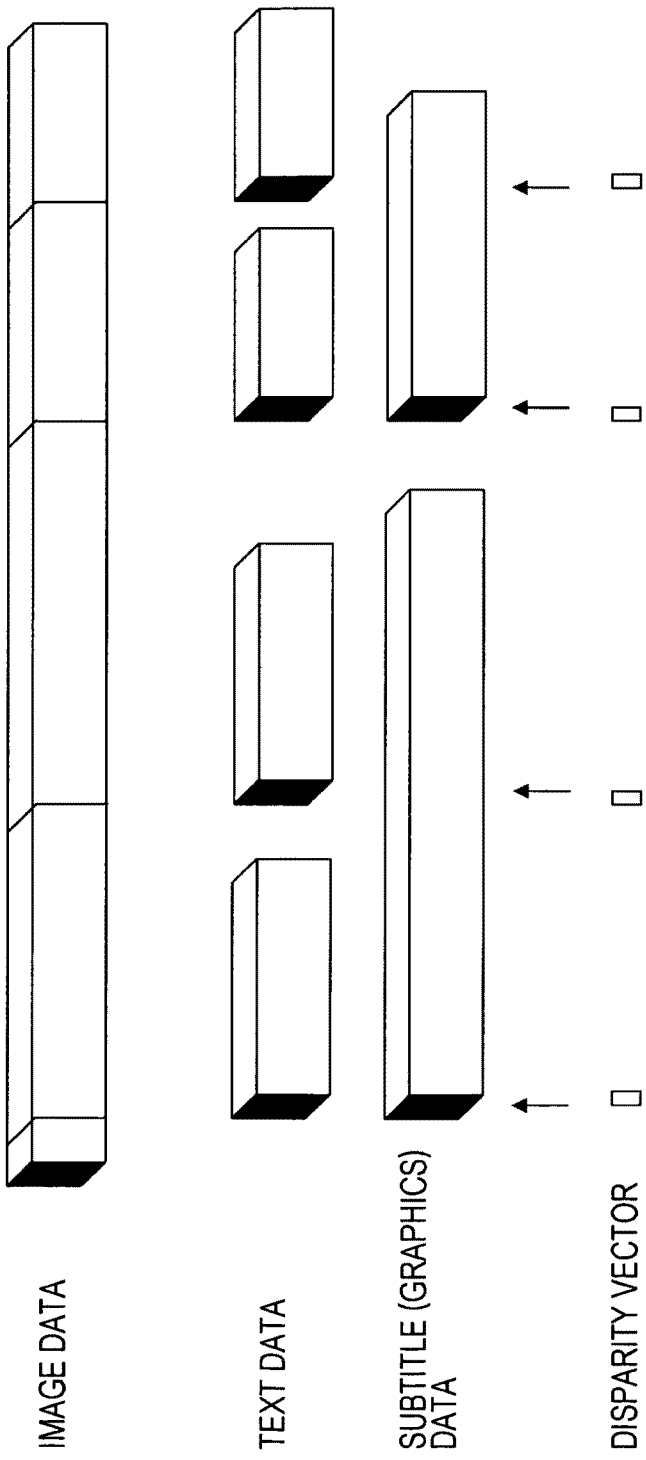
FIG. 11 is a diagram illustrating an example of timing for detecting and transmitting a disparity vector.

With the third example, as illustrated in (c) in FIG. 10, the timing is synchronized with an I picture (Intra picture) or GOP (Group Of Pictures) of encoded video. With the fourth example, as illustrated in FIG. 11, the timing is synchronized with display start timing, such as subtitle information, graphics information, text information, or the like, to be superimposed and displayed on an image.

Returning to FIG. 2, the microphone 116 detects audio corresponding to images taken at the cameras 111L and 111R to obtain audio data. The audio encoder 117 subjects the audio data obtained at the microphone 116 to encoding, such as MPEG-2, Audio AAC, or the like, to generate an audio elementary stream.

The subtitle and graphics generating unit 118 generates the data (subtitle data and graphics data) of subtitle information and graphics information to be superimposed on an image. The subtitle information is, for example, captions. Also, the graphics information is, for example, logo or the like. The subtitle data and graphics data are added with idling offset information indicating a superimposed position on an image.

This idling offset information indicates, for example, offset values in the vertical direction and horizontal direction from the origin of upper left of an image to a pixel of upper left of the superimposed position of subtitle information or graphics image. Note that the standard for transmitting caption data as bitmap data is standardized as DVB_Subtitling using DVB that is European digital broadcasting standard, and is operated.

The subtitle and graphics encoder 119 inputs the data (subtitle data and graphics data) of the subtitle information and graphics information generated at the subtitle and graphics generating unit 118. Subsequently, this subtitle and graphics encoder 119 generates an elementary stream with these data being included in the payload portion.

The text generating unit 120 generates the data (text data) of text information to be superimposed on an image. The text information is, for example, an electronic program guide, text broadcasting content, or the like. This text data is added with idling offset information indicating a superimposed position on an image in the same way as with the above graphics data. This idling offset information indicates offset values in the vertical direction and horizontal direction from the origin of upper left of an image to a pixel of upper left of the superimposed position of the text information. Note that examples of transmission of text data include EPG operated as program reservation, and CC_data (Closed Caption) of U.S. digital terrestrial specification ATSC.

The text encoder 121 inputs the text data generated at the text generating unit 120. Subsequently, the text encoder 121 generates an elementary stream with these data being included in the payload portion.

The multiplexer 122 multiplexes the packetized elementary streams output from the encoders 113, 115, 117, 119, and 121. Subsequently, the multiplexer 122 outputs bit stream data (transport stream) BSD serving as transmission data.

The operation of the transmission data generating unit 110 illustrated in FIG. 2 will roughly be described. With the camera 111L, a left eye image is taken. The left eye image data for stereoscopic image display, obtained at the camera 111L is supplied to the video framing unit 112. Also, with the camera 111R, a right eye image is taken. The right eye image data for stereoscopic image display, obtained at the camera 111R is supplied to the video framing unit 112. With the video framing unit 112, the left eye image data and the right eye image data are processed into a state according to a transmission method, and stereoscopic image data is obtained (see (a) through (c) in FIG. 4).

The stereoscopic image data obtained at the video framing unit 112 is supplied to the video encoder 113. With the video encoder 113, the stereoscopic image data is subjected to encoding, such as MPEG4-AVC, MPEG2, VC-1, or the like, and a video elementary stream including encoded video data is generated. This video elementary stream is supplied to the multiplexer 122.

Also, the left eye image data and right eye image data obtained at the cameras 111L and 111R are supplied to the disparity vector detecting unit 114 through the video framing unit 112. With this disparity vector detecting unit 114, based on the left eye image data and right eye image, a disparity detection block is set to a predetermined position within an image, and a disparity vector that is the other disparity information as to one of the left eye image and right eye image is detected.

The disparity vector in the predetermined position within the image detected at the disparity vector detecting unit 114 is supplied to the disparity vector encoder 115. In this case, the ID of the disparity detection block, the vertical position information of the disparity detection block, the horizontal position information of the disparity detection block, and the disparity vector are given as one set. With the disparity vector encoder 115, a disparity vector elementary stream including the transmission content of the disparity vector (see FIG. 8) is generated. This disparity vector elementary stream is supplied to the multiplexer 122.

Also, with the microphone 116, audio corresponding to the images taken at the cameras 111L and 111R is detected. The audio data obtained at this microphone 116 is supplied to the audio encoder 117. With this audio encoder 117, the audio data is subjected to encoding, such as MPEG-2 Audio AAC or the like, and an audio elementary stream including the encoded audio data is generated. This audio elementary stream is supplied to the multiplexer 122.

Also, with the subtitle and graphics generating unit 118, the data of subtitle information and graphics information (subtitle data and graphics data) to be superimposed on an image is generated. This data (bitmap data) is supplied to the subtitle and graphics encoder 119. The subtitle and graphics data is added with idling offset information indicating a superimposed position on the image. With the subtitle and graphics encoder 119, this graphics data is subjected to predetermined encoding, and an elementary stream including encoded data is generated. This elementary stream is supplied to the multiplexer 122.

Also, with the text generating unit 120, the data of text information (text data) to be superimposed on an image is generated. This text data is supplied to the text encoder 121. This text data is added with idling offset information indicating a superimposed position on an image in the same way as with the above graphics data. With the text encoder 121, this text data is subjected to predetermined encoding, and an elementary stream including the encoded data is generated. This elementary stream is supplied to the multiplexer 122.

With the multiplexer 122, the packet of the elementary stream supplied from each encoder is multiplexed, and bit stream data (transport stream) BSD serving as transmission data is obtained.

Figure 12:
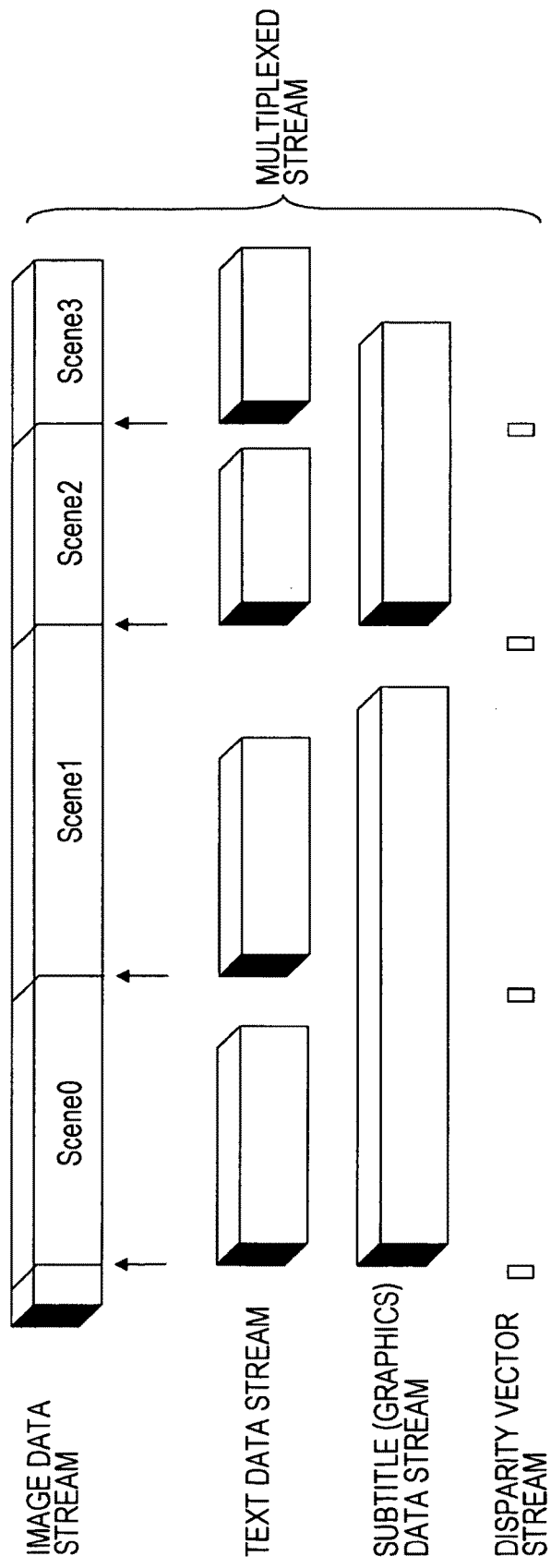
FIG. 12 is a diagram illustrating a stream example of each data to be multiplexed at the transmission data generating unit.

FIG. 12 illustrates a stream example of each data to be multiplexed at the transmission data generating unit 110 illustrated in FIG. 2. Note that this example illustrates a case where a disparity vector is detected and transmitted in increments of scenes of video (see (b) in FIG. 10). Note that the packet of each stream is added with a timestamp for synchronized display, and with the reception side, superposition timing as to an image, such as subtitle information, graphics information, text information, or the like, may be controlled.

[Another Configuration Example of Transmission Data Generating Unit]

Note that the above transmission data generating unit 110 illustrated in FIG. 2 is configured to transmit the transmission content of a disparity vector (see FIG. 8) to the reception side as an independent elementary stream. However, it can also be conceived to transmit the transmission content of a disparity vector by being embedded in another stream. For example, the transmission content of a disparity vector is transmitted by being embedded in a stream of video as user data. Also, for example, the transmission content of a disparity vector is transmitted by being embedded in the stream of a subtitle, graphics, or text.

Figure 13:
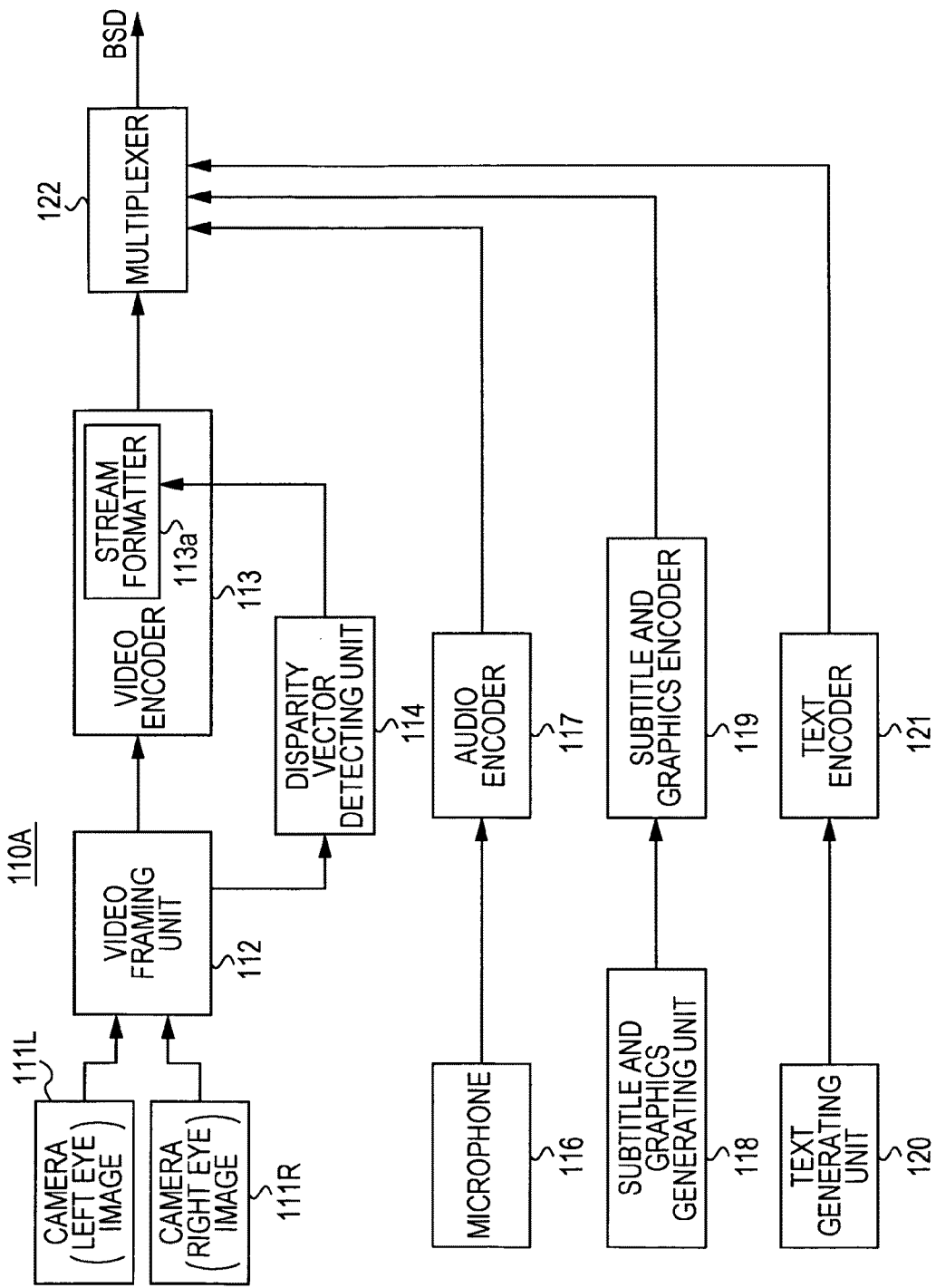
FIG. 13 is a block diagram illustrating another configuration example of the transmission data generating unit in the broadcasting station.

FIG. 13 illustrates a configuration example of a transmission data generating unit 110A. This example is also an example wherein a disparity vector is transmitted as numeric information. This transmission data generating unit 110A is configured to transmit the transmission content of a disparity vector by being embedded in a stream of video as user data. In FIG. 13, portions corresponding to FIG. 2 are denoted with the same reference numerals, and detailed description thereof will be omitted.

With this transmission data generating unit 110A, the disparity vector at the predetermined position within an image detected at the disparity vector detecting 114 is supplied to the stream formatter 113a within the video encoder 113. In this case, the ID of the disparity detection block, the vertical position information of the disparity detection block, the horizontal position information of the disparity detection block, and the disparity vector are given as one set. With the stream formatter 113a, the transmission content of a disparity vector (see FIG. 8) is embedded in a video stream as user data.

While detailed description will be omitted, the others of the transmission data generating unit 110A illustrated in FIG. 13 are configured in the same way as with the transmission data generating unit 110 illustrated in FIG. 2.

Figure 14:
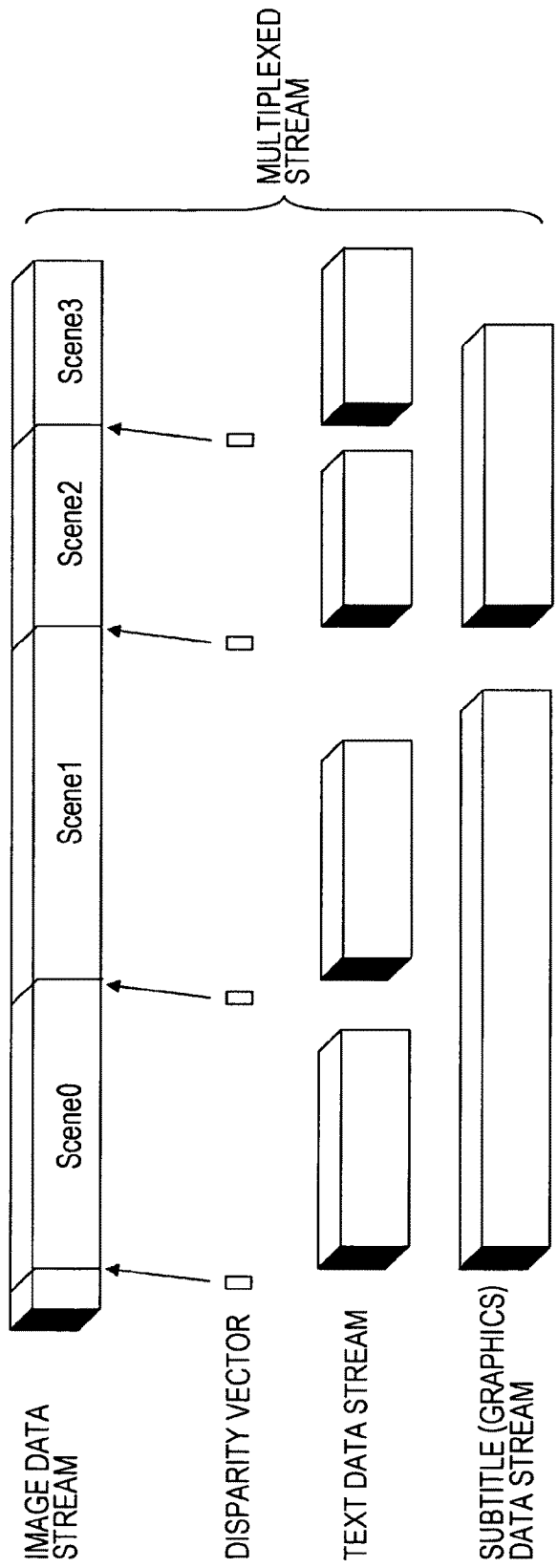
FIG. 14 illustrates an example of each stream to be multiplexed at the transmission data generating unit in the broadcasting station.

FIG. 14 illustrates an example of an image data stream, a subtitle or graphics data stream, and a text data stream to be multiplexed at the transmission data generating unit 110A illustrated in FIG. 13. A disparity vector (disparity information) is transmitted by being embedded in an image data stream.

[Another Configuration Example of Transmission Data Generating Unit]

Figure 15:
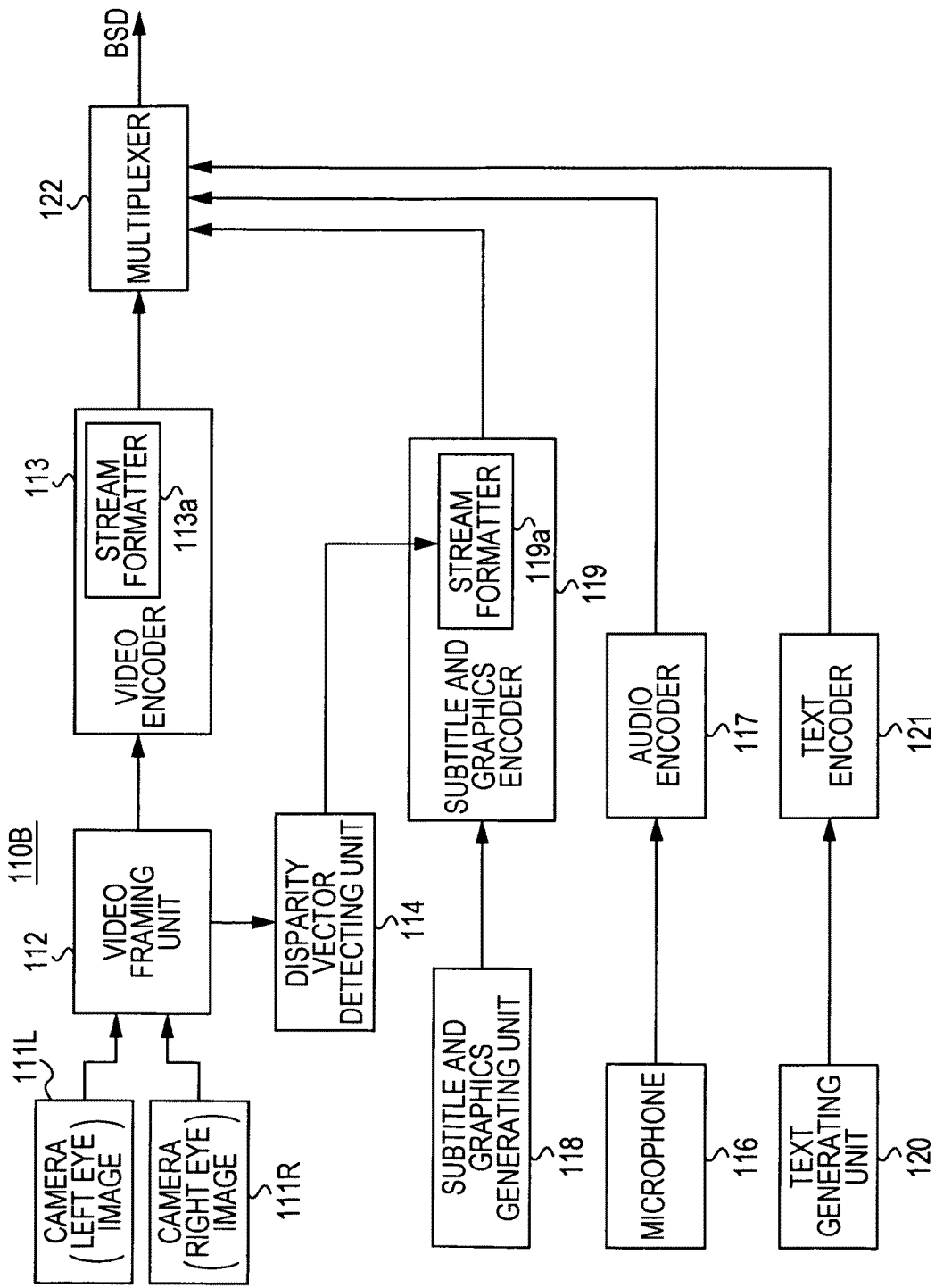
FIG. 15 is a block diagram illustrating another configuration example of the transmission data generating unit in the broadcasting station.

FIG. 15 illustrates a configuration example of a transmission data generating unit 110B. This example is also an example wherein a disparity vector is transmitted as numeric information. This transmission data generating unit 110B is configured to transmit the transmission content of a disparity vector by being embedded in a subtitle or graphics data stream. In this FIG. 15, portions corresponding to FIG. 2 are denoted with the same reference numerals, and detailed description thereof will be omitted.

With this transmission data generating unit 110B, the disparity vector in a predetermined position, within the image detected at the disparity vector detecting 114 is supplied to a stream formatter 119a within the subtitle and graphics encoder 119. In this case, the ID of the disparity detection block, the vertical position information of the disparity detection block, the horizontal position information of the disparity detection block, and the disparity vector are given as one set. With the stream formatter 119a, the transmission content of a disparity vector (see FIG. 8) is embedded in a subtitle or graphics data stream.

While detailed description will be omitted, the others of the transmission data generating unit 110B illustrated in FIG. 15 are configured in the same way as with the transmission data generating unit 110 illustrated in FIG. 2.

Figure 16:
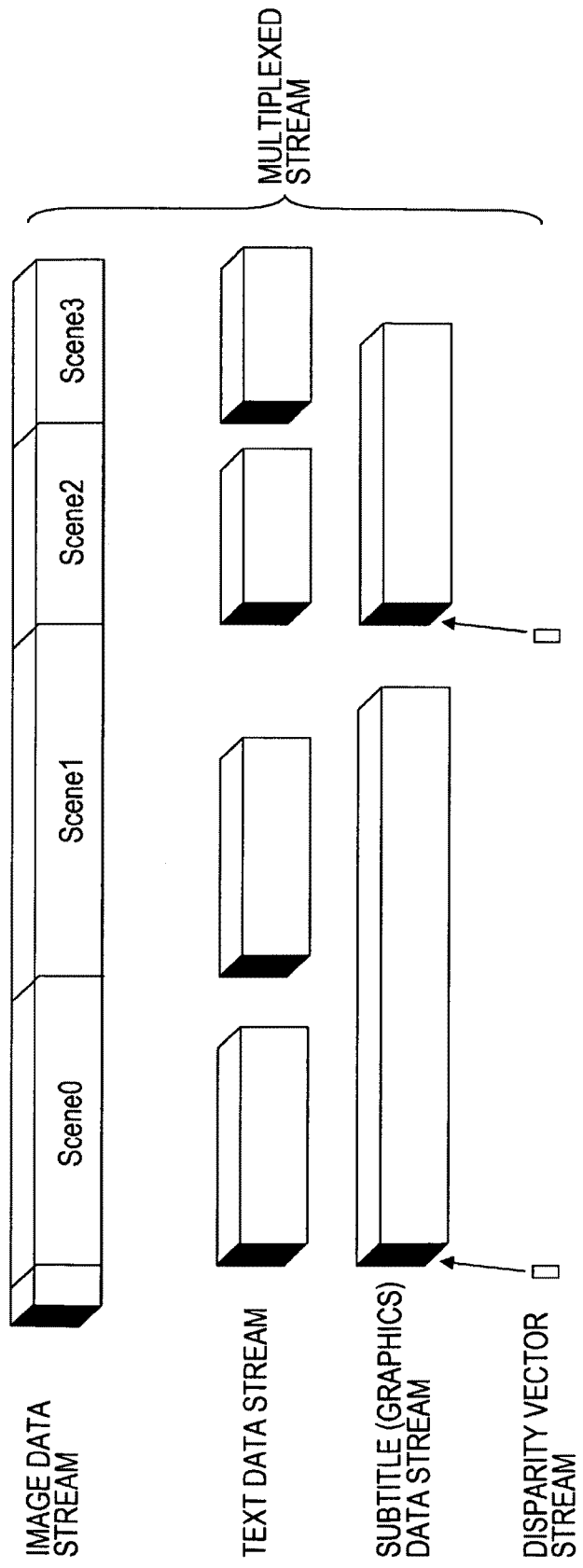
FIG. 16 illustrates an example of each stream to be multiplexed at the transmission data generating unit in the broadcasting station.

FIG. 16 illustrates an example of an image data stream, a subtitle or graphics data stream, and a text data stream to be multiplexed at the transmission data generating unit 110B illustrated in FIG. 15. A disparity vector (disparity information) is transmitted by being embedded in a subtitle or graphics data stream.

[Another Configuration Example of Transmission Data Generating Unit]

Also, the above transmission data generating units 110, 110A, and 110B illustrated in FIG. 2, FIG. 13, and FIG. 15 transmit a disparity vector as numeric information (see FIG. 8). However, in stead of a disparity vector being transmitted as numeric information, it can also be conceived to transmit a disparity vector by disparity information being reflected beforehand on the data of superposition information (e.g., subtitle information, graphics information, text information, etc.) to be superimposed on an image on the transmission side.

For example, in the event of reflecting disparity information on the data of graphics information, with the transmission side, graphics data corresponding to both of left eye graphics information to be superimposed on a left eye image, and right eye graphics information to be superimposed on a right eye image is generated. In this case, the left eye graphics information and right eye graphics information are the same graphics information. However, with a display position within the image, for example, the right eye graphics information is set so as to be shifted to the horizontal direction by the horizontal direction component worth of the disparity vector corresponding to the display position thereof, as to the left graphics information.

For example, as for a disparity vector, of disparity vectors detected in multiple positions within an image, the disparity vector corresponding to the superimposed position thereof is used. Also, for example, as for a disparity vector, of disparity vectors detected in multiple positions within an image, a disparity vector in the position to be recognized as the nearest in respect of perspective is used. Note that, while detailed description will be omitted, the same holds for a case where disparity information is reflected on the data of subtitle information or graphics information.

Figure 17:
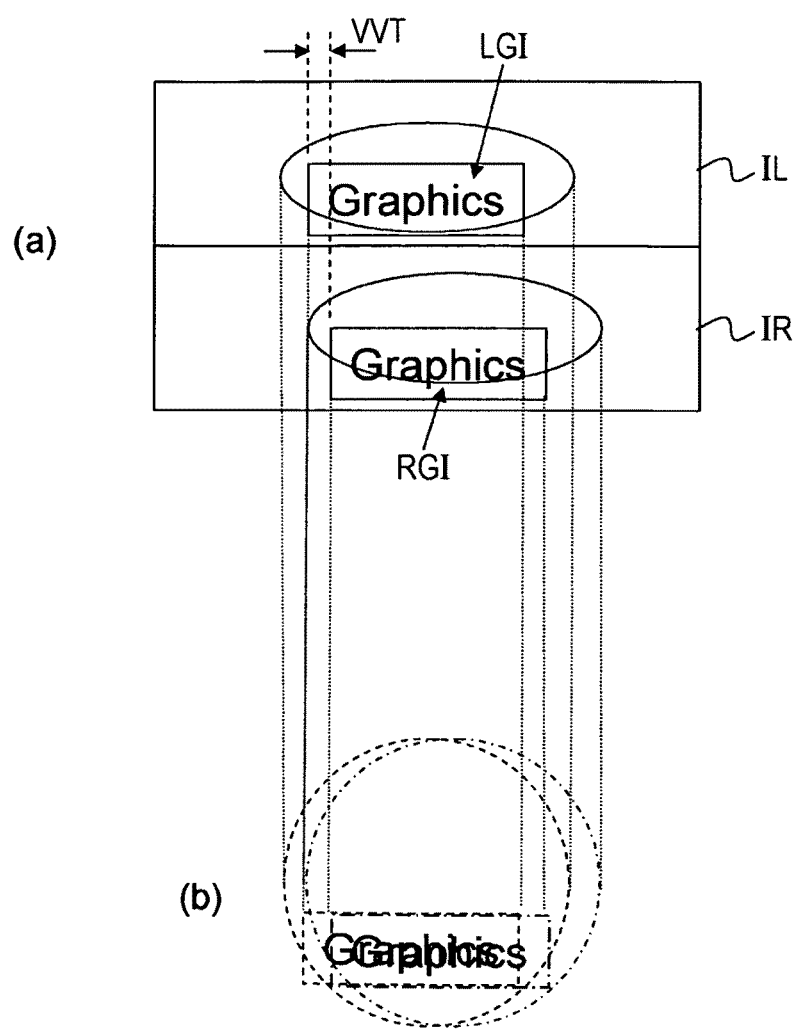
FIG. 17 is a diagram for describing the superimposed positions and so forth of left graphics information and right graphics information in the event that the transmission method is a first transmission method ("Top & Bottom" method).

(a) in FIG. 17 illustrates the superimposed position of left eye graphics information and right eye graphics information in the event that the transmission method is the above first transmission method ("Top & Bottom" method). These left eye graphics information and right eye graphics information are the same information. However, right graphics information RGI to be superimposed on a right eye image IR is set to a position shifted to the horizontal direction by the horizontal direction component VVT worth of the disparity vector as to left eye graphics information LGI to be superimposed on a left eye image IL.

Graphics data is generated, as illustrated in (a) in FIG. 17, so that each piece of the graphics information LGI and RGI is superimposed on each of the regions IL and IR. Thus, a viewer can observe, as illustrated in (b) in FIG. 17, each piece of the graphics information LGI and RGI along with each of the images IL and IR using disparity, so can also recognize perspective regarding graphics information.

Figure 18:
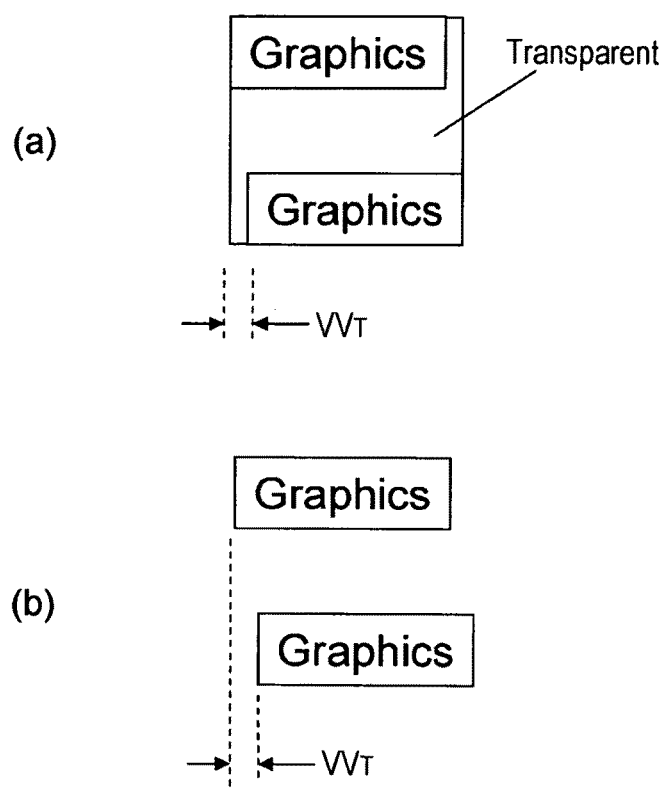
FIG. 18 is a diagram for describing a method for generating left graphics information and right graphics information in the event that the transmission method is the first transmission method ("Top & Bottom" method).

For example, the graphics data of each piece of the graphics information LGI and RGI is, as illustrated in (a) in FIG. 18, generated as the data of a single region. In this case, the data of portions other than each piece of the graphics information LGI and RGI should be generated as transparent data. Also, for example, the graphics data of each pieces of the graphics information LGI and RGI is, as illustrated in (b) in FIG. 18, generated as the data of a separate region.

Figure 19:
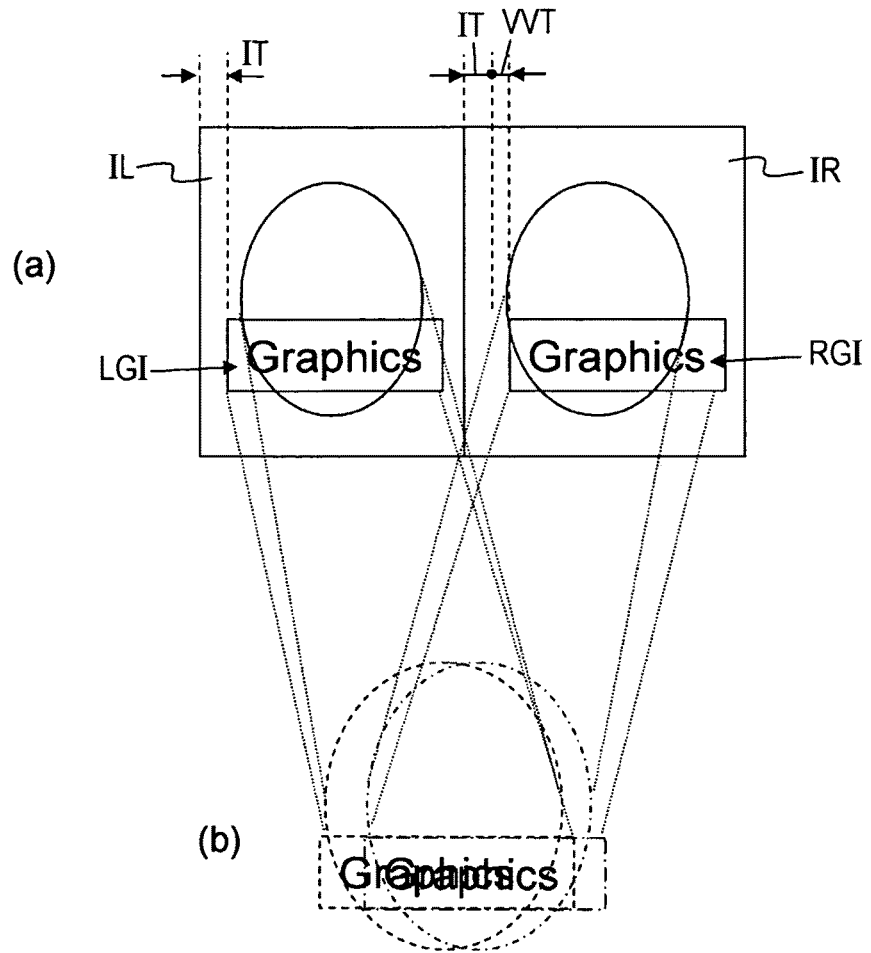
FIG. 19 is a diagram for describing a method for generating left graphics information and right graphics information in the event that the transmission method is a second transmission method ("Side By Side" method).

(a) in FIG. 19 illustrates the superimposed position of left eye graphics information and right eye graphics information in the event that the transmission method is the above second transmission method ("Side By Side" method). These left eye graphics information and right eye graphics information are the same information. However, right graphics information RGI to be superimposed on a right eye image IR is set to a position shifted to the horizontal direction by the horizontal direction component VVT worth of the disparity vector as to left eye graphics information LGI to be superimposed on a left eye image IL. Note that IT is an idling offset value.

Graphics data is generated, as illustrated in (a) in FIG. 19, so that the graphics information LGI and RGI are superimposed on the regions IL and IR, respectively. Thus, the viewer can observe, as illustrated in (b) in FIG. 19, each piece of the graphics information LGI and RGI along with each of the images IL and IR using disparity, so can also recognize perspective regarding graphics information.

Figure 20:
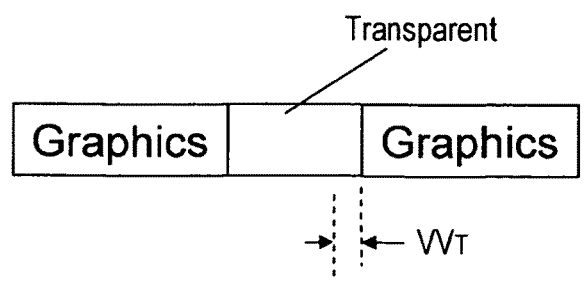
FIG. 20 is a diagram for describing a method for generating left graphics information and right graphics information in the event that the transmission method is the second transmission method ("Side By Side" method).

For example, the graphics data of each piece of the graphics information LGI and RGI is, as illustrated in FIG. 20, generated as the data of a single region. In this case, the data of portions other than each piece of the graphics information LGI and RGI should be generated as transparent data.

Figure 21:
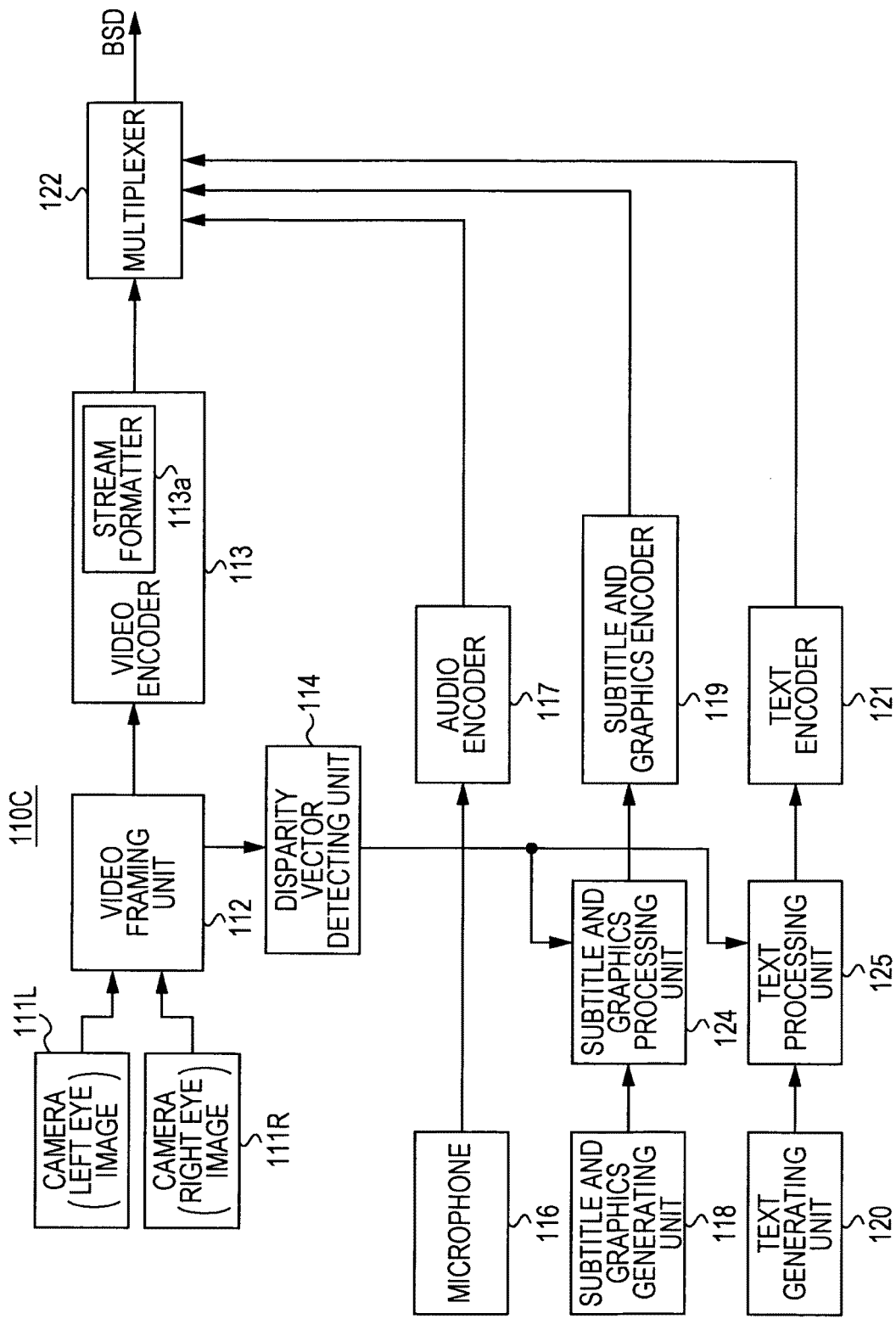
FIG. 21 is a block diagram illustrating another configuration example of the transmission data generating unit in the broadcasting station.

FIG. 21 illustrates a configuration example of a transmission data generating unit 110C. This transmission data generating unit 110C is configured to transmit disparity information by being reflected on the data of superposition information such as closed caption information, subtitle information, graphics information, text information, and so forth. In this FIG. 21, portions corresponding to FIG. 2 are denoted with the same reference numerals, and detailed description thereof will be omitted.

With this transmission data generating unit 110C, a subtitle and graphics processing unit 124 is inserted between the subtitle and graphics generating unit 118 and the subtitle and graphics encoder 119. Also, with this transmission data generating unit 110C, a text processing unit 125 is inserted between the text generating unit 120 and the text encoder 121. Subsequently, the disparity vector in a predetermined position within the image detected by the disparity vector detecting unit 114 is supplied to the subtitle and graphics processing unit 124 and text processing unit 125.

With the subtitle and graphics processing unit 124, the data of the subtitle and graphics information LGI and RGI of the left eye and right eye to be superimposed on a left eye image IL and a right eye image IR is generated, and is, in this case, generated based on the subtitle data and graphics data generated at the subtitle and graphics generating unit 118. However, with regard to the superimposed position within the image, for example, the subtitle information and graphics information of the right eye are set so as to be shifted to the horizontal direction by the horizontal direction component VVT of the disparity vector as to the subtitle information and graphics information of the left eye (see (a) in FIG. 17 and (a) in FIG. 19).

In this way, the subtitle data and graphics data generated at the subtitle and graphics processing unit 124 are supplied to the subtitle and graphics encoder 119. Note that the subtitle data and graphics data are added with idling offset information indicating a superimposed position on the image. With the subtitle and graphics encoder 119 generates the elementary streams of the subtitle data and graphics data generated at the subtitle and graphics processing unit 124.

Also, with the text processing unit 125, based on the text data generated at the text generating unit 120, the data of left eye text information to be superimposed on a left eye image, and the data of right eye text information to be superimposed on a right eye image are generated. In this case, the left eye text information and right eye text information are the same text information, but with regard to the superimposed position within the image, for example, the right text information is set so as to be shifted to the horizontal direction by the horizontal direction component VVT of the disparity vector as to the left eye text information.

In this way, the text data generated at the text processing unit 125 is supplied to the text encoder 121. Note that this text data is added with idling offset information indicating a superimposed position on the image. With the text encoder 121, the elementary stream of the text data generated at the text processing unit is generated.

While detailed description will be omitted, the others of the transmission data generating unit 110C illustrated in FIG. 21 are configured in the same way as with the transmission data generating unit 110 illustrated in FIG. 2.

[Another Configuration Example of Transmission Data Generating Unit]

With the transmission data generating units 110, 110A, and 110B illustrated in FIG. 2, FIG. 13, and FIG. 15, the disparity vector detecting unit 114 detects a disparity vector (disparity information) in a predetermined position within an image based on left eye image data and right eye image data. The transmission data generating units 110, 110A, and 110B are configured to transmit the disparity information in the predetermined position within the image detected at the disparity vector detecting unit 114.

However, for example, it can be conceived that the disparity vector for each pixel recorded in a data recording medium in a manner associated with image data is subjected to downsizing processing, and a disparity information set including disparity information belonging to one or multiple regions obtained by sectioning a screen into a predetermined size is created. In this case, the size of each region is selected, for example, based on the space density or transmission band of a disparity vector that the reception side requires.

Also, as for a disparity information set, a general-purpose disparity information set, and a disparity information set for a particular service application can be conceived. Examples of for a particular service application includes for closed captions, and for subtitles. Subsequently, as for a disparity information set to be transmitted to the reception side, the following cases can be conceived.

(1) A general-purpose disparity information set alone is transmitted (in the event of having no relationship with a particular service)

(2) A general-purpose disparity information set alone is transmitted (in the event of having relationship with a particular service)

Figure 22:
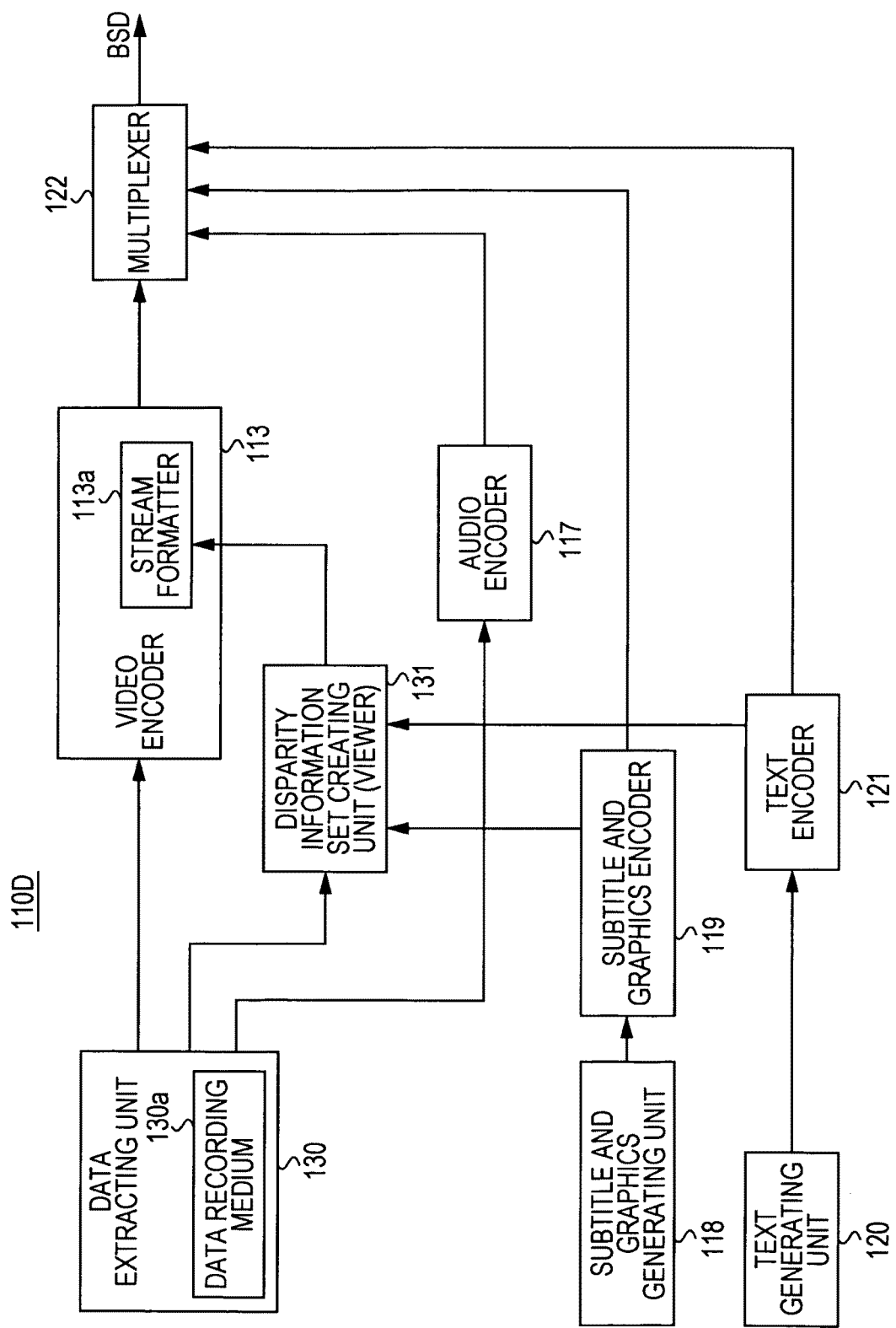
FIG. 22 is a block diagram illustrating another configuration example of the transmission data generating unit in the broadcasting station.

(3) Both of a general-purpose disparity information set and a disparity information set for a particular service application are transmitted (4) A disparity information set for a particular service application alone is transmitted FIG. 22 illustrates a configuration example of a transmission data generating unit 110D. This transmission data generating unit 110D is configured to create a predetermined sets of disparity information sets corresponding to one of the above cases (1) through (4) and to transmit the predetermined sets of disparity information sets to the reception side. In this FIG. 22, portions corresponding to FIG. 2 are denoted with the same reference numerals, and detailed description thereof will be omitted as appropriate.

This transmission data generating unit 110D includes a data extracting unit (archive unit) 130, a disparity information set creating unit 131, a video encoder 113, and an audio encoder 117. Also, this transmission data generating unit 110D includes a subtitle and graphics generating unit 118, a subtitle and graphics encoder 119, a text generating unit 120, a text encoder 121, and a multiplexer 122.

A data recording medium 130a is, for example, detachably mounted on the data extracting unit 130. Audio data and a disparity vector are recorded in this data recording medium 130a along with stereoscopic image data including left eye image data and right eye image data in an associated manner. The data extracting unit 130 extracts and outputs stereoscopic image data, audio data, a disparity vector, or the like from the data recording medium 130a. The data recording medium 130a is a disc-shaped recording medium, semiconductor memory, or the like.

Here, the stereoscopic image data recorded in the data recording medium 130a is equivalent to the stereoscopic image data obtained at the video framing unit 112 of the transmission data generating unit 110 illustrated in FIG. 2. Also, a disparity vector recorded in the data recording medium 130a is, for example, a disparity vector for each pixel making up an image.

The disparity information set creating unit 131 has a viewer function. This disparity information set creating unit 131 subjects the disparity vector output from the data extracting unit 130, i.e., the disparity vector for each pixel to downsizing processing to generate a disparity vector belonging to a predetermined region.

Figure 23:
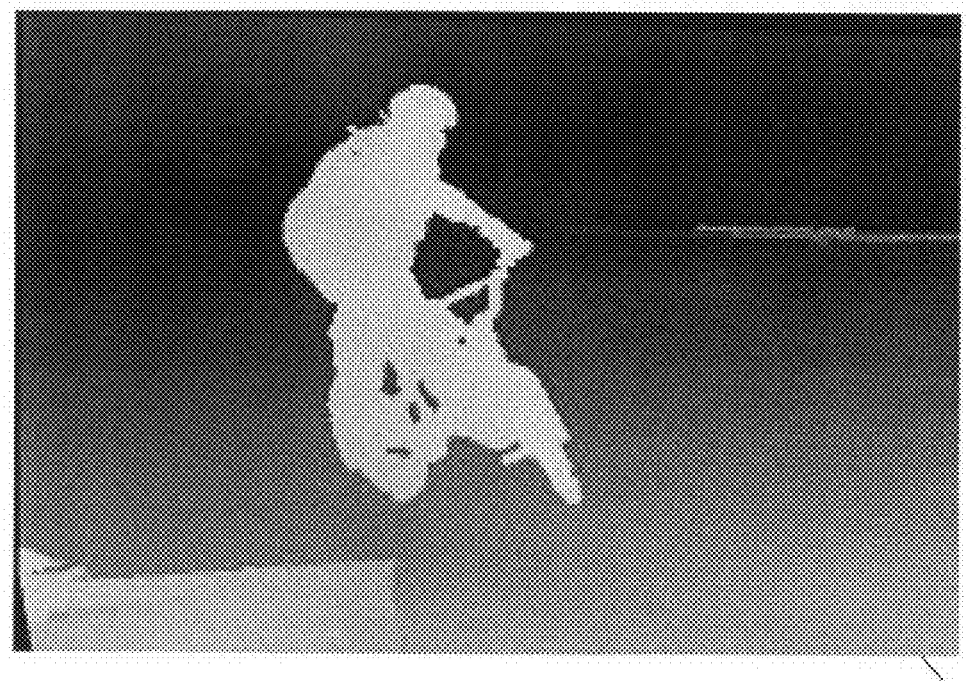
FIG. 23 is a diagram illustrating an image example in the event that the value of a disparity vector for each pixel is used as the luminance value of each pixel.

FIG. 23 illustrates an example of data in the relative depth direction to be given such as the luminance value of each pixel. Here, the data in the relative depth direction may be handled as a disparity vector for each pixel by predetermined conversion. With this example, the luminance values of a person portion are high. This means that the value of a disparity vector of the person portion is great, and accordingly, with stereoscopic image display, this means that this person portion is perceived to be in a state of being closer. Also, with this example, the luminance values of a background portion are low. This means that the value of a disparity vector of the background portion is small, and accordingly, with stereoscopic image display, this means that this background portion is perceived to be in a state of being farther away.

Figure 24:
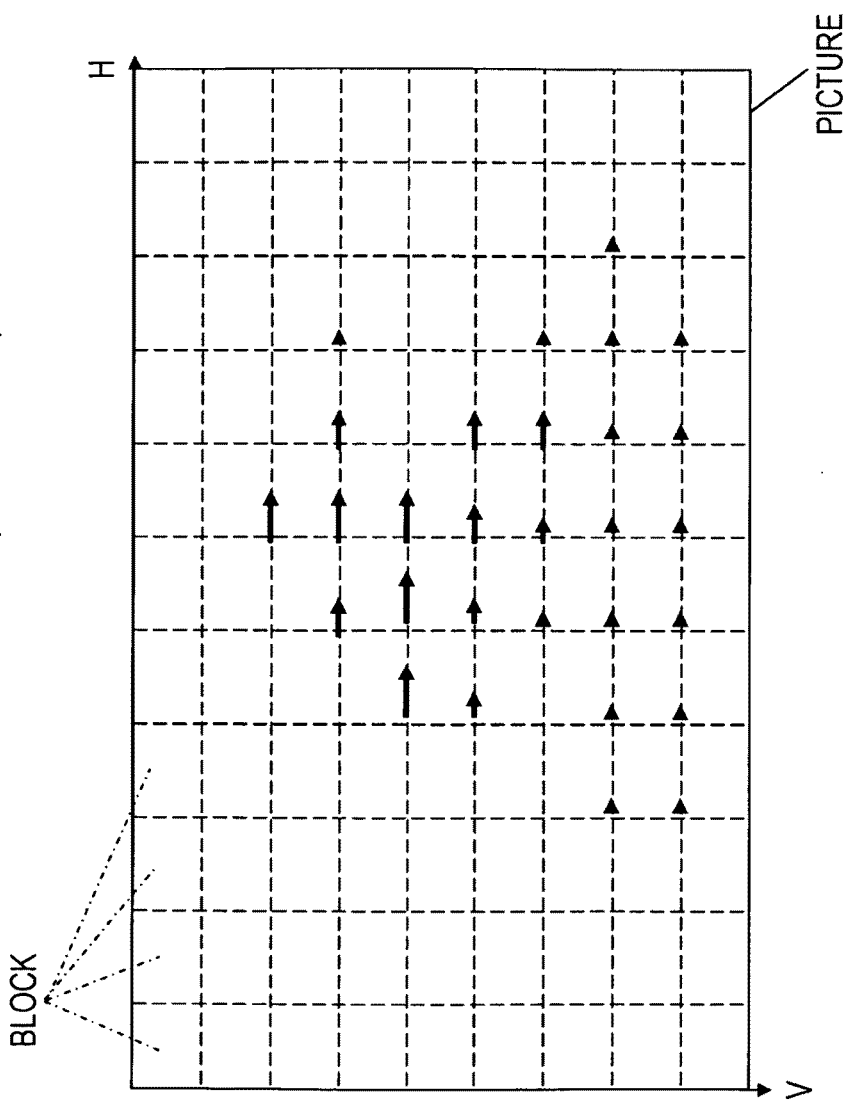
FIG. 24 is a diagram illustrating an example of a disparity vector for each block (Block).

FIG. 24 illustrates an example of the disparity vector for each block (Block). The block is equivalent to the upper layer of pixels positioned in the lowermost layer. This block is configured by an image (picture) region being divided with predetermined sizes in the horizontal direction and the vertical direction. The disparity vector of each block is obtained, for example, by a disparity vector of which the value is the greatest being selected out of the disparity vectors of all the pixels existing within the block thereof. With this example, the disparity vector of each block is illustrated by an arrow, and the length of the arrow corresponds to the size of the disparity vector.

Figure 25:
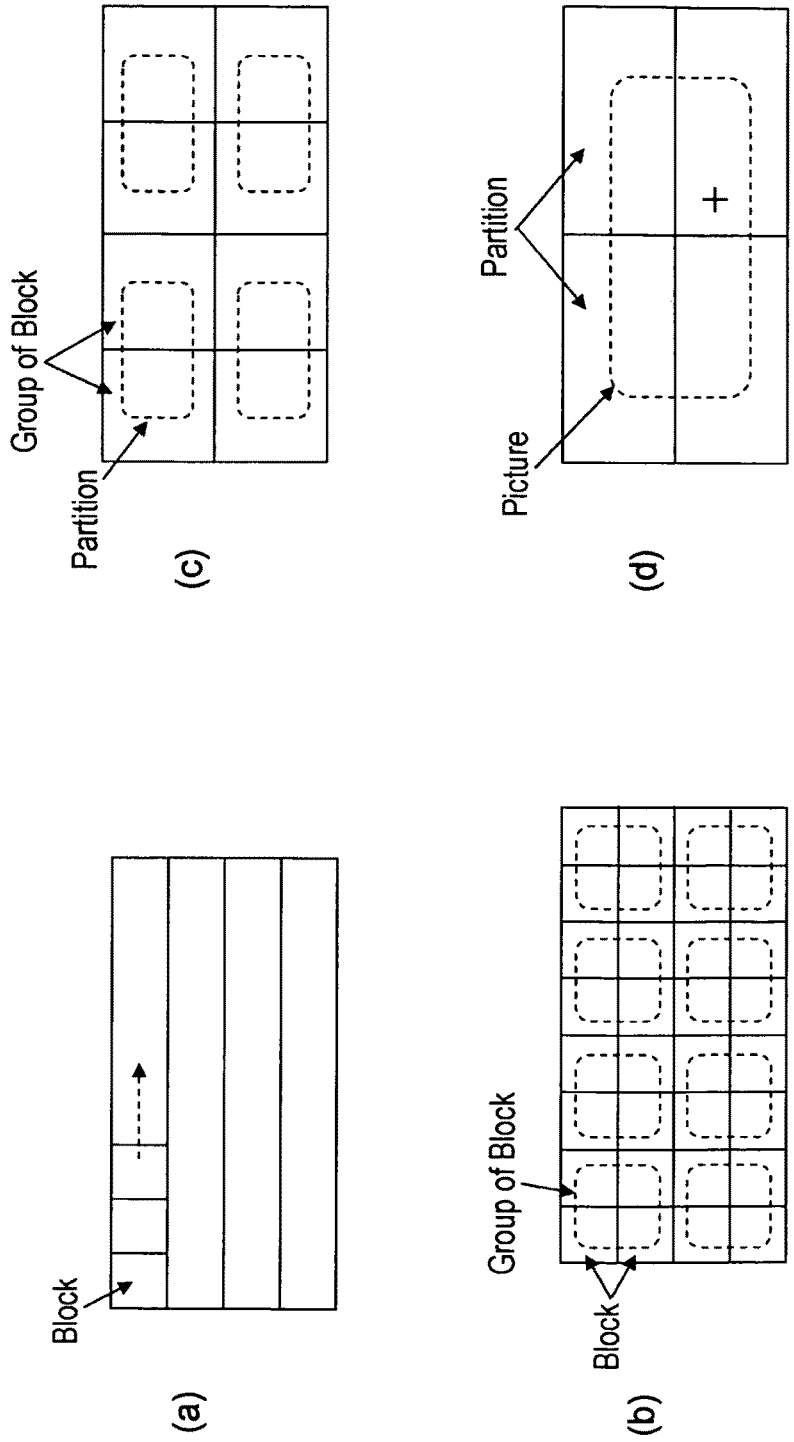
FIG. 25 is a diagram illustrating downsizing processing to be performed at a disparity information set creating unit of the transmission data generating unit.

FIG. 25 illustrates an example of the downsizing processing to be performed at the disparity information set creating unit 131. First, the disparity information set creating unit 134 uses, as illustrated in (a) in FIG. 25, the disparity vector for each pixel to obtain the disparity vector for each block. As described above, the block is equivalent to the upper layer of pixels positioned in the lowermost layer, and is configured by an image (picture) region being divided with predetermined sizes in the horizontal direction and the vertical direction. The disparity vector of each block is obtained, for example, by a disparity vector of which the value is the greatest being selected out of the disparity vectors of all the pixels existing within the block thereof.

Next, the disparity information set creating unit 131 uses, as illustrated in (b) in FIG. 25, the disparity vector for each block to obtain the disparity vector for each group (Group Of Block). The group is equivalent to the upper layer of blocks, and is obtained by collectively grouping multiple adjacent blocks. With the example in (b) in FIG. 25, each group is made up of four blocks bundled with a dashed-line frame. Subsequently, the disparity vector of each block is obtained, for example, by a disparity vector of which the value is the greatest being selected out of the disparity vectors of all the blocks within the group thereof.

Next, the disparity information set creating unit 131 uses, as illustrated in (c) in FIG. 25, the disparity vector for each group to obtain the disparity vector for each partition (Partition). The partition is equivalent to the upper layer of groups, and is obtained by collectively grouping multiple adjacent groups. With the example in (c) in FIG. 25, each partition is made up of two groups bundled with a dashed-line frame. Subsequently, the disparity vector of each partition is obtained, for example, by a disparity vector of which the value is the greatest being selected out of the disparity vectors of all the groups within the section thereof.

Next, the disparity information set creating unit 131 uses, as illustrated in (d) in FIG. 25, the disparity vector for each partition to obtain the disparity vector of the entire picture (entire image) positioned in the uppermost layer. With the example in (d) in FIG. 25, the entire picture includes four regions bundled with a dashed-line frame. Subsequently, the disparity vector of the entire picture is obtained; for example, by a disparity vector having the greatest value being selected out of the disparity vectors of all the regions included in the entire picture. In this case, in addition to the disparity vector of the entire picture, the information of the position (illustrated with "+") of the original pixel where the disparity thereof has been obtained is obtained, and this may also be taken as the additional information of the disparity vector. The same also holds at the time of obtaining the disparity vector of the above block, group, or partition.

In this way, the disparity information set creating unit 131 subjects the disparity vector for each pixel positioned in the lowermost layer to downsizing processing, whereby the disparity vector of each region of each hierarchy of a block, group, partition, and the entire picture can be obtained. Note that, with an example of downsizing processing illustrated in FIG. 25, eventually, in addition to the hierarchy of a pixel, the disparity vectors of the four hierarchies of a block, group, partition, and the entire picture are obtained, but the number of hierarchies, how to partition the region of each hierarchy, and the number of regions are not restricted to this example.

The disparity information set creating unit 131 creates a disparity information set including the disparity vector for each region of a predetermined size by the above downsizing processing. This disparity information set is added with information indicating a screen region to which each piece of the disparity information belongs. For example, as information indicating a screen region, information indicating the number of divisions of the screen, for example, such as zero division, four divisions, nine divisions, 16 divisions, or the like, is added. Also, as information indicating a screen region, information indicating the size (block size) of a region, for example, such as 16×16, 32×32, 64×64, or the like, is added.

With a disparity information set, if each piece of the disparity information is disposed in scan sequence, a screen region to which each piece of the disparity information belongs can be recognized according to information indicating the number of divisions of the screen, or information indicating the size of a region. In this meaning, the information indicating the number of screen partitions, or information indicating the size of a region becomes information indicating a screen region to which each piece of the disparity information belongs.

Also, the disparity information set creating unit 131 creates a disparity information set for a particular service application according to need. For example, a disparity information set for closed captions, for subtitles, for a particular application (widget) graphics, or the like is created according to need. In this case, according to the above downsizing processing, a disparity vector belonging to one or multiple screen regions, corresponding to one display region or each of multiple display regions of superposition information (closed caption information, subtitle information, graphics information, etc.), is created.

Figure 26:
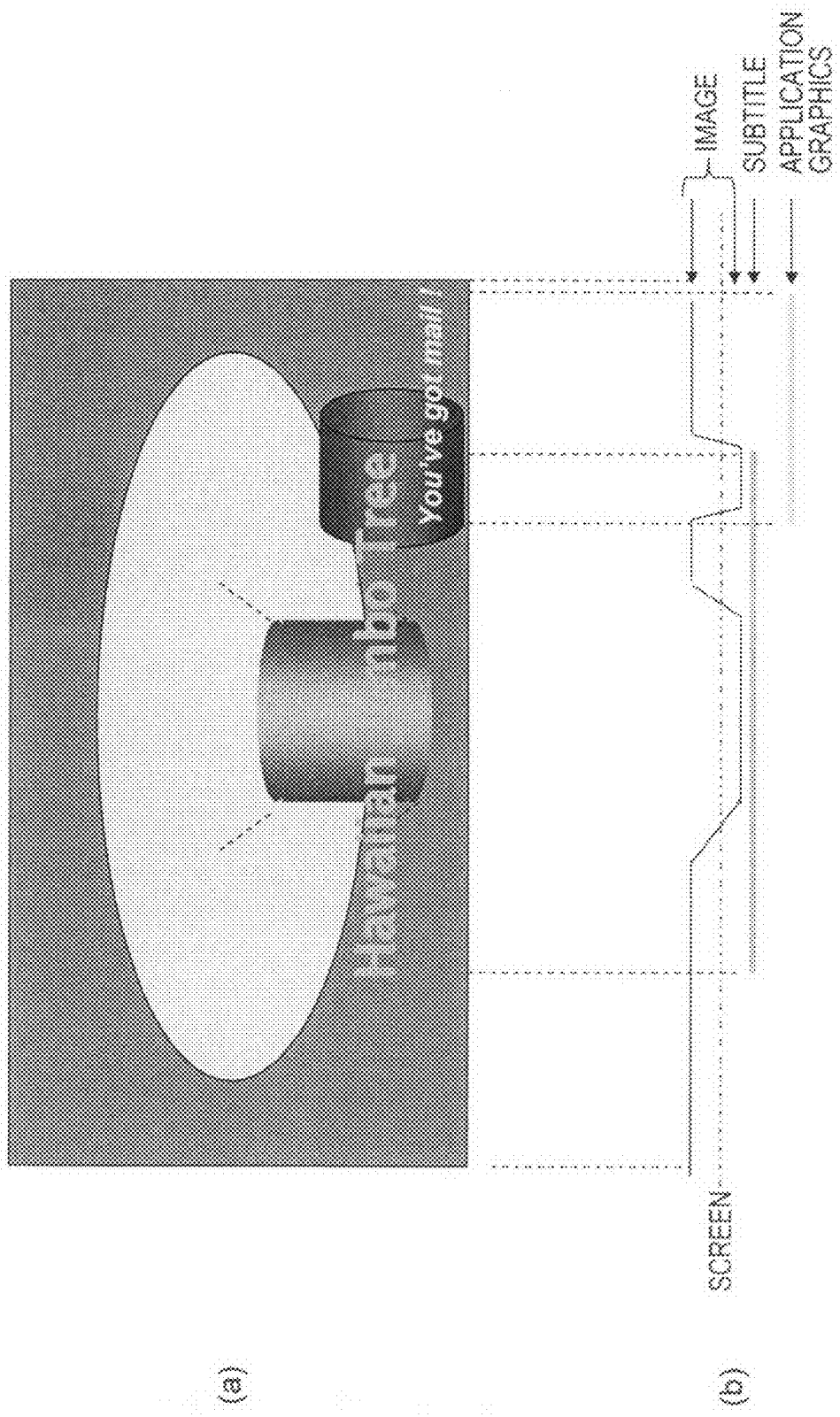
FIG. 26 is a diagram illustrating a display example of subtitles and application graphics, and perspective thereof on an image.

(a) in FIG. 26 illustrates a display example of a subtitle and application graphics on an image. (b) in FIG. 26 illustrates the perspective of the image, subtitle, and application graphics. For example, as illustrated in the drawing, the subtitle is displayed in a central region of the lower half of the screen, but is intended to be recognized further in front of the nearest position of the image. In this case, with the disparity information set creating unit 131, a disparity vector for providing disparity to the subtitle is created from the display region of this subtitle, and the disparity vector of the corresponding screen region. Also, for example, as illustrated in the drawing, the application graphics is displayed in a lower right edge region of the screen, but is intended to be recognized further in front of the subtitle. In this case, with the disparity information set creating unit 131, a disparity vector for providing disparity to the application graphics is created from the display region of this application graphics, and the disparity vector of the corresponding screen region.

Here, the disparity information set creating unit 131 has the viewer function as described above. With this disparity information set creating unit 131, a stereoscopic image such as illustrated in (a) in FIG. 26 is actually displayed. Therefore, the stereoscopic image data (left eye image data, right eye image data) output from the data extracting unit 130 is supplied to this disparity information set creating unit 131. Also, as to this disparity information set creating unit 131, the subtitle data or graphics data generated at the subtitle and graphics generating unit 118, and also the text data (including closed caption data) generated at the text generating unit 120 are supplied.

As to each set of the disparity information sets created at the disparity information set creating unit 131 and transmitted along with stereoscopic image data, a disparity sequence ID (Disparity_Sequence_id) is added. This disparity sequence ID is identification information indicating the type of superposition information where disparity information included in a disparity information set should be used. According to this disparity sequence ID, identification is made regarding whether the disparity information set is a general-purpose disparity information set or disparity information set for a particular service application. Also, according to this identification information, identification is made regarding what kind of disparity information set for a particular service application the disparity information set for a particular service application is.

As illustrated in FIG. 27, Disparity_Sequence_id=0 indicates a general-purpose disparity information set. This disparity information set is created based on disparity information recorded beforehand. In the event that this disparity information set has no association with a particular service, there is no need to associate with a particular service using, for example, a disparity linkage descriptor (Disparity_Linkage_Descriptor) or the like. Also, Disparity_Sequence_id=1 through 255 indicates a disparity information set for a particular service application associated by, for example, a disparity linkage descriptor or the like.

[Disparity Information Set]

With regard to the disparity information sets created at the disparity information set creating unit 131, description will further be made regarding each of the above cases (1) through (4).

"Case (1)"

The case (1) is a case where a general-purpose disparity information set alone is transmitted as described above. With this case (1), a general-purpose disparity information set alone is created. Note that, with this case (1), disparity information included in the disparity information set has no relationship with a particular service.

Figure 28:
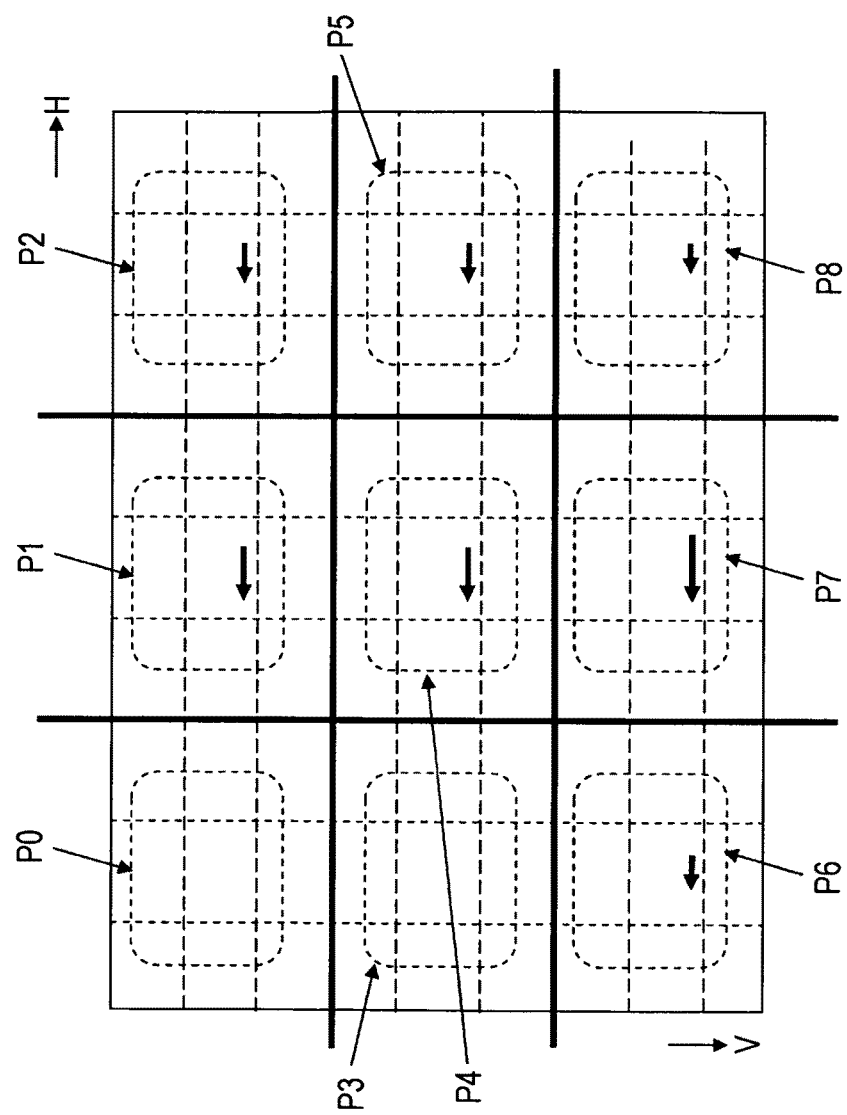
FIG. 28 is a diagram illustrating an example of a disparity information set to be created in Case (1) (a general-purpose disparity information set alone is transmitted (in the event of having no relationship with a particular service)).

FIG. 28 illustrates an example of a disparity information set created in this case (1). With this example, the disparity information set includes disparity vectors (disparity vectors in the horizontal direction) P0 through P8 belonging to each screen region obtained by the screen being divided into nine. Each of the disparity vectors P0 through P8 is obtained, for example, by the above downsizing processing using the disparity vector for each pixel. In FIG. 28, an arrow indicates a disparity vector, and the length of the arrow corresponds to the size of the disparity vector.

Figure 29:
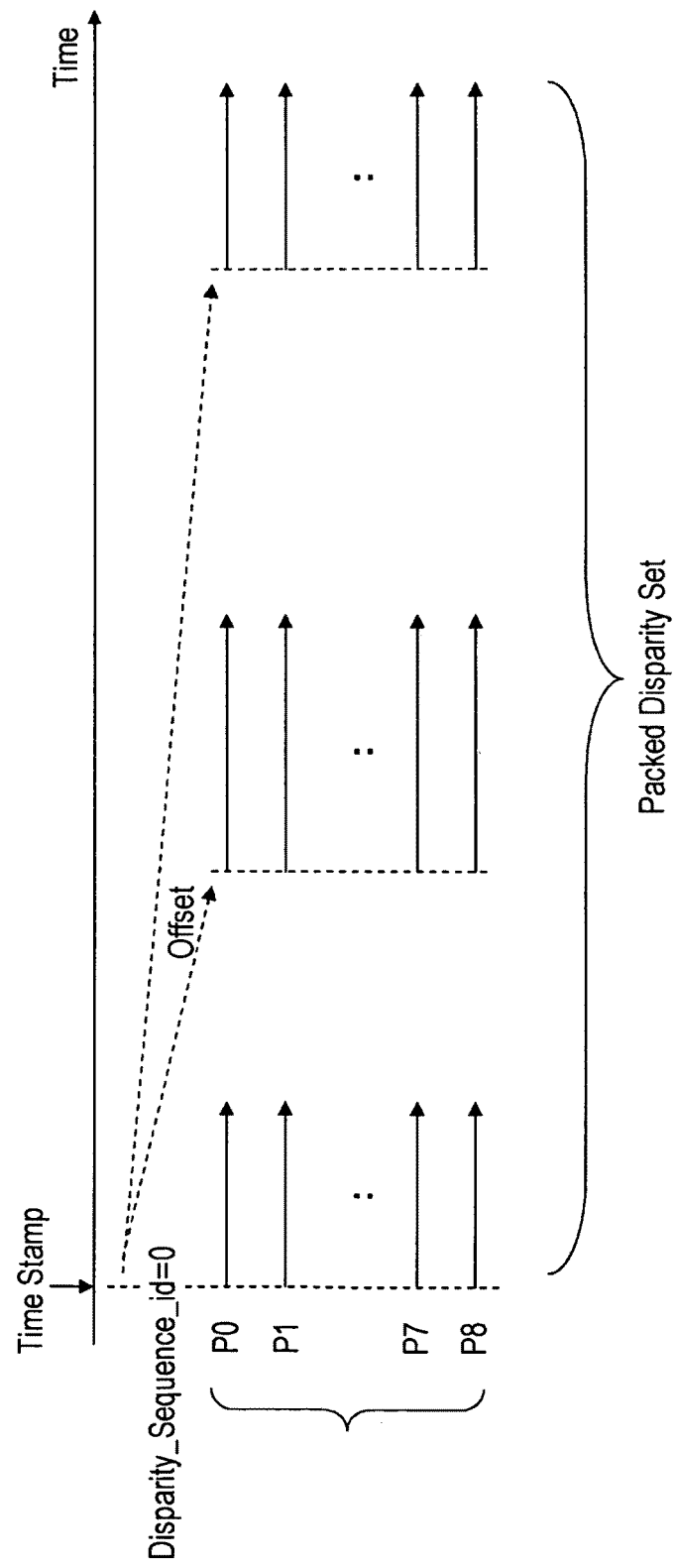
FIG. 29 is a diagram illustrating that a group of multiple disparity information sets corresponding to image data for each certain period of time of image data (Packed Disparity Set) is collectively transmitted in Case (1), and so forth.

This disparity information set is a general-purpose disparity information set. Therefore, identification information "Disparity_Sequence_id" to be added to this disparity information set is, as illustrated in FIG. 29, set to "0" indicating that this disparity information set is a general-purpose disparity information set.

Here, this general-purpose disparity information set is a disparity information set for each predetermined unit of image data, e.g., for each picture of encoded video. The image data is sectioned for each period of time, and a group of multiple disparity information sets (Packed Disparity Set) corresponding to the image data of each period of time is transmitted prior to transmission of the image data of each period of time, which will be described later. Therefore, as to a predetermined unit-based disparity information set, as illustrated in FIG. 29, offset (Offset) is added as time information indicating timing for using the disparity information set thereof. The offset that is added to each of the disparity information sets indicates time from the use time of the first disparity information set indicated with a timestamp (Time Stamp).

"Case (2)"

The case (2) is a case where a general-purpose disparity information set alone is transmitted as described above. With this case (2), a general-purpose disparity information set alone is created. Note that, with this case (2), disparity information included in the disparity information set has relationship with a particular service.

Figure 30:
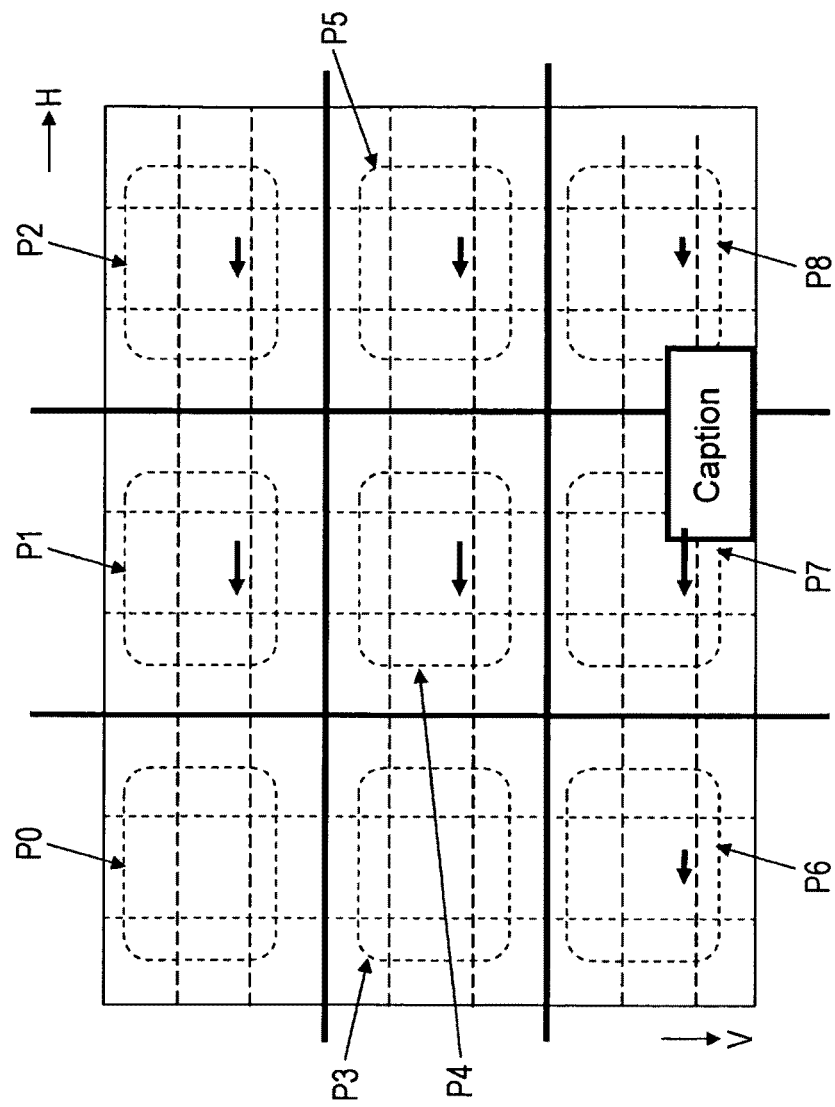
FIG. 30 is a diagram illustrating an example of a disparity information set to be created in Case (2) (a general-purpose disparity information set alone is transmitted (in the event of having relationship with a particular service)).

FIG. 30 illustrates an example of a disparity information set created in this case (2). With this example, the disparity information set includes disparity vectors (disparity vectors in the horizontal direction) P0 through P8 belonging to each screen region obtained by the screen being divided into nine. Each of the disparity vectors P0 through P8 is obtained, for example, by the above downsizing processing using the disparity vector for each pixel. In FIG. 30, an arrow indicates a disparity vector, and the length of the arrow corresponds to the size of the disparity vector.

Figure 31:
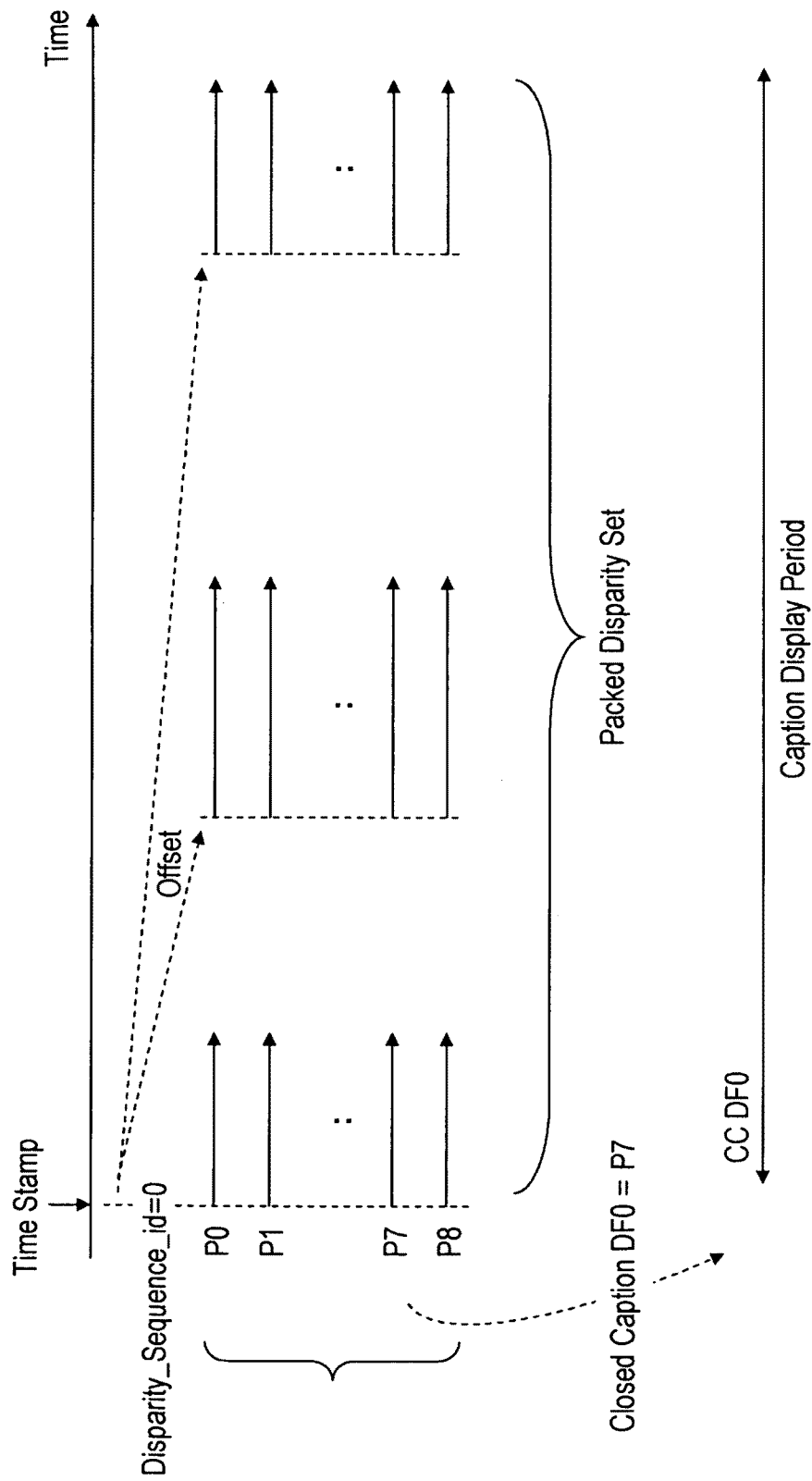
FIG. 31 is a diagram illustrating that a group of multiple disparity information sets corresponding to image data for each certain period of time of image data (Packed Disparity Set) is collectively transmitted in Case (2), and so forth.

This disparity information set is a general-purpose disparity information set. Therefore, identification information "Disparity_Sequence id" to be added to this disparity information set is, as illustrated in FIG. 31, set to "0" indicating that this disparity information set is a general-purpose disparity information set.

Here, this general-purpose disparity information set is a disparity information set for each predetermined unit of image data, e.g., for each picture of encoded video. The image data is sectioned for each period of time, and a group of multiple disparity information sets (Packed Disparity Set) corresponding to the image data of each period of time is transmitted prior to transmission of the image data of each period of time, which will be described later. Therefore, as to a predetermined unit-based disparity information set, as illustrated in FIG. 31, offset (Offset) is added as time information indicating timing for using the disparity information set thereof. The offset that is added to each of the disparity information sets indicates time from the use time of the first disparity information set indicated with a timestamp (Time Stamp).

As described above, with this case (2), disparity information included in a disparity information set has relationship with a particular service. FIG. 31 illustrates an example wherein the disparity vector P7 and closed caption data DF0 are associated. Note that the closed caption information according to this closed caption data DF0 is, as illustrated in FIG. 30, displayed on a screen region to which the disparity vector P7 belongs. In this case, a component element ID (Component_Element ID) indicating the screen region where this closed caption information is displayed, and the disparity vector P7 are associated.

FIG. 32 illustrates, in this case, an example of an association table (Component_Linked_Info) between a component element ID and a disparity vector. In this case, the object position of a disparity vector is determined by a partition position ID (Partition_Position_ID). This partition position ID indicates what number of screen region of multiple screen regions the screen region determined by the number of divisions, or block size is.

Note that the example illustrated in FIG. 31 illustrates an example wherein one closed caption data is associated with one piece of disparity information. However, it can also be conceived that one closed caption data is associated with a plurality of disparity information. Thus, in the event that one closed caption data is associated with a plurality of disparity information, the reception side can select and use one piece of the disparity information for providing disparity to the closed caption information according to the closed caption data thereof.

Figure 33:
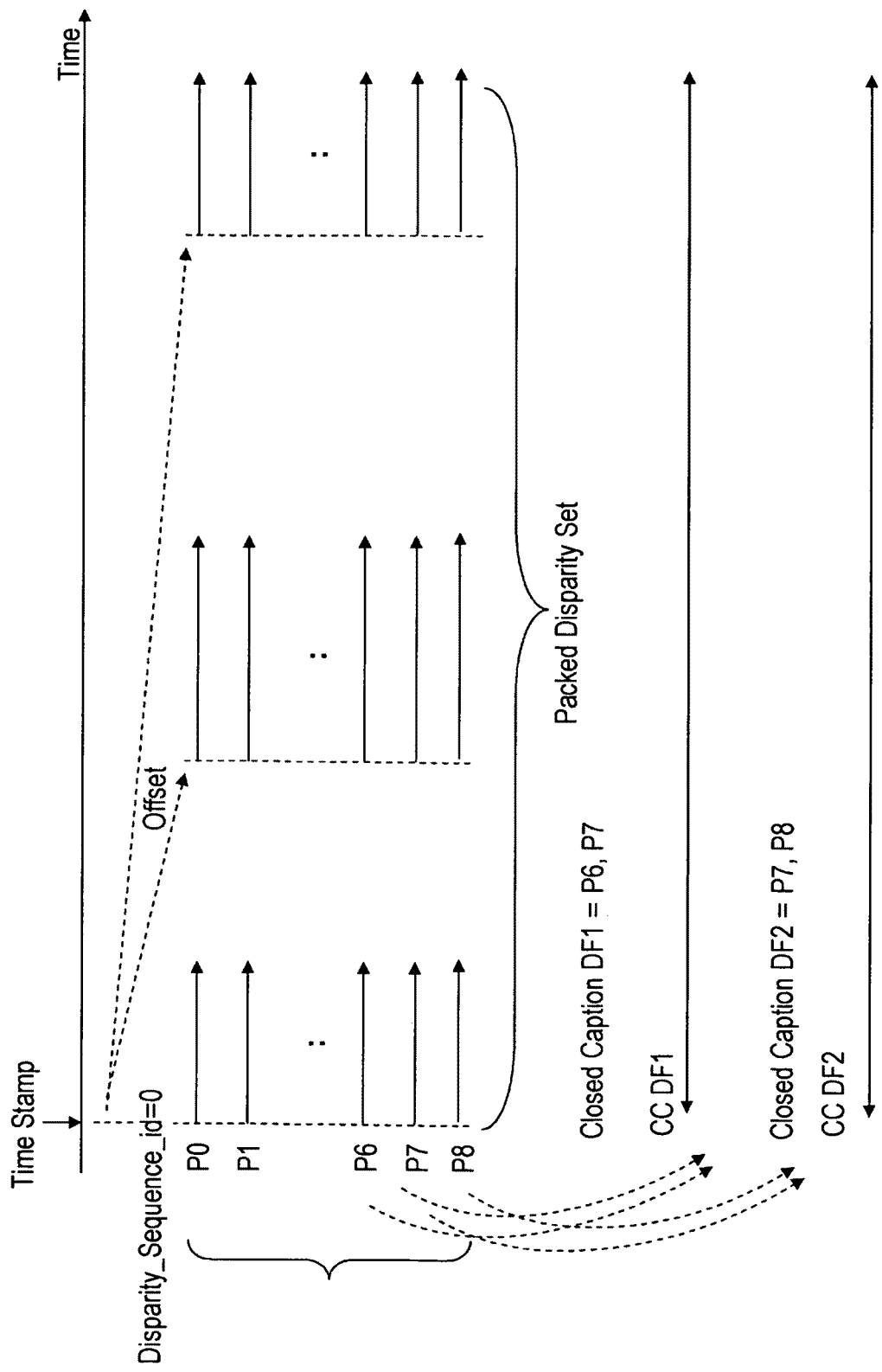
FIG. 33 is a diagram illustrating that a group of multiple disparity information sets corresponding to image data for each certain period of time of image data (Packed Disparity Set) is collectively transmitted in Case (2), and so forth.

FIG. 33 illustrates an example wherein disparity vectors P6 and P7, and closed caption data DF1 are associated, and further, disparity vectors P7 and P8, and closed caption data DF2 are associated. In this case, a component element ID indicating a screen region for displaying closed caption information according to the closed caption data DF1, and the disparity vectors P6 and P7 are associated. Also, similarly, a component element ID indicating a screen region for displaying closed caption information according to the closed caption data DF2, and the disparity vectors P7 and P8 are associated.

FIG. 34 illustrates, in this case, an example of an association table (Component_Linked_Info) between a component element ID and a disparity vector. In this case, a disparity vector is determined by a partition position ID (Partition_Position_ID). This partition position ID indicates what number of screen region of multiple screen regions the screen region determined by the number of divisions, or block size is.

"Case (3)"

The case (3) is a case where both of a general-purpose disparity information set, and a disparity information set for a particular service application are transmitted as described above. With this case (3), both of a general-purpose disparity information set, and a disparity information set for a particular service application are created. In this case, identification information (Disparity_Sequence_id) to be added to a general-purpose disparity information set is set to "0". Also, identification information (Disparity_Sequence_id) to be added to a disparity information set for a particular service application is set to a value other than "0". Association of identification information (Disparity_Sequence_id) as to a service is performed, for example, by the information thereof being inserted into user data as described above. Alternatively, this association is performed, for example, using a disparity linkage descriptor (Disparity_Linkage_Descriptor) as described above.

Figure 35:
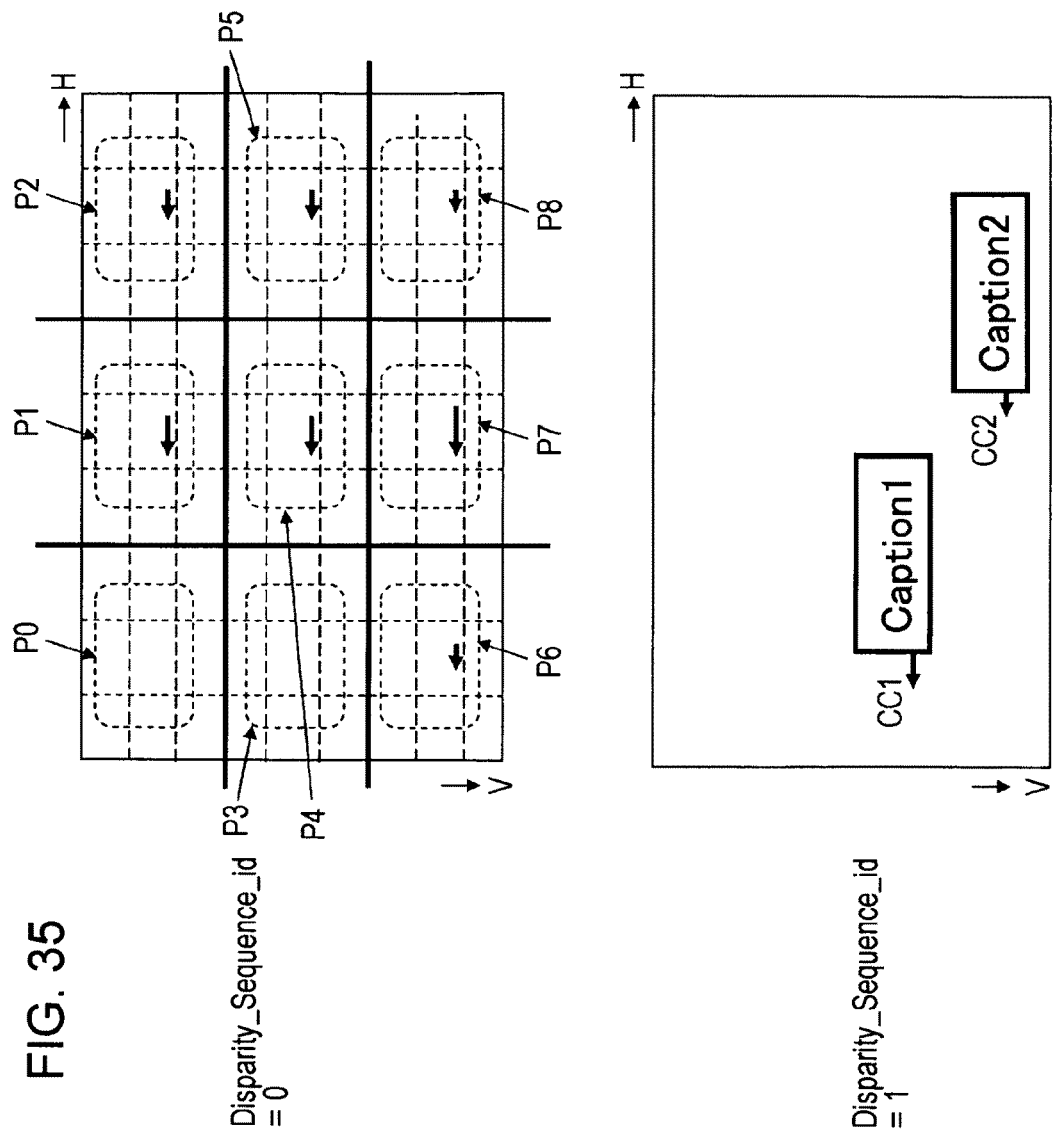
FIG. 35 is a diagram illustrating an example of a disparity information set to be created in Case (3) (both of a general-purpose disparity information set and a disparity information set for a particular service application are transmitted).

FIG. 35 illustrates an example of a disparity information set created in this case (3). With this example, the general-purpose disparity information set includes disparity vectors (disparity vectors in the horizontal direction) P0 through P8 belonging to each screen region obtained by the screen being divided into nine. Each of the disparity vectors P0 through P8 is obtained, for example, by the above downsizing processing using the disparity vector for each pixel. In FIG. 35, an arrow indicates a disparity vector, and the length of the arrow corresponds to the size of the disparity vector.

Also, a disparity information set for closed captions is created as a disparity information set for a particular service application. This disparity information set for closed captions includes a disparity vector CC1 corresponding to closed caption information "Caption1", and a disparity vector CC2 corresponding to closed caption information "Caption2".

Figure 36:
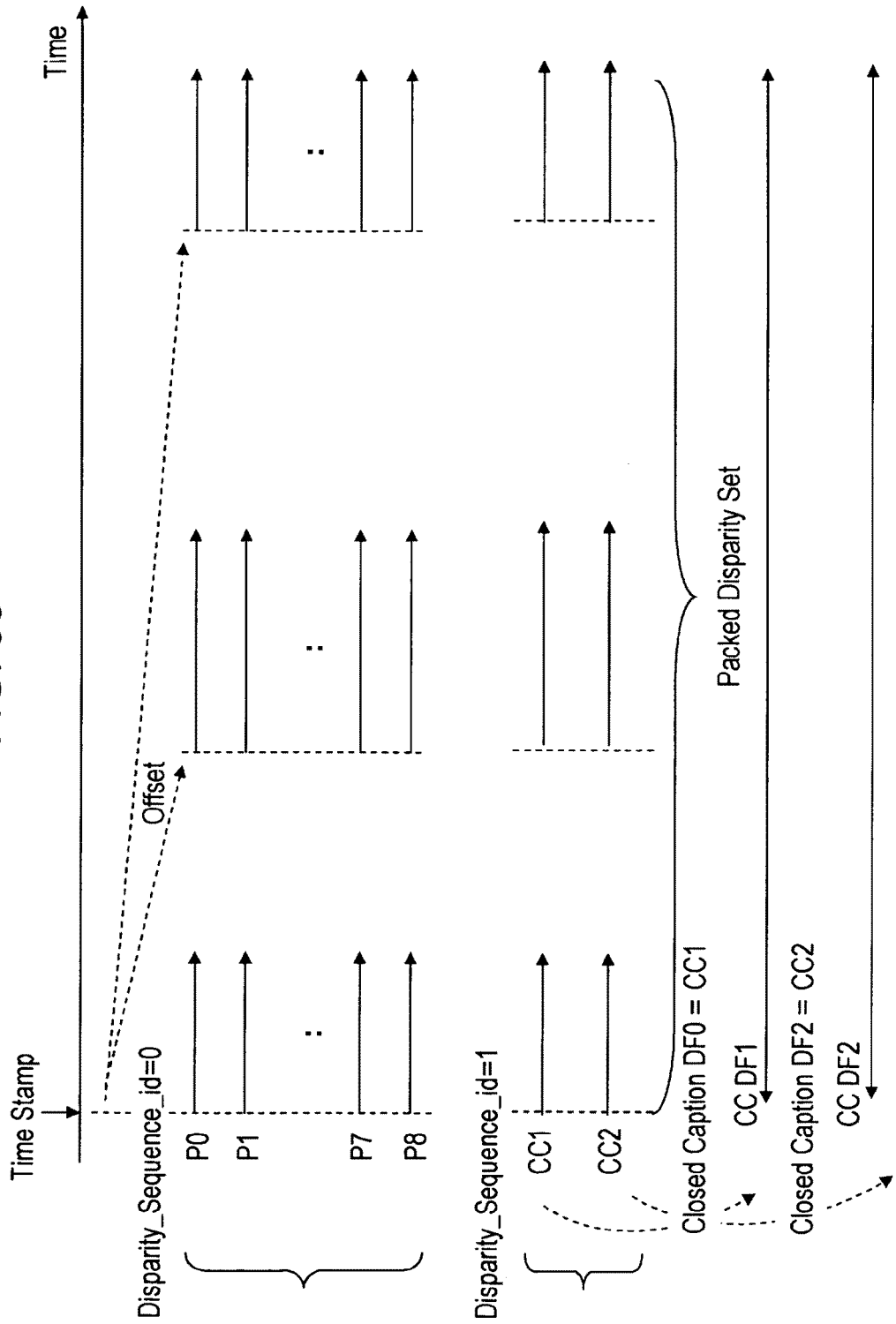
FIG. 36 is a diagram illustrating that a group of multiple disparity information sets corresponding to image data for each certain period of time of image data (Packed Disparity Set) is collectively transmitted in Case (3), and so forth.

Here, the general-purpose disparity information set is a disparity information set for each predetermined unit of image data, e.g., for each picture of encoded video. The image data is sectioned for each period of time, and a group of multiple disparity information sets (Packed Disparity Set) corresponding to the image data of each period of time is transmitted prior to transmission of the image data of each period of time, which will be described later. Therefore, as to a predetermined unit-based disparity information set, as illustrated in FIG. 36, offset (Offset) is added as time information indicating timing for using the disparity information set thereof. The offset that is added to each of the disparity information sets indicates time from the use time of the first disparity information set indicated with a timestamp (Time Stamp).

As described above, a disparity information set for a particular service application is a disparity information set for closed captions. FIG. 35 illustrates an example wherein the disparity vector CC1 and closed caption data DF1 are associated, and the disparity vector CC2 and closed caption data DF2 are associated. In this case, a component element ID (Component_Element ID) indicating the screen region where this closed caption information is displayed, and the disparity vectors CC1 and CC2 are associated.

FIG. 37 illustrates, in this case, an association table (Component_Linked_Info) between a component element ID and a disparity vector. In this case, the object position of a disparity vector is determined by a partition position ID (Partition_Position_ID). This partition position ID indicates what number of screen region of multiple screen regions the screen region determined by the number of divisions, or block size is.

"Case (4)"

The case (4) is a case where a disparity information set for a particular service application alone is transmitted as described above. With this case (4), a disparity information set for a particular service application alone is created. In this case, identification information (Disparity_Sequence_id) to be added to a disparity information set for a particular service application is set to a value other than "0". Association of identification information (Disparity_Sequence_id) as to a service is performed, for example, by the information thereof being inserted into user data as described above. Alternatively, this association is performed, for example, using a disparity linkage descriptor (Disparity_Linkage_Descriptor) as described above.

Figure 38:
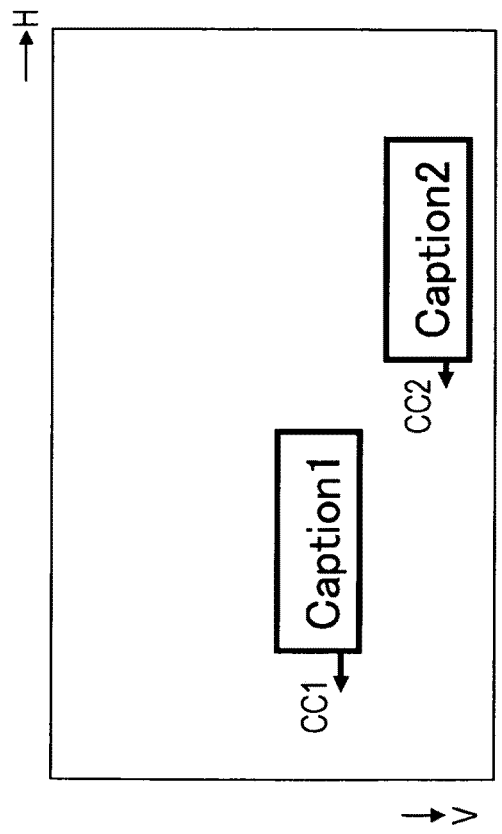
FIG. 38 is a diagram illustrating an example of a disparity information set to be created in Case (4) (a disparity information set for a particular service application alone is transmitted).

FIG. 38 illustrates an example of a disparity information set created in this case (4). With this example, a disparity information set for closed captions is created as a disparity information set for a particular service application. This disparity information set for closed captions includes a disparity vector CC1 corresponding to closed caption information "Caption1", and a disparity vector CC2 corresponding to closed caption information "Caption2".

Figure 39:
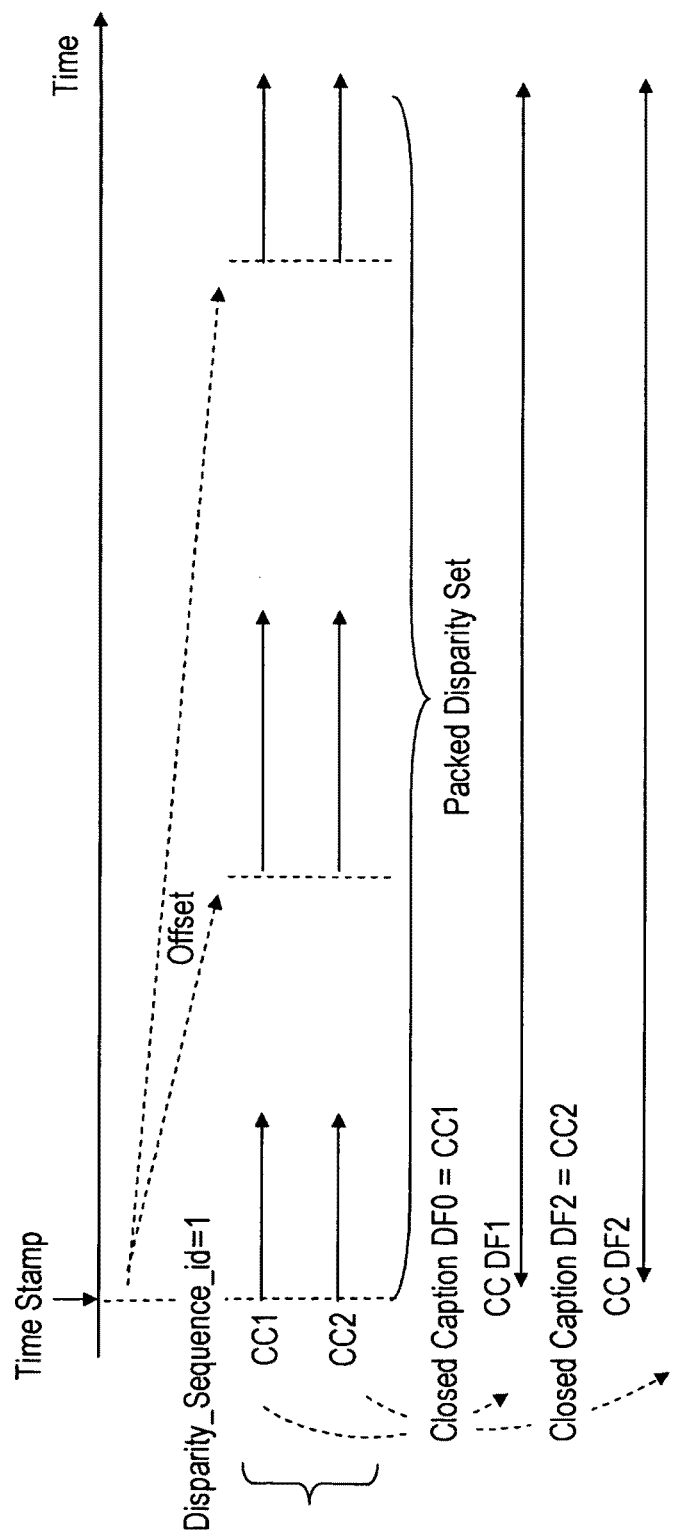
FIG. 39 is a diagram illustrating that a group of multiple disparity information sets corresponding to image data for each certain period of time of image data (Packed Disparity Set) is collectively transmitted in Case (4), and so forth.

Here, the disparity information set is a disparity information set for each predetermined unit of image data, e.g., for each picture of encoded video. The image data is sectioned for each period of time, and a group of multiple disparity information sets (Packed Disparity Set) corresponding to the image data of each period of time is transmitted prior to transmission of the image data of each period of time, which will be described later. Therefore, as to a predetermined unit-based disparity information set, as illustrated in FIG. 39, offset (Offset) is added as time information indicating timing for using the disparity information set thereof. The offset that is added to each of the disparity information sets indicates time from the use time of the first disparity information set indicated with a timestamp (Time Stamp).

As described above, a disparity information set for a particular service application is a disparity information set for closed captions. FIG. 39 illustrates an example wherein the disparity vector CC1 and closed caption data DF1 are associated, and the disparity vector CC2 and closed caption data DF2 are associated. In this case, a component element ID (Component_Element ID) indicating the screen region where this closed caption information is displayed, and the disparity vectors CC1 and CC2 are associated (see FIG. 37).

Note that in FIG. 32, FIG. 34, and FIG. 37, an example is illustrated wherein as an association table between a component element ID and a disparity vector, the component element IDs are the window IDs (Window ID) of closed captions. For example, in the event of a DVB subtitle, the component element IDs are the region IDs (Region_id) of DVB subtitles.

Figure 40:
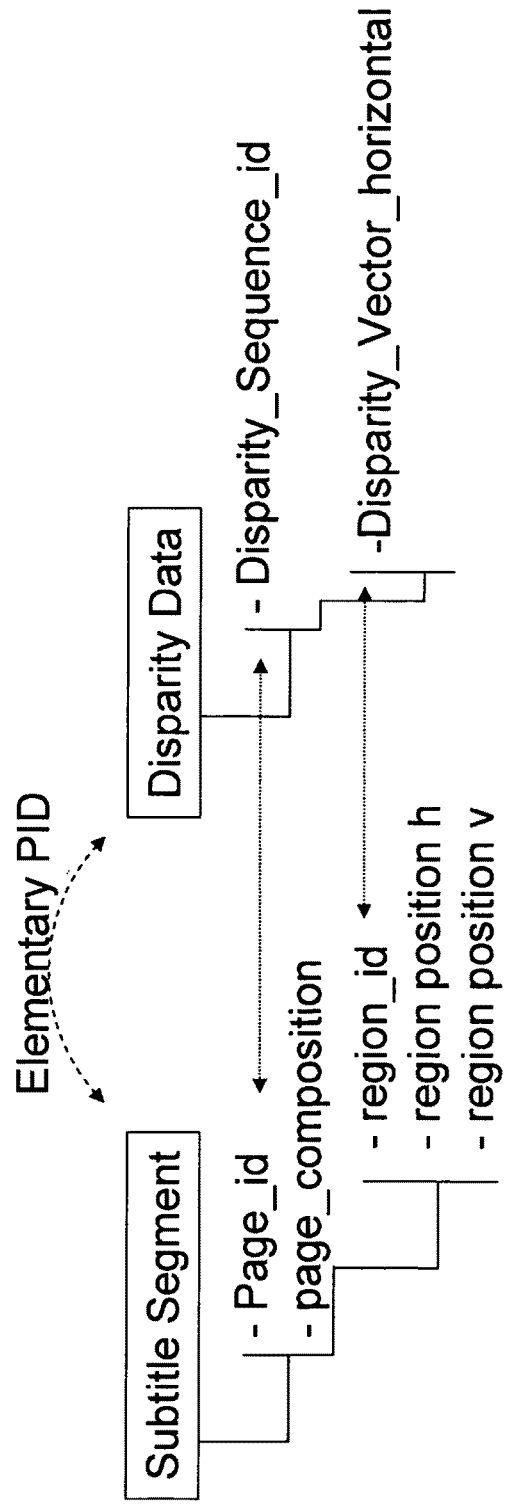
FIG. 40 is a diagram for describing association between a subtitle segment (Subtitle Segment) and a disparity vector data (Disparity Data) using an elementary PID (Elementary PID).

In the event of a DVB subtitle, for example, as illustrated in FIG. 40, association between a subtitle segment (Subtitle Segment) and disparity vector data (Disparity Data) is performed using an elementary PID (Elementary PID). Subsequently, the page ID (Page id) within the subtitle segment, and the identification information (Disparity_Sequence_id) of the disparity vector data are associated. Further, the region ID Region ID) and the disparity vector (Disparity_Vector_horizontal) are associated.

The video encoder 113 subjects the stereoscopic image data supplied from the data extracting unit 130 to encoding, such as MPEG4-AVC, MPEG2, VC-1, or the like, to obtain encoded video data. Also, the video encoder 113 generates an elementary stream of video including encoded video data at the payload portion by the stream formatter 113a provided to the subsequent stage. As described above, the predetermined sets of disparity information sets created at the disparity information set creating unit 131 are supplied to the stream formatter 113a within the video encoder 113. The stream formatter 113a embeds the predetermined sets of disparity information sets in the stream of video as user data.

Figure 41:
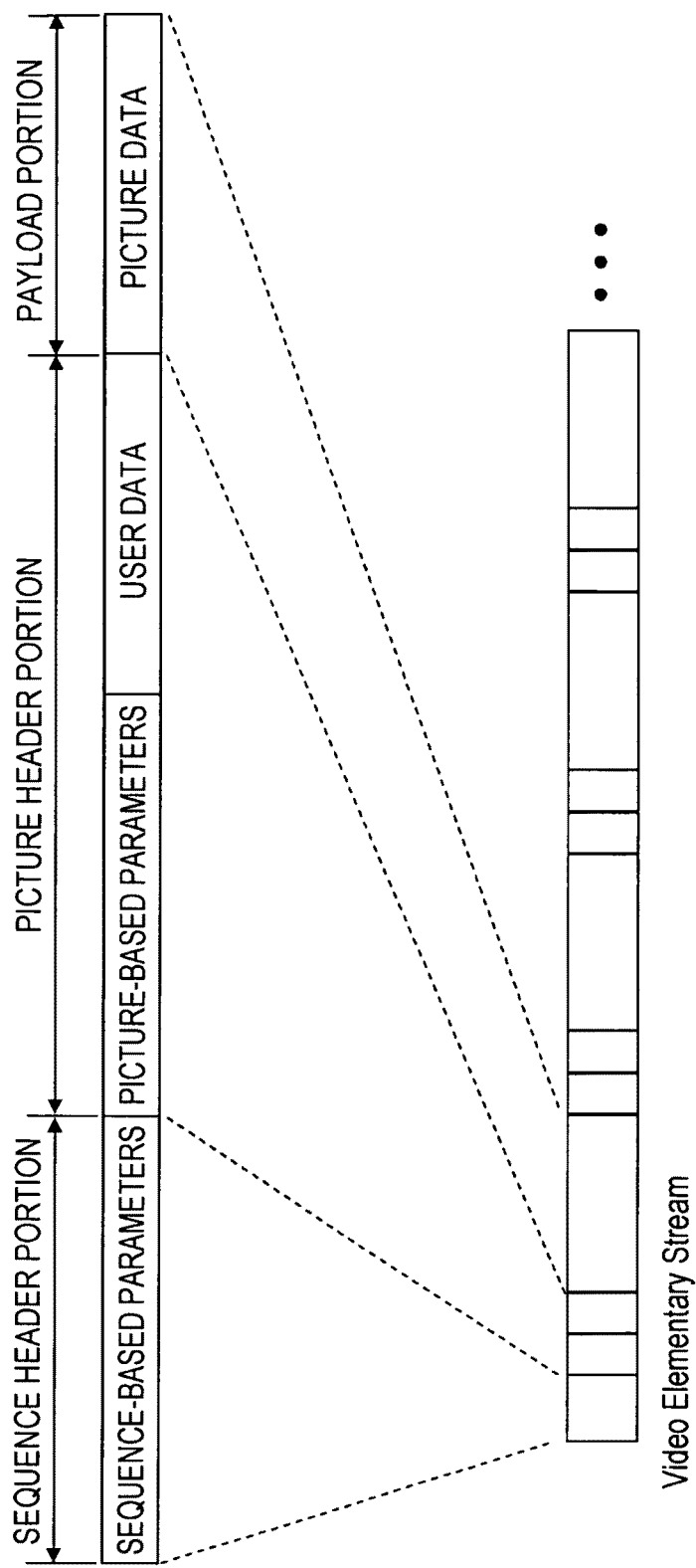
FIG. 41 is a diagram schematically illustrating a structure example of a video elementary stream.

FIG. 41 schematically illustrates a structure example of a video elementary stream (Video Elementary Stream). With a video elementary stream, a sequence header portion including sequence-based parameters is disposed on the head. Subsequently to this sequence header portion, a picture header including picture-based parameters and user data is disposed. Subsequently to this picture header portion, a payload portion including picture data is disposed. Hereafter, the picture header portion and payload portion are repeatedly disposed.

The above disparity information set is, for example, embedded in the user data region of the picture header portion. FIG. 42 illustrates a structure example of the user data. (a) in FIG. 42 illustrates the structure of the user data in the event that the encoding method is MPEG2. (b) in FIG. 42 illustrates the structure of the user data in the event that the encoding method is H.264 AVC (MPEG4-AVC). Further, (c) in FIG. 42 illustrates the structure of the user data in the event that the encoding method is VC-1.

While detailed description will be omitted, the structure of the user data of each method is generally the same structure. Specifically, first, code indicating the start of the user data is disposed, and subsequently, an identifier "user_identifier" indicating the type of the data is disposed, and further thereafter a data main body "user_structure" is disposed. The detailed structure of the user data including disparity information (Disparity_Information) will be described later.

The audio encoder 117 subjects the audio data supplied from the data extracting unit 130 to encoding, such as MPEG-2 Audio AAC or the like, to generate an audio elementary stream. The multiplexer 122 multiplexes the packetized elementary stream output from the encoders 113, 117, 119, and 121. Subsequently, this multiplexer 122 outputs bit stream data (transport stream) BSD serving as transmission data.

While detailed description will be omitted, the others of the transmission data generating unit 110D illustrated in FIG. 22 are configured in the same way as with the transmission data generating unit 110 illustrated in FIG. 2.

The operation of the transmission data generating unit 110D illustrated in FIG. 22 will simply be described. The stereoscopic image data output from the data extracting unit 130 is supplied to the video encoder 113. With this video encoder 113, the stereoscopic image data is subjected to encoding, such as MPEG-4-AVC, MPEG2, VC-1, or the like, and a video elementary stream including encoded video data is generated. This video elementary stream is supplied to the multiplexer 122.

Also, the disparity vector for each pixel output from the data extracting unit 130 is supplied to the disparity information set creating unit 131. With this disparity information set creating unit 131, this disparity vector is subjected to downsizing processing or the like, and predetermined sets of disparity information sets to be transmitted are created (cases (1) through (4)). The predetermined sets of disparity information sets created at this disparity information set creating unit 131 are supplied to the stream formatter 113a within the video encoder 113. With the stream formatter 113a, predetermined sets of disparity information sets are embedded in a video stream as the user data.

Also, the audio data output from the data extracting unit 130 is supplied to the audio encoder 117. With this audio encoder 117, the audio data is subjected to encoding, such as MPEG-2 Audio AAC or the like, and an audio elementary stream including encoded audio data is generated. This audio elementary stream is supplied to the multiplexer 122.

Also, an elementary stream including the encoded data of subtitle data or graphics data is supplied to the multiplexer 122 from the subtitle and graphics encoder 119. Further, an elementary stream including the encoded data of text data is supplied to the multiplexer 122 from the text encoder 121. Subsequently, with the multiplexer 122, the packet of the elementary stream supplied from each encoder is multiplexed, and bit stream data (transport stream) BSD serving as transmission data is obtained.

[Association Between Service Component and Disparity Information for Each Stream, Association Between Disparity Information Set Identification Information and Service]

Association between a service component and disparity information of each associated stream is performed using a disparity linkage descriptor (Disparity_Linkage_Descriptor). Also, according to this disparity linkage descriptor, association between disparity information set identification information (Disparity_Sequence_id) and a service of each stream is also performed. This disparity linkage descriptor is disposed in the header region of a multiplexed stream, or a descriptor table such as a PMT within a multiplexed stream, or the like.

FIG. 43 illustrates a structure example of the disparity linkage descriptor in this case. FIG. 44 illustrates the content of each piece of information in the structure illustrated in FIG. 43. "descriptor_tag" is 8-bit data indicating the type of a descriptor. Here, "0xD0" is set thereto, which indicates that this is a disparity linkage descriptor. "descriptor_length" is 8-bit data indicating the length (size) of this information.

"number_of_Linked_Streams" is 5-bit data indicating the number of elementary streams associated by association between two streams being defined from a point of view of disparity information data (Disparity Data). "ElementaryPID_of_disparity" is 13-bit data indicating the PID (program ID) of an elementary stream (PES) including disparity information data (Disparity Data). "ElementaryPID_of_Service_Component" is 13-bit data indicating the PID (program ID) of an elementary stream (PES) including a service component such as a subtitle, caption, text, or graphics. According to these two PIDs, association between disparity information and a service component is performed for each associated elementary stream.

"number_of_linked_sequences" is 5-bit data indicating the number of disparity information sets (Disparity Information) to be associated so as to correspond to each of the above associated elementary streams. "Service_id" is 32-bit data indicating a unique word for service identification. For example, "0x47413934" is allocated for ATSC. "Data_Type" is 8-bit data indicating the data type of a service identified by "Service_id". For example, "0x03" indicates closed caption data.

A disparity sequence ID "Disparity_Sequence_id", and a service page ID "Service_page_id" are disposed for the worth indicated by "number_of_linked_sequences". The "Disparity_Sequence_id" is 8-bit data that is identification information for identifying each service. The "Service_page_id" is 8-bit data for determining a service such as a subtitle page. Thus, predetermined "Service_id(i)" and "Data_Type(i)" are associated with a predetermined number of disparity sequence IDs, and service page IDs.

Description will be made regarding a specific example of each item in the structure example of the disparity linkage descriptor illustrated in FIG. 43. (a) in FIG. 45 illustrates an example of the PID in the event that a disparity information set is transmitted to the reception side by being inserted into the user data region of an image data stream, like the transmission data generating unit 110D in FIG. 22. With this example, the disparity linkage descriptor (Disparity_Linkage_Descriptor) is in the PMT within a multiplexed stream (TS).

Subsequently, with this example, the PID of a video (image data) elementary stream (PES) including disparity information data (Disparity Data) included in the multiplexed stream (TS) is set to "PID_0". Also, with this example, the PID of the audio elementary stream (PES) included in the multiplexed stream (TS) is set to "PID_1". Further, with this example, the PID of the subtitle elementary stream (PES) included in the multiplexed stream (TS) is set to "PID_2".

(b) in FIG. 45 illustrates an example of the PID in the event that the elementary stream (PES) of a disparity vector including disparity information set is generated, and this independent stream is multiplexed with another stream, and transmitted to the reception side, like a later-described transmission data generating unit 110E in FIG. 62. With this example, the disparity linkage descriptor (Disparity_Linkage_Descriptor) is disposed in the PMT within the multiplexed stream (TS).

Subsequently, with this example, the PID of a video (image data) elementary stream (PES) included in the multiplexed stream (TS) is set to "PID_0". Also, with this example, the PID of the audio elementary stream (PES) included in the multiplexed stream (TS) is set to "PID_1". Also, with this example, the PID of the subtitle elementary stream (PES) included in the multiplexed stream (TS) is set to "PID_2". Also, with this example, the PID of the subtitle elementary stream (PES) of a disparity vector included in the multiplexed stream (TS) is set to "PID_3".

(a) in FIG. 46 illustrates an example wherein a disparity information set to which "Disparity_Sequence_id=1" is added is associated (linked) with a subtitle. With this example, the disparity information set includes a disparity vector "Region1" corresponding to subtitle information "Subtitle1", and a disparity vector CC2 corresponding to a disparity vector "Region2" corresponding to a subtitle "Subtitle2". (b) in FIG. 46 illustrates an example wherein a disparity information set to which "Disparity_Sequence_id=2" is added is associated (linked) with a closed caption. With this example, the disparity information set includes a disparity vector CC1 corresponding to closed caption information "Caption1", and a disparity vector CC2 corresponding to closed caption information "Caption2".

Figure 47:
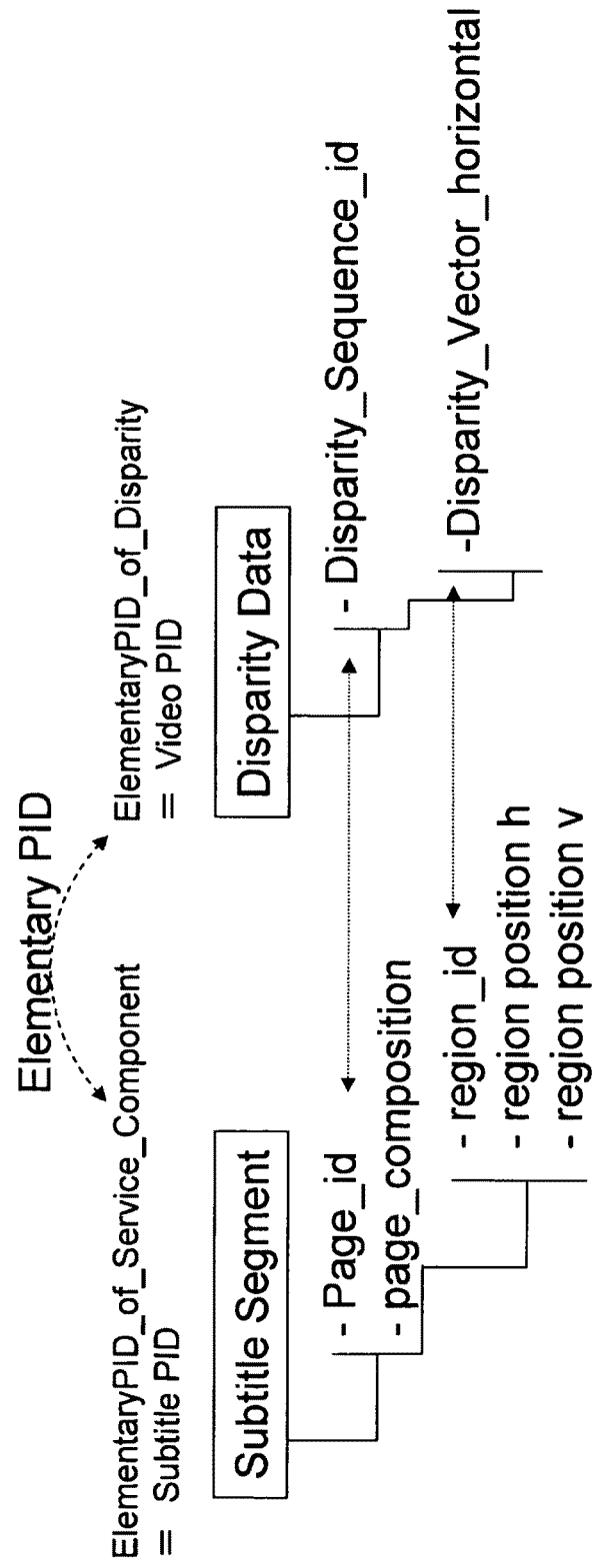
FIG. 47 is a diagram illustrating a case where a disparity information set is associated with a subtitle.

FIG. 47 illustrates a case where the disparity information set is associated with the subtitle in the event of the above (a) in FIG. 45. In this case, the "ElementaryPID_of_Service_Component" is set to the PID (Subtitle PID) of the subtitle elementary stream. Also, in this case, the "ElementaryPID_of_disparity" is set to the PID of the video elementary stream (Video PID).

Figure 48:
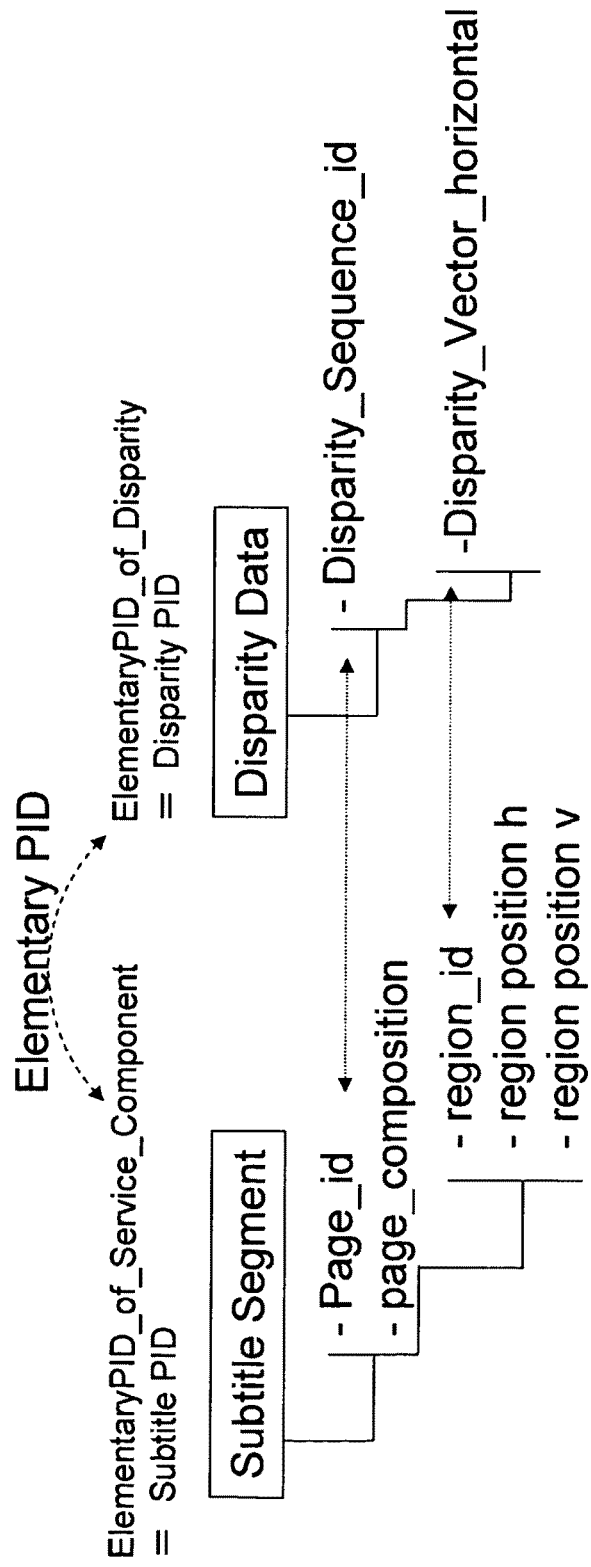
FIG. 48 is a diagram illustrating a case where a disparity information set is associated with a subtitle.

FIG. 48 illustrates a case where the disparity information set is associated with the subtitle in the event of the above (b) in FIG. 45. In this case, the "ElementaryPID_of_Service_Component" is set to the PID (Subtitle PID) of the subtitle elementary stream. Also, in this case, the "ElementaryPID_of_disparity" is set to the PID of the disparity vector elementary stream (Disparity PID).

Figure 49:
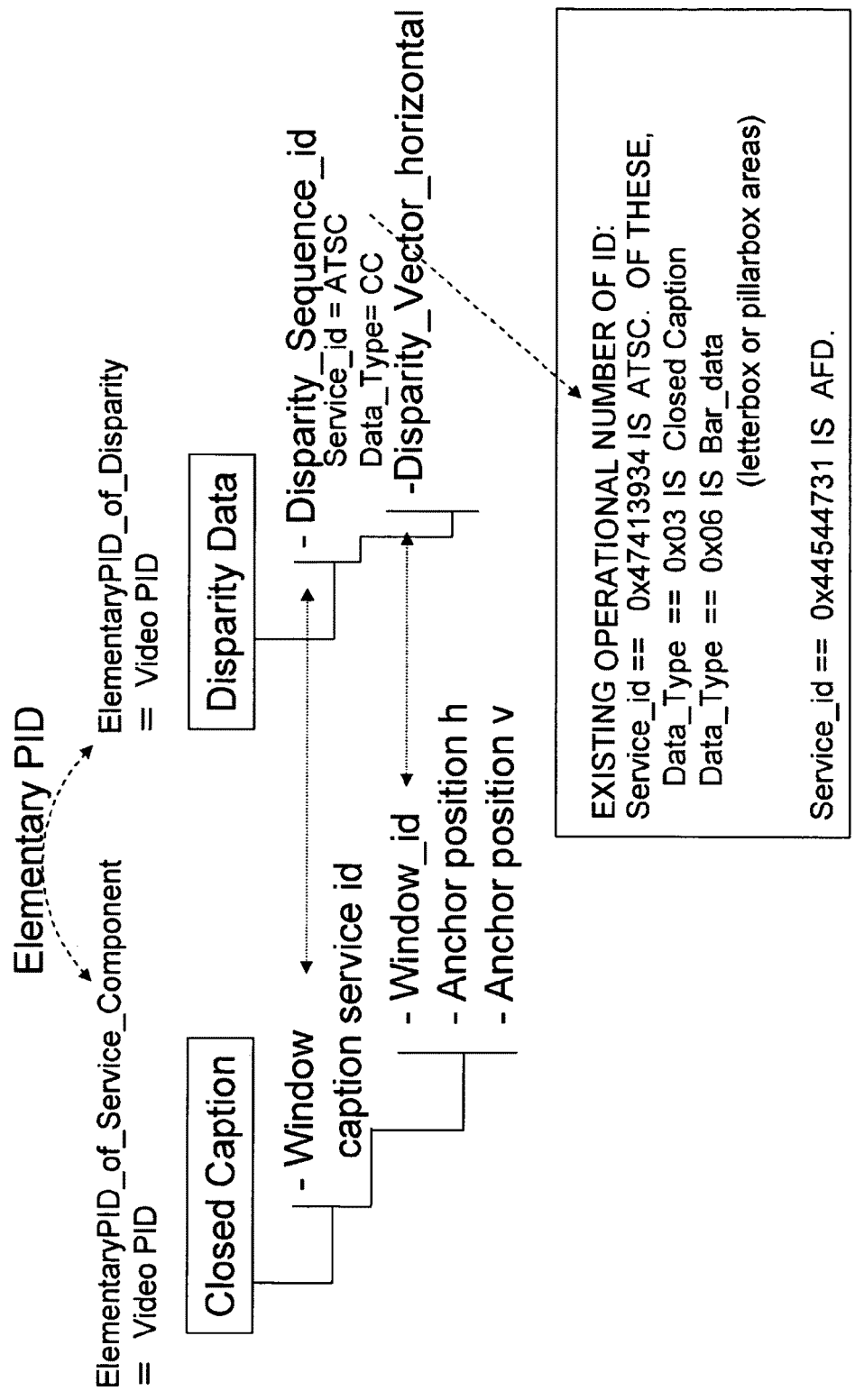
FIG. 49 is a diagram illustrating a case where a disparity information set is associated with a closed caption (however, closed caption data is transmitted to the reception side by being inserted into a user region of an image data stream).

FIG. 49 illustrates, in the event of the above (a) in FIG. 45 (however, the closed caption data is inserted into the user data region of the image data stream, and is transmitted to the reception side), a case where the disparity information set is associated with a closed caption. Here, "Service_id" indicates ATSC, and "Data_Type" indicates a closed caption (CC). In this case, "ElementaryPID_of_Service_Component" is set to the PID of the video elementary stream (Video PID). Also, in this case, "ElementaryPID_of_disparity" is also set to the PID of the video elementary stream (Video PID).

Note that, while detailed description will be omitted, the existing operation numbers of the ID are as follows, for example. Specifically, "Service_id=0x47413934" indicates "ATSC", of which "Data_Type=0x03" indicates "closed caption", "Data_Type=0x06" indicates "Bar_data (letterbox or pillar-box areas)". Also, "Service_id=0x44544731" indicates "AFD".

Figure 50:
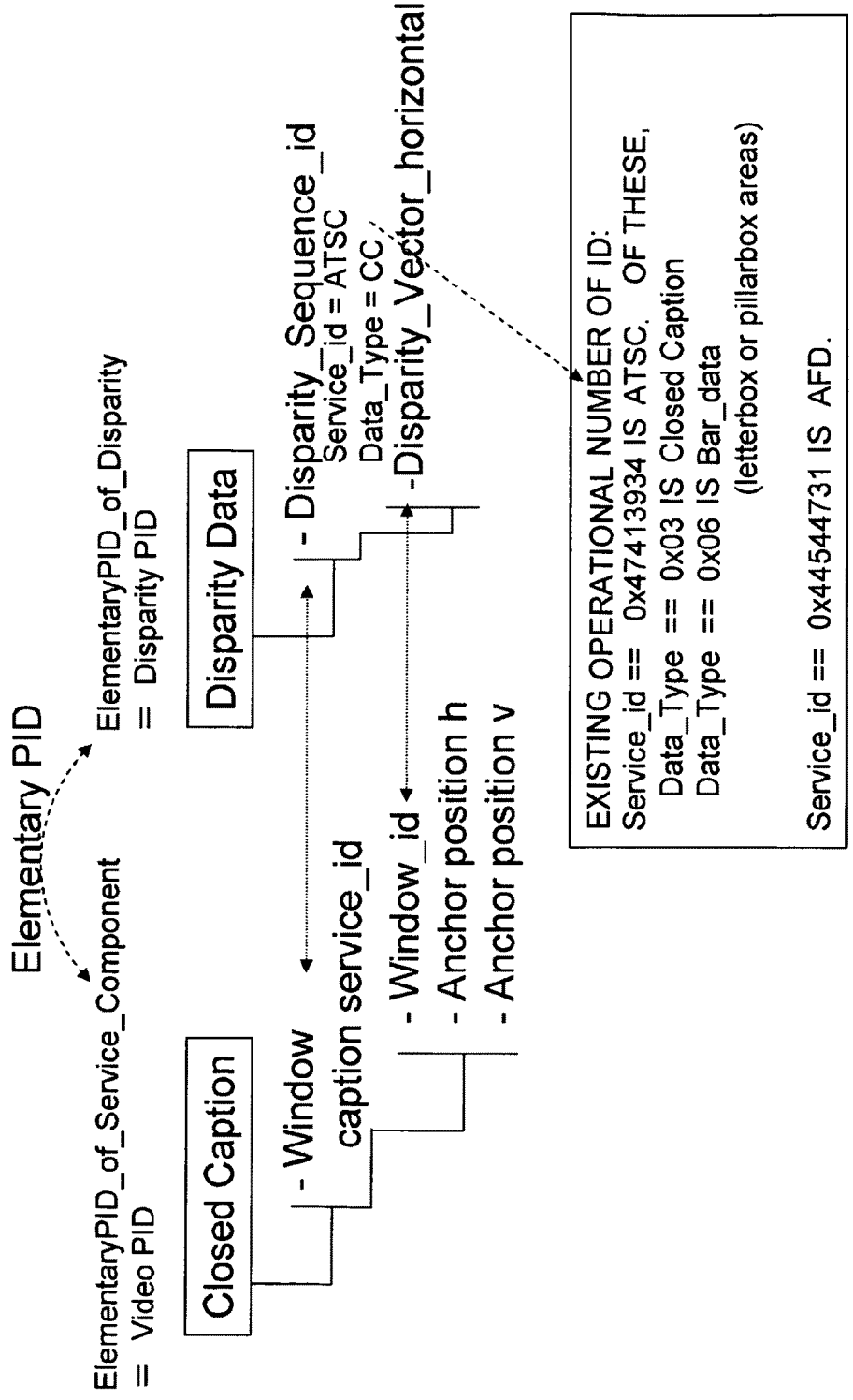
FIG. 50 is a diagram illustrating a case where a disparity information set is associated with a closed caption (however, closed caption data is transmitted to the reception side by being inserted into a user region of an image data stream).

FIG. 50 illustrates, in the event of the above (b) in FIG. 45 (however, the closed caption data is inserted into the user data region of the image data stream, and is transmitted to the reception side), a case where the disparity information set is associated with a closed caption. Here, "Service_id" indicates ATSC, and "Data_Type" indicates a closed caption (CC). In this case, "ElementaryPID_of_Service_Component" is set to the PID of the video elementary stream (Video PID). Also, in this case, "ElementaryPID_of_disparity" is also set to the PID of the disparity vector elementary stream (Disparity PID).

[Detailed Structure of User Data Including Disparity Information (Disparity_Information)]

FIG. 51 illustrates an example of the detailed structure of the user data including the disparity information (Disparity_Information). This example is an example in the event that the encoding method is MPEG2. When the data identifier after start code (user_data_start_code) is a disparity information identifier (Disparity_Information_identifier), the disparity information (Disparity_Information) is disposed as the subsequent data body.

FIG. 52 illustrates the structure of the disparity information (Disparity_Information), of which disparity information data (Disparity_Information_Data) is disposed. This disparity information data may have the same information as the above disparity linkage descriptor (Disparity_Linkage_Descriptor) in FIG. 43. In this case, this disparity information data includes DSL (Disparity_Information_Link_Information) of which the structure is illustrated in FIG. 53. Also, this disparity information data includes DHI (Disparity_Header_Information) of which the structure is illustrated in FIG. 54 and FIG. 55. Further, this disparity information data includes a DDS (Disparity Data Set) of which the structure is illustrated in FIG. 56. FIG. 57 through FIG. 60 illustrate the content of each piece of information in the structures illustrated in FIG. 53 through FIG. 56.

The DSL will be described with reference to FIG. 57. This DSL is information for associating between a disparity sequence ID (Disparity_Sequence_id) and a service. "Disparity_Info_Length" is 16-bit data indicating the length (size) of this information. "Disparity_Info_Type" is 2-bit data indicating the type of this information, and here set to "0x0" which indicates that this information is "DSL".

While detailed description will be omitted, each item of the "number_of_Linked_Streams", "ElementaryPID_of_disparity", "ElementaryPID_of_Service_Component", "number_of_linked_sequences", "Service_id", "Data_Type", and "Disparity_Sequence_id" is the same as described in FIG. 43.

The DHI will be described with reference to FIG. 54 and FIG. 55. This DHI also includes information for associating between a component of each service, and a partition position ID (Partition_Position_ID) for determining a disparity vector to be used for the component thereof. "Disparity_Info_Length" is 16-bit data indicating the length (size) of this information. "Disparity_Info_Type" is 2-bit data indicating the type of this information, and here set to "0x1" which indicates that this information is "DHI".

"Views_offset" is 1-bit data indicating whether expansion of offset is applied to "second view", e.g., a right eye image alone, or "both views", i.e., both of a left eye image and a right eye image. In the event of the "Views_offset" being "1", this indicates applying to "both views". In the event of "0", this indicates applying to "second view". "Disparity_precision" is 2-bit data indicating how much superposition information is shifted as to a disparity vector. In the event of the "Disparity_precision" being "0", this indicates shifting by the worth equivalent to ½ of the disparity vector. In the event of "1", this indicates shifting by the worth equivalent to the disparity vector.

In the event of "2", this indicates shifting by the worth of the number of units equivalent to the disparity vector with two pixels as one unit. For example, when the disparity vector is "7", this leads to shifting by 2×7=14 pixels. In the event of "3", this indicates shifting by the worth of the number of units equivalent to the disparity vector with three pixels as one unit. For example, when the disparity vector is "7", this leads to shifting by 3×7=21 pixels.

"Disparity_Sequence_id" is 8-bit data that is identification information for identifying each service. "Service_Linked_flag" is 1-bit data indicating whether or not there is a disparity vector (disparity information) associated with a service within the above DSL. In the event of the "Service_Linked_flag" being "1", this indicates that there is a disparity vector associated with a service. In the event of "0", this indicates that there is no disparity vector associated with a service.

"Target_Resolution_Type" is 2-bit data for determining the resolution of a disparity information set encoded as to target video. In the event of the "Target_Resolution_Type" being "0x0", this indicates resolution of 1920×1080. In the event of "0x1", this indicates resolution of 1440×1080. In the event of "0x2", this indicates resolution of 1280×720.

"Block_Size" is 2-bit data for determining a block size. This "Block_Size" is information indicating the size of a region making up information indicating a screen region. In the event of the "Block_Size" being "0x0", this indicates a block size of 16 pixels×16 pixels. In the event of "0x1", this indicates a block size of 32 pixels×32 pixels. In the event of "0x2", this indicates a block size of 64 pixels×64 pixels. Further, in the event of "0x3", this indicates a block size of 128 pixels×128 pixels.

"Link_source" indicates whether the disparity information set (source) is a general-purpose disparity information set or disparity information set for a particular service application. In the event of the "Link_source" being "1", this indicates that the disparity information set is a general-purpose disparity information set having the disparity vector of each screen region obtained by dividing the screen. In the event of "0", this indicates that the disparity information set is a disparity information set for a particular service application having a disparity vector corresponding to a service component element.

"Partition" indicates a screen partition pattern. This "Partition" is information indicating the number of screen partitions making up information indicating a screen region. In the event of "0x0", this indicates that, as illustrated in (a) in FIG. 61, the image (picture) region is not partitioned, and one disparity vector (disparity information) representing this image (picture) region is transmitted. In the event of the "Partition" being "0x1", this indicates that, as illustrated in (b) in FIG. 61, the image (picture) region is partitioned into four, and the four disparity vectors (disparity information) representing this each partitioned region are transmitted. In this case, the disparity vectors are disposed so that the disparity vector in the upper left region is the first, and the disparity vector in the lower right region is the last (in the sequence of 0 through 3 in (b) in FIG. 61).

In the event of "0x2", this indicates that, as illustrated in (c) in FIG. 61, the image (picture) region is partitioned into nine, and the nine disparity vectors (disparity information) representing this each partitioned region are transmitted. In this case, the disparity vectors are disposed so that the disparity vector in the upper left region is the first, and the disparity vector in the lower right region is the last (in the sequence of 0 through 8 in (c) in FIG. 61). In the event of "0x3", this indicates that, as illustrated in (d) in FIG. 61, the image (picture) region is partitioned into 16, and the 16 disparity vectors (disparity information) representing this each partitioned region are transmitted. In this case, the disparity vectors are disposed so that the disparity vector in the upper left region is the first, and the disparity vector in the lower right region is the last (in the sequence of 0 through 15 in (d) in FIG. 61).

In the event of "0x7", this indicates that the image (picture) region is partitioned into multiple blocks, and the multiple disparity vectors (disparity information) representing this each partitioned region are transmitted. In this case, the disparity vectors are disposed so that the disparity vector in the upper left region is the first, and the disparity vector in the lower right region is the last.

"Number_of_Component_Elements" is 13-bit data indicating the number of screen regions determined by the above "Partition" or "Block_Size", or the number of component elements within an associated service.

Subsequently, in the event that the above "Service_Linked_flag" is "1", component linkage information (Component_Linkage_Info) is disposed by the number of services associated with a disparity vector (disparity information) within a disparity information set. With this component linkage information, as illustrated in FIG. 55, association information between a component element and a disparity vector thereof is disposed by the number of component elements.

"Component_Element" is 8-bit data indicating a component element ID. Examples of the component element ID include the window ID (Window ID) of a closed caption, and the region ID (region_idga) of a DVB subtitle. "Element_Linkage_Length" is 8-bit data indicating the length (size) of information. "number_of_multiple_link" indicates the number of disparity vectors to be associated with a component element ID. "Partition_Position_id" is 13-bit data information for determining a disparity vector. This "Partition_Position_id" indicates what number of screen region of multiple screen regions the screen region determined by the above "Partition" or "Block_size" is.

The DDS will be described with reference to FIG. 56. This DDS includes the information of a disparity vector included in each disparity information set. "Disparity_Info_Length" is 16-bit data indicating the length (size) of this information. "Disparity_Info_Type" is 2-bit data indicating the type of this information, and here set to "0x2", which indicates that this information is "DID". "Disparity_Sequence_id" is 8-bit data for identifying whether the disparity information set is a general-purpose disparity information set or disparity information set for a particular service application, and in the event of for a particular service application, identifying the service thereof.

"Number_of_Component_Elements" is 13-bit data indicating the number of screen regions determined by the above "Partition" or "Block_Size", or the number of component elements within an associated service. The values of P disparity vectors included in a disparity information set to be used for each frame within a certain period of time of video data, e.g., within a 15-frame period of time are disposed. "Disparity_sets_in_period" is 8-bit data indicating the number of disparity vectors (disparity information) for providing offset included in a certain period of time of video data.

"Offset_Frame_In_disparity set" is time information indicating timing for using each disparity information set. This time information indicates time (number of frames) from the use time of the first disparity information set indicated by a timestamp (Time Stamp). "Disparity_Vector_Horizontal(i)" indicates the value of a disparity vector in the horizontal direction that is the value of the i'th disparity vector.

Note that, with the above description, an example has been illustrated wherein information for associating between a disparity sequence ID (Disparity_Sequence_id) and a service is disposed as a DSL in disparity information (Disparity_Information) serving as user data. However, it can also be conceived that association between a disparity sequence ID (Disparity_Sequence_id) and a service is performed by a disparity linkage descriptor (Disparity_Linkage_Descriptor). The disparity linkage descriptor (Disparity_Linkage_Descriptor) DLD is, for example, disposed within a PMT table of multiplexed streams (bit stream data BSD).

With the transmission data generating unit 110D illustrated in FIG. 22, predetermined sets of disparity information sets to each of which identification information indicating the type of superposition information where disparity information should be used is added along with stereoscopic image data including left eye image data and right eye image data for displaying a stereoscopic image. Therefore, with the reception side, suitable disparity is given to the same superposition information (closed caption information, subtitle information, graphics information, text information, etc.) to be superimposed on a left eye image and a right eye image using a disparity information set adapted to the type of this superposition information.

Note that, with the above description of the transmission data generating unit 110D illustrated in FIG. 22, description has been made wherein a disparity vector for each pixel of the lowermost layer is subjected to downsizing processing at the disparity information set creating unit 131 to obtain the disparity vector of each region of each hierarchy. However, the disparity vector of each region of each hierarchy is recorded in the data recording medium 130a, which may be used at the disparity information set creating unit 131.

[Another Configuration of Transmission Data Generating Unit]

Also, the transmission data generating unit 110D illustrated in FIG. 22 is configured to transmit predetermined sets of disparity information sets created at the disparity information set creating unit 131 to the reception side by being inserted into an image data stream. However, an arrangement may be made wherein the predetermined sets of disparity information sets created at the disparity information set creating unit 131 are transmitted to the reception side by being inserted into another data stream other than an image data stream.

Alternatively, an arrangement may be made wherein the elementary stream of a disparity vector (disparity vector stream) including predetermined sets of disparity information sets created at the disparity information set creating unit 131 is generated, and this disparity vector stream is transmitted to the reception side by being multiplexed with another stream. FIG. 62 illustrates a configuration example of the transmission data generating unit 110E in this case. In this FIG. 62, portions corresponding to FIG. 22 are denoted with the same reference numerals, and detailed description thereof will be omitted.

This transmission data generating unit 110E is, as with the transmission data generating unit 110 in FIG. 2, configured to include the disparity vector encoder 115. The predetermined sets of disparity information sets created at the disparity information set creating unit 131 are transmitted to the disparity vector encoder 115. Subsequently, with this disparity vector encoder 115, the elementary stream of a disparity vector (disparity vector stream) including the predetermined sets of disparity information sets is generated. Subsequently, this disparity vector stream is supplied to the multiplexer 122. With the multiplexer 122, the disparity vector stream is, also multiplexed along with another data stream, and bit stream data BSD is generated.

While detailed description will be omitted, with this transmission data generating unit 110E, the configurations and operations of others are the same as with the transmission data generating unit 110D illustrated in FIG. 22. With the transmission data generating unit 110E, the same advantages as with the transmission data generating unit 110D illustrated in FIG. 22 can be obtained.

[Description of Set Top Box]

Returning to FIG. 1, the set top box 200 receives bit stream data (transport stream) transmitted over broadcast waves from the broadcasting station 100. This bit stream data includes stereoscopic image data including left eye image data and right eye image data, audio data, superposition information data, and further disparity information (disparity vector). Here, examples of the superposition information data include subtitle data, graphics data, and text data (including closed caption data).

The set top box 200 includes a bit stream processing unit 201. This bit stream processing unit 201 extracts stereoscopic image data, audio data, superposition information data, a disparity vector, or the like from the bit stream data. This bit stream processing unit 201 uses stereoscopic image data, superposition information data (subtitle data, graphics data, text data), or the like to generate a left eye image and a right image to which superposition information is superimposed.

Here, in the event that a disparity vector is transmitted as numeric information, left eye superposition information and right eye superposition information to be superimposed on a left eye image and a right eye image are generated based on the disparity vector and superposition information data. In this case, the left eye superposition information and right eye superposition information are the same superposition information. However, with a superimposed position within an image, for example, the right eye superposition information is arranged to be shifted to the horizontal direction by the horizontal direction component of the disparity vector as to the left eye superposition information.

Figure 63:
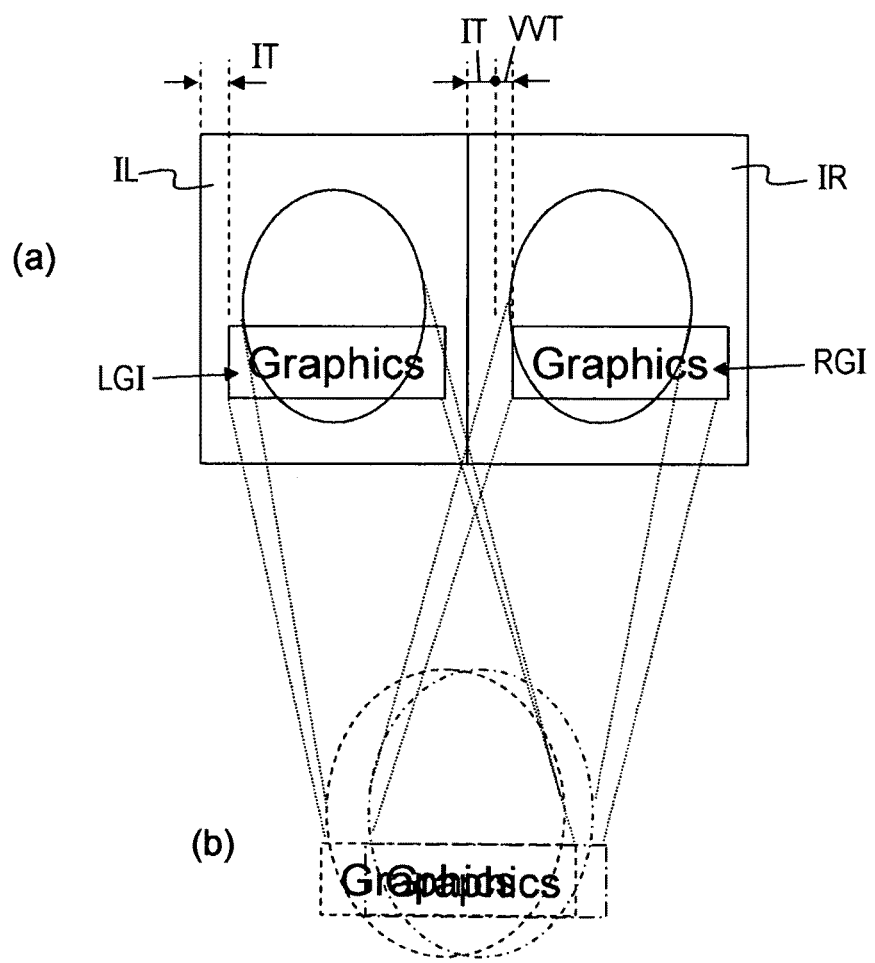
FIG. 63 is a diagram illustrating the superimposed positions and so forth of left graphics information and right graphics information in the event that the transmission method is the second transmission method ("Side By Side" method).

(a) in FIG. 63 illustrates the superimposed position of left eye graphics information and right eye graphics information in the event that the transmission method is the above second transmission method ("Side By Side" method). Right eye graphics information RGI to be superimposed on a right eye image IR is set to a position shifter to the horizontal direction by the horizontal direction component VVT of a disparity vector as to left eye graphics information LGI to be superimposed on a left eye image IL. Note that IT is an idling offset value.

With the bit stream processing unit 201, graphics data is generated so that the graphics information LGI and RGI are superimposed on images IL and IR respectively as illustrated in (a) in FIG. 63. The bit stream processing unit 201 synthesizes the generated left eye graphics data and right eye graphics data as to stereoscopic image data (left eye image data, right eye image data) extracted from the bit stream data to obtain stereoscopic image data after processing. According to this stereoscopic image data, the viewer can observe with disparity each of the graphics information LGI and RGI along with each of the images IL and IR, and perspective can also be recognized regarding the graphics information.

Figure 64:
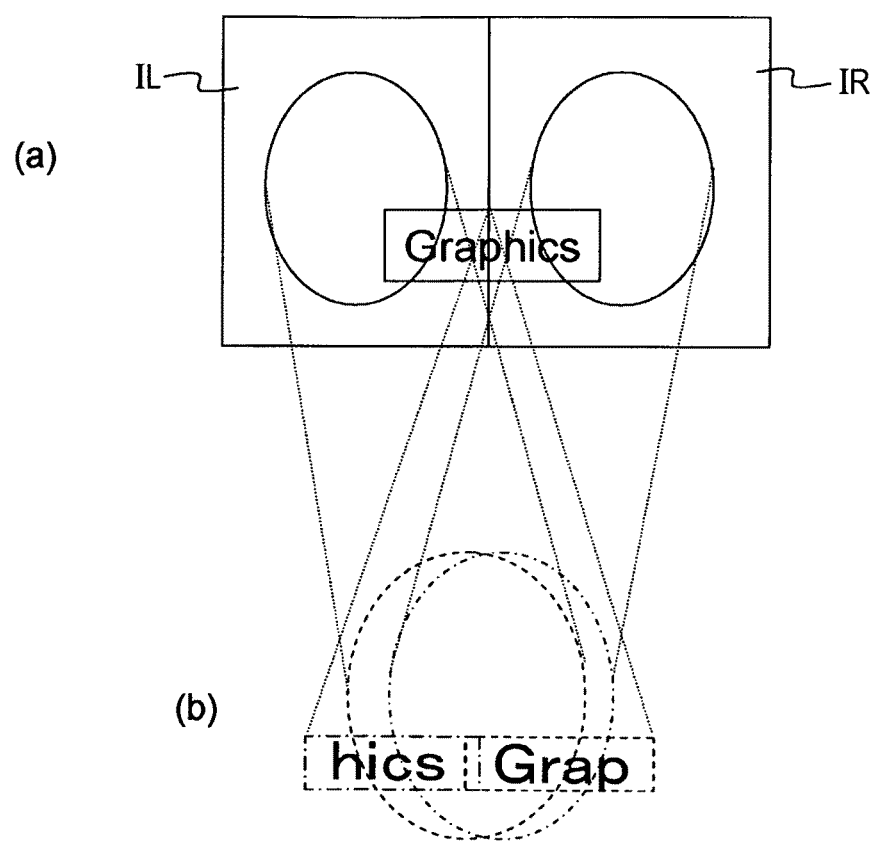
FIG. 64 is a diagram illustrating a state in which a graphics image made up of graphics data to be transmitted by a conventional method extracted from bit stream data is superimposed as is on a left eye image and a right eye image.

Note that (a) in FIG. 64 illustrates a state in which the graphics image according to the graphics data extracted from the bit stream data is superimposed on each of the images IL and IR as is. In this case, the viewer observes, as illustrated in (b) in FIG. 64, the left half of the graphics information along with the left eye image IL, and the graphics information along with the right eye image IR. Therefore, the viewer is prevented from correctly recognizing the graphics information.

Though FIG. 63 illustrates a case of the graphics information, this is also true regarding other superposition information (closed caption information, subtitle information, text information, etc.). Specifically, in the event that a disparity vector is transmitted as numeric information, left eye superposition information and right eye superposition information to be superimposed a left eye image and a right eye image respectively are generated based on the disparity vector and superposition information data data. In this case, the left eye superposition information and right eye superposition information are the same superposition information. However, with the superimposed position within the image, for example, the right eye superposition information is shifted to the horizontal direction by the horizontal direction component of the disparity vector as to the left eye superposition information.

Figure 65:
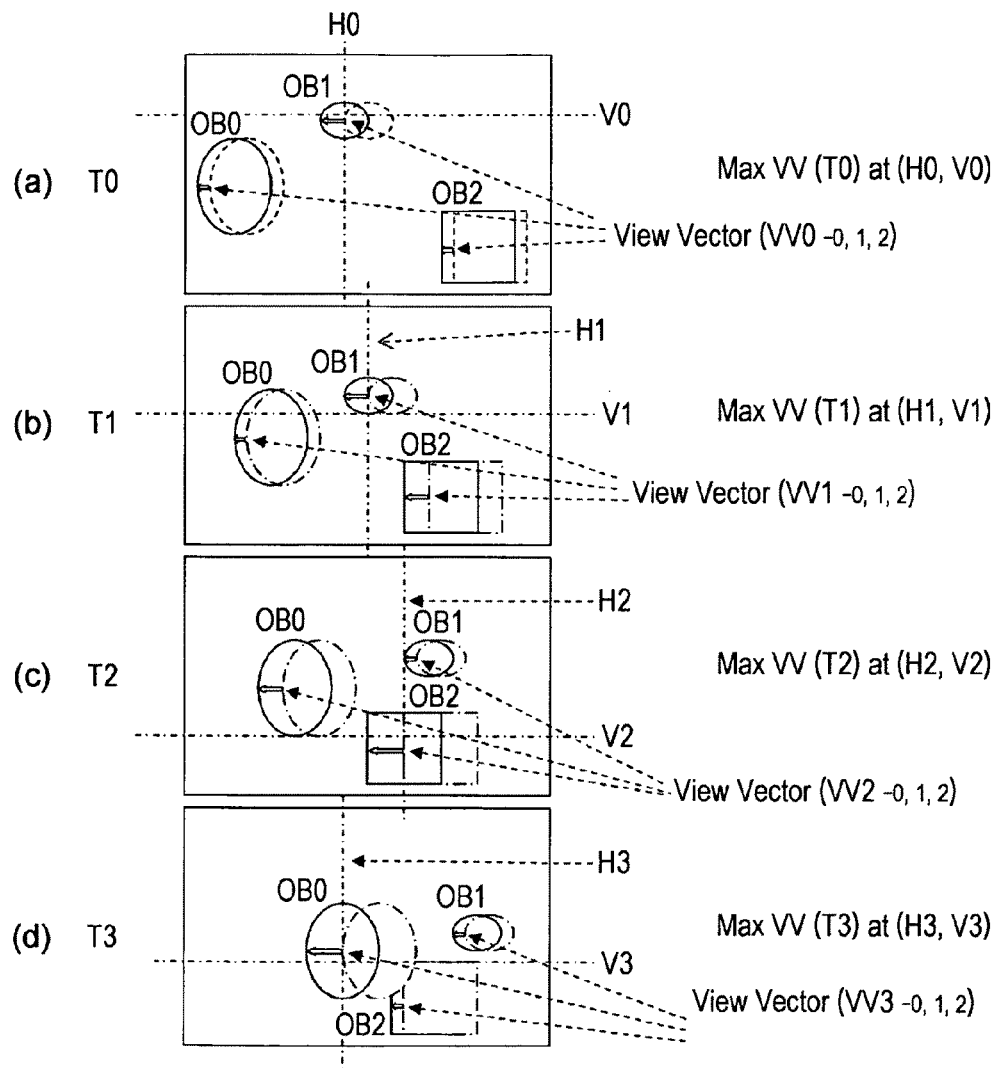
FIG. 65 is a diagram illustrating disparity vectors (View Vectors) in three object positions at points-in-time T0, T1, T2, and T3.

Here, it can be conceived to employ the following disparity vectors as a disparity vector for providing disparity between the left eye superposition information and right eye superposition information. For example, it can be conceived to employ, of disparity vectors detected in multiple positions within an image, the disparity vector in the position recognized as the nearest in respect of perspective. (a), (b), (c), and (d) in FIG. 65 illustrate the disparity vectors in three object positions at points-in-time T0, T1, T2, and T3, respectively.

At the point-in-time T0, a disparity vector VV0-1 in a position (H0, V0) corresponding to an object 1 is the maximum disparity vector MaxVV (T0). At the point-in-time T1, a disparity vector VV1-1 in a position (H1, V1) corresponding to the object 1 is the maximum disparity vector MaxVV (T1). At the point-in-time T2, a disparity vector VV2-2 in a position (H2, V2) corresponding to an object 2 is the maximum disparity vector MaxVV (T2). At the point-in-time T3, a disparity vector VV3-0 in a position (H3, V3) corresponding to the object 1 is the maximum disparity vector MaxVV (T3).

In this way, of disparity vectors detected in multiple positions within an image, the disparity vector in the position recognized as the nearest in respect of perspective is employed as a disparity vector, whereby superposition information can be displayed in front of the nearest object within the image in respect of perspective.

Figure 66:
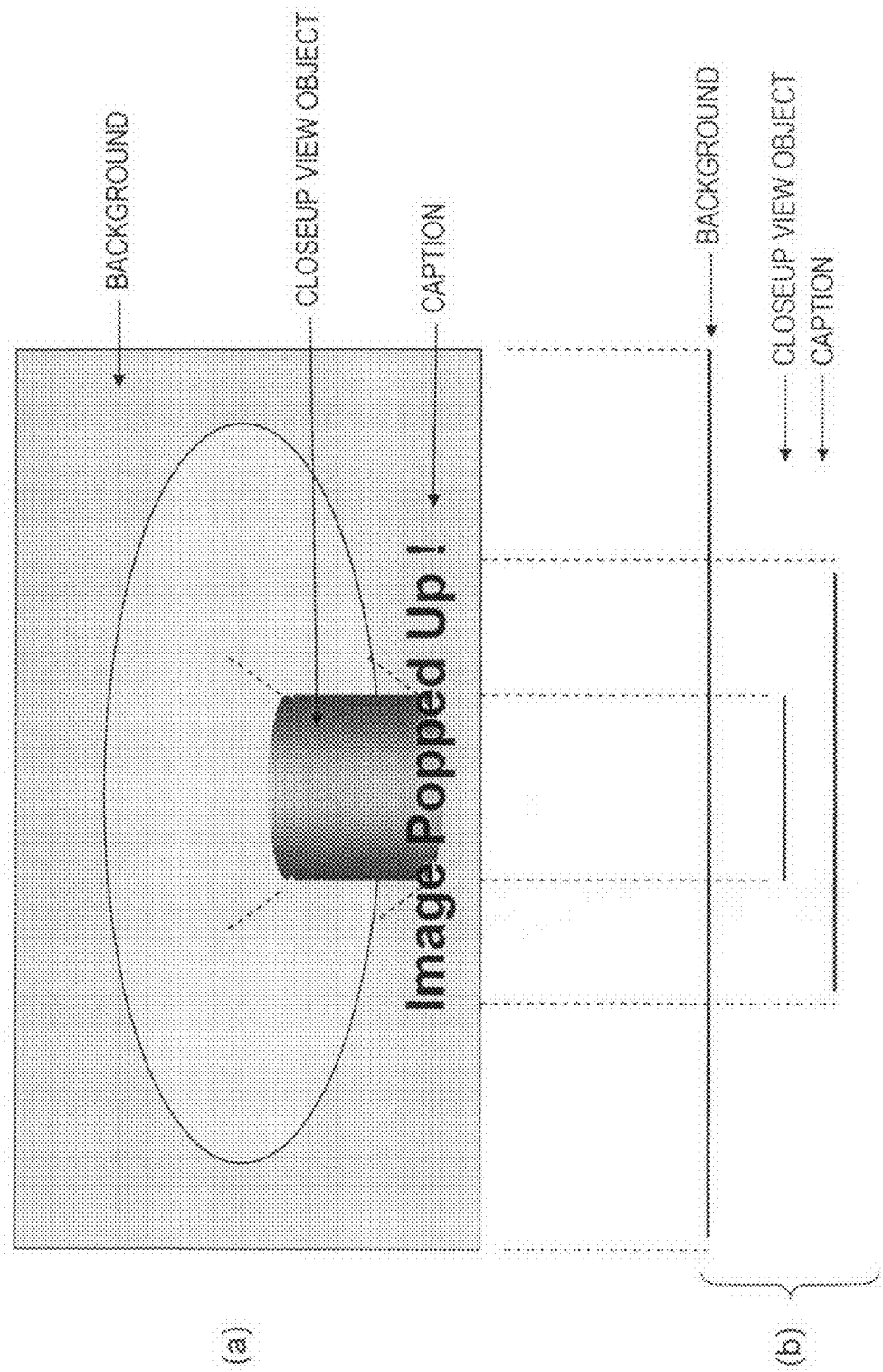
FIG. 66 is a diagram illustrating a display example of captions (graphics information) on an image, background, closeup view object, and the perspective of captions.

(a) in FIG. 66 illustrates a display example of a caption (e.g., closed caption information, subtitle information) on an image. This display example is an example wherein a caption is superimposed on an image made up of background and closeup view. (b) in FIG. 66 illustrates perspective of the background, closeup view, and caption, of which the caption is recognized as the nearest.

Figure 67:
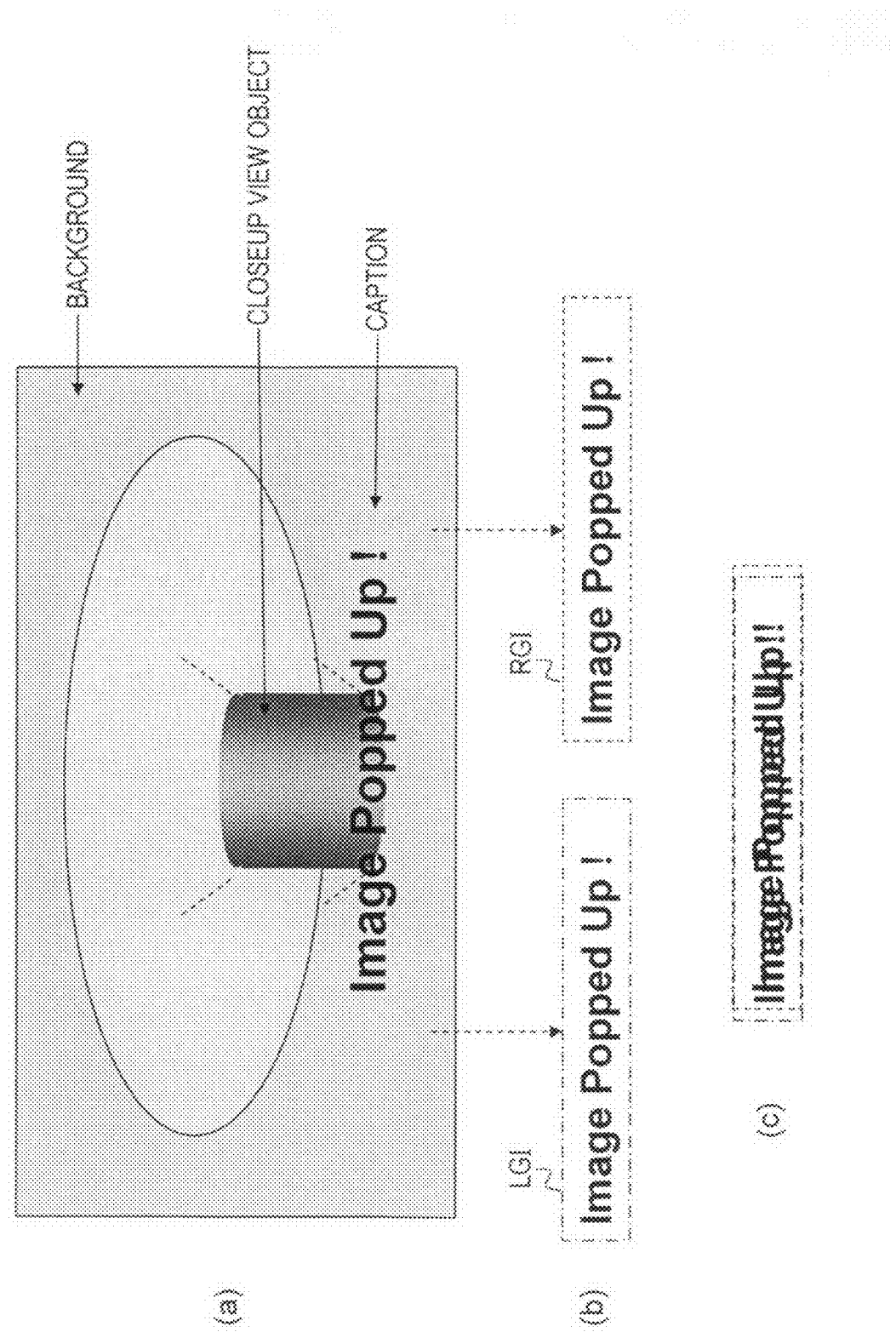
FIG. 67 is a diagram illustrating a display example of captions (graphics information) on an image, and left eye graphics information LGI and right eye graphics information RGI for displaying captions.

(a) in FIG. 67 illustrates a display example of a caption (e.g., closed caption information, subtitle information) on an image, which is the same as (a) in FIG. 66. (b) in FIG. 67 illustrates left eye subtitle information LGI and right eye subtitle information RGI for displaying a caption. (c) in FIG. 67 illustrates that a caption is recognized as the nearest, so disparity is given to each of the subtitle information LGI and RGI.

Also, it can be conceived that of disparity vectors (including the disparity vector of each region of each hierarchy included in a disparity information set) detected in multiple positions within an image, the disparity vector corresponding to the superimposed position thereof is employed. (a) in FIG. 68 illustrates graphics information according to graphics data extracted from bit stream data, and text information according to text data extracted from the bit stream data.

Figure 68:
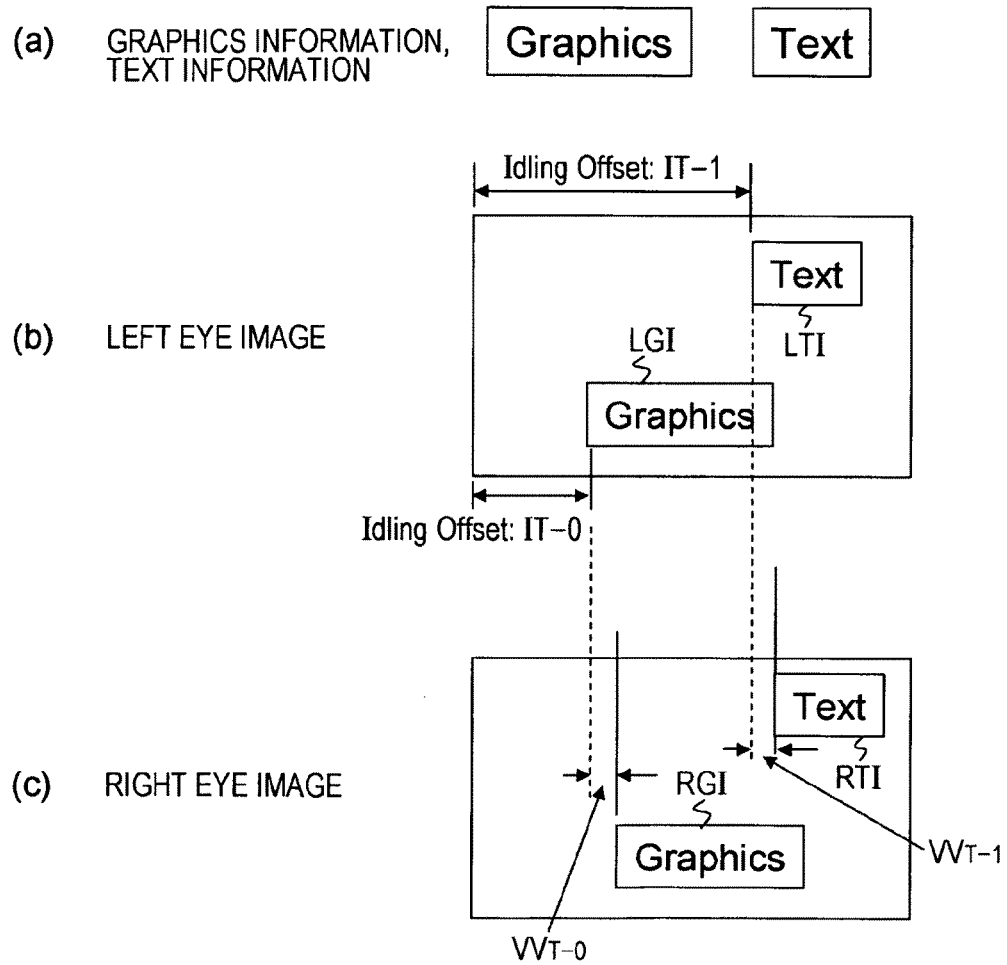
FIG. 68 is a diagram for describing that of disparity vectors detected in multiple positions within an image, a disparity vector corresponding to the superimposed position thereof is used as a disparity vector.

(b) in FIG. 68 illustrates a state in which left eye graphics information LGI and left eye text information LTI are superimposed on a left eye image. In this case, with the left eye graphics information LGI, the superimposed position thereof is stipulated in the horizontal direction by an idling value (IT-0). Also, with the left text information LTI, the superimposed position thereof is stipulated in the horizontal direction by an idling value (IT-1).

(c) in FIG. 68 illustrates a state in which right eye graphics information RGI and right eye text information RTI are superimposed on a right eye image. In this case, with the right eye graphics information RGI, the superimposed position thereof is stipulated in the horizontal direction by an idling value (IT-0), and further shifted by the horizontal direction component VTT-0 of the disparity vector corresponding to this superimposed position as compared to the superimposed position of the left eye graphics information LGI. Also, with the right eye text information RTI, the superimposed position thereof is stipulated in the horizontal direction by an idling value (IT-1), and further shifted by the horizontal direction component VTT-1 of the disparity vector corresponding to this superimposed position as compared to the superimposed position of the left eye text information LTI.

Note that the example in FIG. 68 illustrates that the superimposed position of graphics information and text information to be superimposed on the right eye image is shifted with the superimposed position of the same graphics information and text information to be superimposed on the left eye image as a reference. That is to say, with the example in FIG. 68, processing is performed wherein only the superimposed position of the graphics information and text information to be superimposed on the right eye image is shifted. However, it can also be conceived that processing is performed so as to shift both of the superimposed positions of the left eye image and right eye image.

Figure 69:
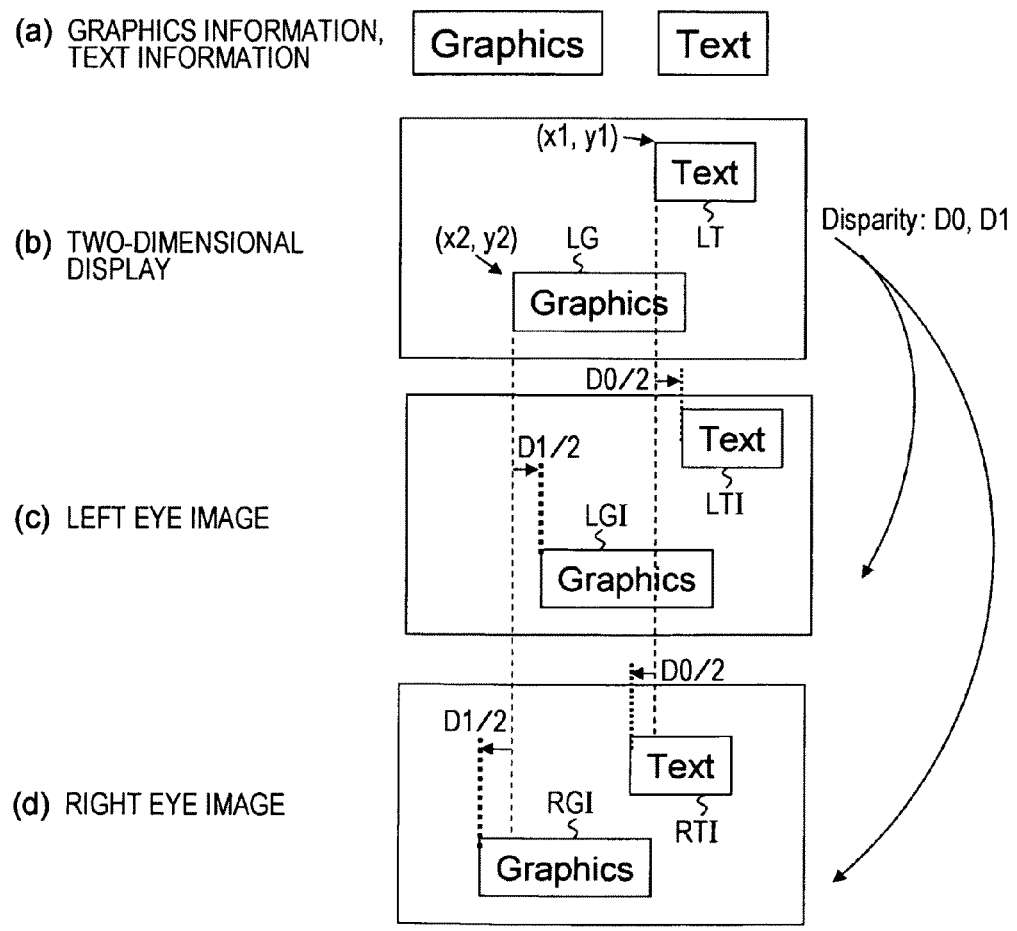
FIG. 69 is a diagram for describing that of disparity vectors detected in multiple positions within an image, a disparity vector corresponding to the superimposed position thereof is used as a disparity vector.

(a) in FIG. 69 illustrates graphics information according to graphics data extracted from bit stream data, and text information according to text data extracted from the bit stream data. (b) in FIG. 69 illustrates the superposition information of graphics information GI and text information TI in two-dimensional display. In this case, the superposition of the text information is (x1, y1), and the superimposed position of the graphics information is (x2, y2).

(c) in FIG. 69 illustrates a state in which left eye graphics information LGI and left eye text information LTI are superimposed on a left image. In this case, the left eye graphics information LGI is shifted to the right direction as to the superimposed position of the graphics information GI in the two-dimensional display by the worth equivalent to ½ of a disparity vector D1 corresponding to this graphics information. Also, the left eye text information LTI is shifted to the right direction as to the superimposed position of the text information LT in the two-dimensional display by the worth equivalent to ½ of a disparity vector D0 corresponding to this text information.

(d) in FIG. 69 illustrates a state in which right eye graphics information RGI and right eye text information RTI are superimposed on a right image. In this case, the right eye graphics information RGI is shifted to the left direction as to the superimposed position of the graphics information GI in the two-dimensional display by the worth equivalent to ½ of the disparity vector D1 corresponding to this graphics information. Also, the right eye text information RTI is shifted to the left direction as to the superimposed position of the text information LT in the two-dimensional display by the worth equivalent to ½ of the disparity vector D0 corresponding to this text information.

Note that the examples in (c) and (d) in FIG. 69 are an example in the event that expansion of offset is applied to each of the left eye image and right eye image, and also shifted by the worth equivalent to ½ of a disparity vector. In reality, as described above, expansion of offset is indicated by "Views_offset", and how much the superposition information is shifted as to the disparity vector is indicated by "Disparity_precision".

With the above description, description has been made regarding a case where the graphics information according to the graphics data extracted from the bit stream data, or the text information according to the text data extracted from the bit stream data are superimposed on the left eye image and right eye image. In addition to this, a case can also be conceived where graphics data or text data is generated within the set top box 200, and these information is superimposed on the left eye image and right eye image.

Even in such a case, disparity can be provided between left eye graphics information and right eye graphics information, or between left eye text information and right eye text information by taking advantage of the disparity vector of a predetermined position within an image extracted from the bit stream. Thus, with display of graphics information and text information, suitable perspective can be given wherein maintenance of consistency of perspective is realized between the perspective of each object within an image.

Figure 70:
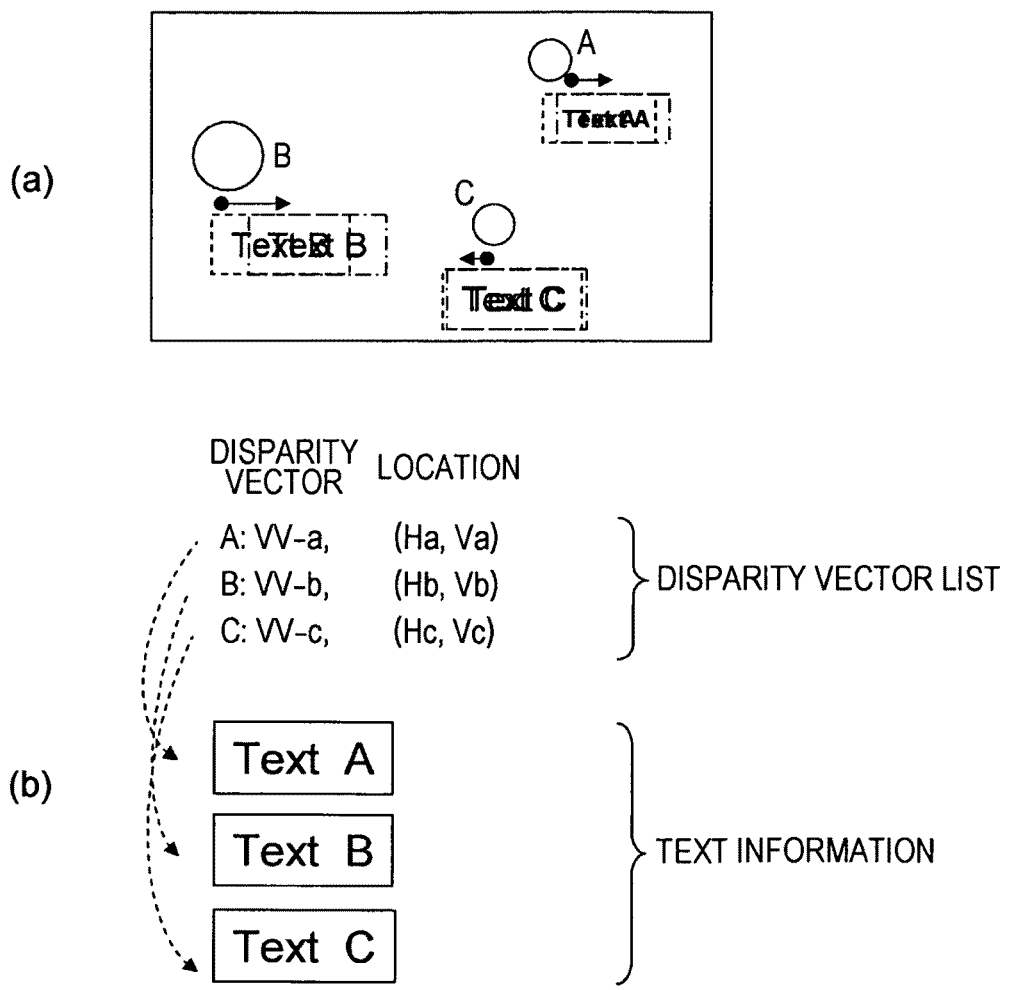
FIG. 70 is a diagram illustrating that there are objects A, B, and C within an image, and text information indicating the remarks of each object is superimposed on the adjacent position of each object of these.

(a) in FIG. 70 illustrates that there are objects A, B, and C within an image, and for example, text information indicating the remarks of each object is superimposed in the adjacent position of each of the objects. (b) in FIG. 70 illustrates that disparity is given to text information indicating the remarks of each of objects A, B, and C by taking advantage of a disparity vector list indicating correspondence between the position of each of the objects A, B, and C and the disparity vector in the position thereof, and each of the disparity vectors. For example, the text information of "Text" is superimposed in the vicinity of the object A, but disparity corresponding to the disparity vector VV-a in the position (Ha, Va) of the object A is given between the left eye text information and the right eye text information. Note that the same holds for text information to be superimposed in the vicinity of the objects B and C.

Note that FIG. 68 and FIG. 69 illustrate a case where the superposition information is graphics information and text information. Also, FIG. 70 illustrates a case where the superposition information is text information. While detailed description will be omitted, this is also true in the event of other superposition information (closed caption information, subtitle information, etc.).

Next, description will be made regarding a case where a disparity vector is reflected on the data of superposition information (closed caption information, subtitle information, graphics information, text information, etc.) beforehand and transmitted. In this case, the superposition information data extracted from the bit stream data includes the data of left eye superposition information and right eye superposition information to which disparity is given by a disparity vector.

Therefore, the bit stream processing unit 201 simply synthesizes the superposition information data extracted from the bit stream data as to the stereoscopic image data (left eye image data, right eye image data) extracted from the bit stream data to obtain the stereoscopic image data after processing. Note that with regard to text data (including closed caption data), processing for converting character code into bitmap data, or the like is necessary.

[Configuration Example of Set Top Box]

Figure 71:
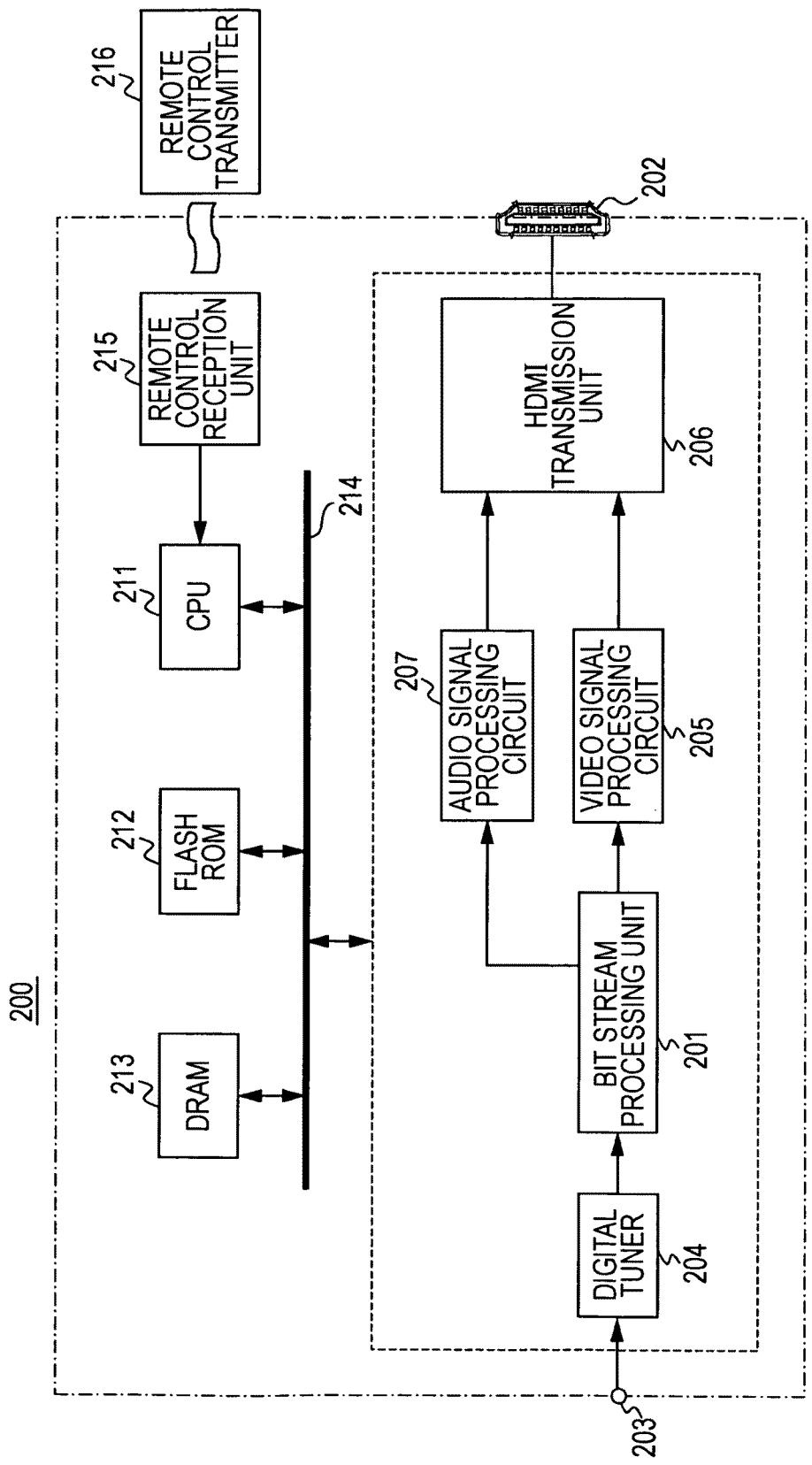
FIG. 71 is a block diagram illustrating a configuration example of a set top box making up the stereoscopic image display system.

A configuration example of the set top box 200 will be described. FIG. 71 illustrates a configuration example of the set top box 200. This set top box 200 includes a bit stream processing unit 201, an HDMI terminal 202, an antenna terminal 203, a digital tuner 204, a video signal processing circuit 205, an HDMI transmission unit 206, and an audio signal processing circuit 207. Also, this set top box 200 includes a CPU 211, flash ROM 212, DRAM 213, internal bus 214, a remote control reception unit 215, and a remote control transmitter 216.

The antenna terminal 203 is a terminal for inputting television broadcasting signal received at a reception antenna (not illustrated). The digital tuner 204 processes the television broadcasting signal input to the antenna terminal 203, and outputs predetermined bit stream data (transport stream) corresponding to the user's selected channel.

The bit stream processing unit 201 extracts stereoscopic image data (left eye image data, right eye image data), audio data, superposition information data, disparity information (disparity vector), or the like from the bit stream data. The superposition information data is subtitle data, graphics data, text data (including caption data), and so forth. This bit stream processing unit 201 synthesizes, as described above, the data of superposition information (closed caption information, subtitle information, graphics information, text information, etc.) as to stereoscopic image data to obtain stereoscopic image data for display. Also, the bit stream processing unit 201 outputs audio data. The detailed configuration of the bit stream processing unit 201 will be described later.

The video signal processing circuit 205 subjects the stereoscopic image data output from the bit stream processing unit 201 to image quality adjustment processing according to need, and supplies the stereoscopic image data after processing thereof to the HDMI transmission unit 206. The audio signal processing circuit 207 subjects the audio data output from the bit stream processing unit 201 to audio quality adjustment processing according to need, and supplies the audio data after processing thereof to the HDMI transmission unit 206.

The HDMI transmission unit 206 transmits, according to communication conforming to the HDMI, the data of baseband image (video) and audio from the HDMI terminal 202. In this case, since the data is transmitted by the TMDS channel of the HDMI, the image and audio data are subjected to packing, and are output from the HDMI transmission unit 206 to the HDMI terminal 202. The details of this HDMI transmission unit 206 will be described later.

The CPU 211 controls the operation of each unit of the set top box 200. The flash ROM 212 performs storage of control software, and storage of data. The DRAM 213 configures the work area of the CPU 211. The CPU 211 loads the read software and data to the DRAM 213, and starts up the software to control each unit of the set top box 200.

The remote control reception unit 215 receives a remote control signal (remote control code) transmitted from the remote control transmitter 216, and supplies to the CPU 211. The CPU 211 controls each unit of the set top box 200 based on this remote control code. The CPU 211, flash ROM 212, and DRAM 213 are connected to the internal bus 214.

The operation of the set top box 200 will briefly be described. The television broadcasting signal input to the antenna terminal 203 is supplied to the digital tuner 204. With this digital tuner 204, the television broadcasting signal is processed, and predetermined bit stream data (transport stream) corresponding to the user's selected channel is output.

The bit stream data output from the digital tuner 204 is supplied to the bit stream processing unit 201. With this bit stream processing unit 201, stereoscopic image data (left eye image data, right eye image data), audio data, graphics data, text data, disparity vector, or the like is extracted from the bit stream data. Also, with this bit stream processing unit 201, the data of superposition information (closed caption information, subtitle information, graphics information, text information, etc.) is synthesized as to the stereoscopic image data, and stereoscopic image data for display is generated.

The stereoscopic image data for display generated at the bit stream processing unit 201 is supplied to the HDMI transmission unit 206 after being subjected to image quality adjustment processing at the video signal processing circuit 205 according to need. Also, the audio data obtained at the bit stream processing unit 201 is supplied to the HDMI transmission unit 206 after being subjected to audio quality adjustment processing at the audio signal processing circuit 207 according to need. The stereoscopic image data and audio data supplied to the HDMI transmission unit 206 are transmitted from the HDMI terminal 202 to the HDMI cable 400 by the TMDS channel of the HDMI.

[Configuration Example of Bit Stream Processing Unit]

Figure 72:
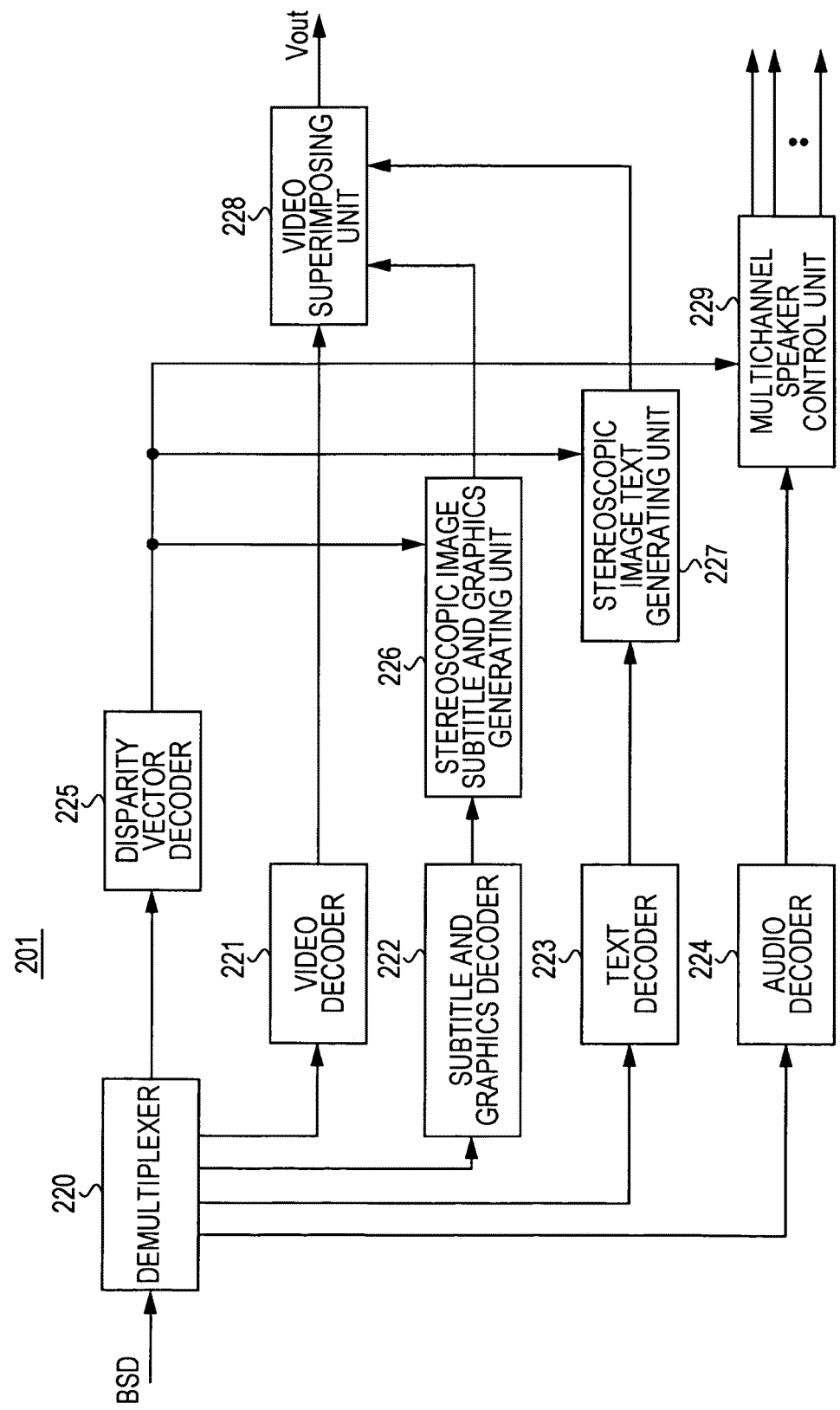
FIG. 72 is a block diagram illustrating a configuration example of a bit stream processing unit making up the set top box.

FIG. 72 illustrates a configuration example of the bit stream processing unit 201. This bit stream processing unit 201 is configured to correspond to the above transmission data generating units 110 and 110E illustrated in FIG. 2 and FIG. 62. This bit stream processing unit 201 includes a demultiplexer 220, a video decoder 221, a subtitle and graphics decoder 222, a text decoder 223, an audio decoder 224, and a disparity vector decoder 225. Also, this bit stream processing unit 201 includes a stereoscopic image data subtitle and graphics generating unit 226, a stereoscopic image text generating unit 227, a video superimposing unit 228, and a multichannel speaker control unit 229.

The demultiplexer 220 extracts the packets of video, audio, a disparity vector, a subtitle, graphics, and text from the bit stream data BSD, and transmits to each decoder.

The video decoder 221 performs processing contrary to the above video encoder 113 of the transmission data generating unit 110. Specifically, this video decoder 221 restructures a video elementary stream from the video packet extracted at the demultiplexer 220, performs decoding processing, and obtains stereoscopic image data including left eye image data and right eye image data. The transmission method of this stereoscopic image data is, for example, the above first transmission method ("Top & Bottom" method), second transmission method ("Side By Side" method), third transmission method ("Frame Sequential" method), or the like (see (a) through (c) in FIG. 4).

The subtitle and graphics decoder 222 performs processing contrary to the above subtitle and graphics encoder 119 of the transmission data generating unit 110. Specifically, this subtitle and graphics decoder 222 restructures a subtitle or graphics elementary stream from a subtitle or graphics packet extracted at the demultiplexer 220. Subsequently, this subtitle and graphics decoder 222 further performs decoding processing to obtain subtitle data or graphics data.

The text decoder 223 performs processing contrary to the above text encoder 121 of the transmission data generating unit 110. Specifically, this text decoder 223 restructures a text elementary stream from a text packet extracted at the demultiplexer 220, performs decoding processing to obtain text data (including closed caption data).

The audio decoder 224 performs processing contrary to the above audio encoder 117 of the transmission data generating unit 110. Specifically, this audio decoder 224 restructures an audio elementary stream from an audio packet extracted at the demultiplexer 220, performs decoding processing to obtain audio data.

The disparity vector decoder 225 performs processing contrary to the above disparity vector encoder 115 of the transmission data generating unit 110. Specifically, this disparity vector decoder 225 restructures a disparity vector elementary stream from a disparity vector packet extracted at the demultiplexer 220, performs decoding processing to obtain a disparity vector in a predetermined position within an image.

The stereoscopic image data subtitle and graphics generating unit 226 generates left eye and right eye subtitle information or graphics information to be superimposed on a left eye image and a right eye image respectively. This generation processing is performed based on the subtitle data or graphics data obtained at the decoder 222, and the disparity vector obtained at the decoder 225. In this case, the left eye and right eye subtitle information or graphics information are the same information. However, with the superimposed position within the image, for example, the right eye subtitle information or graphics information is arranged to be shifted to the horizontal direction as to the left eye subtitle information or graphics information by the horizontal direction component worth of the disparity vector. Subsequently, stereoscopic image data subtitle and graphics generating unit 226 outputs the data (bitmap data) of the generated left eye and right eye subtitle information or graphics information.

The stereoscopic image text generating unit 227 generates left eye text information and right eye text information to be superimposed on a left eye image and a right eye image respectively based on the text data obtained at the decoder 223, and the disparity vector obtained at the decoder 225. In this case, the left eye text information and right eye text information are the same text information, but with the superimposed position within an image, for example, the right eye text information is arranged to be shifted to the horizontal direction as to the left eye text information by the horizontal direction component worth of the disparity vector. Subsequently, stereoscopic image text generating unit 227 outputs the data (bitmap data) of the generated left eye text information and right eye text information.

The video superimposing unit 228 superimposes data generated at the generating units 226 and 227 on the stereoscopic image data (left eye image data, right eye image data) obtained at the video decoder 221 to obtain stereoscopic image data for display Vout. Note that superposition of superposition information data onto stereoscopic image data (left eye image data, right eye image data) is started by the timestamp of a system layer.

The multichannel speaker control unit 229 subjects the audio data obtained at the audio decoder 224 to processing for generating audio data of a multichannel speaker for realizing 5.1-ch surround or the like, processing for adding a predetermined acoustic field property, or the like. Also, this multichannel speaker control unit 229 controls the output of the multichannel speaker based on the disparity vector obtained at the decoder 225.

There is provided an advantage wherein the greater the size of a disparity vector becomes, the more stereoscopic effects are conspicuous. The speaker output of a multichannel is controlled according to a stereoscopic degree, whereby provision of further stereoscopic experience can be realized.

Figure 73:
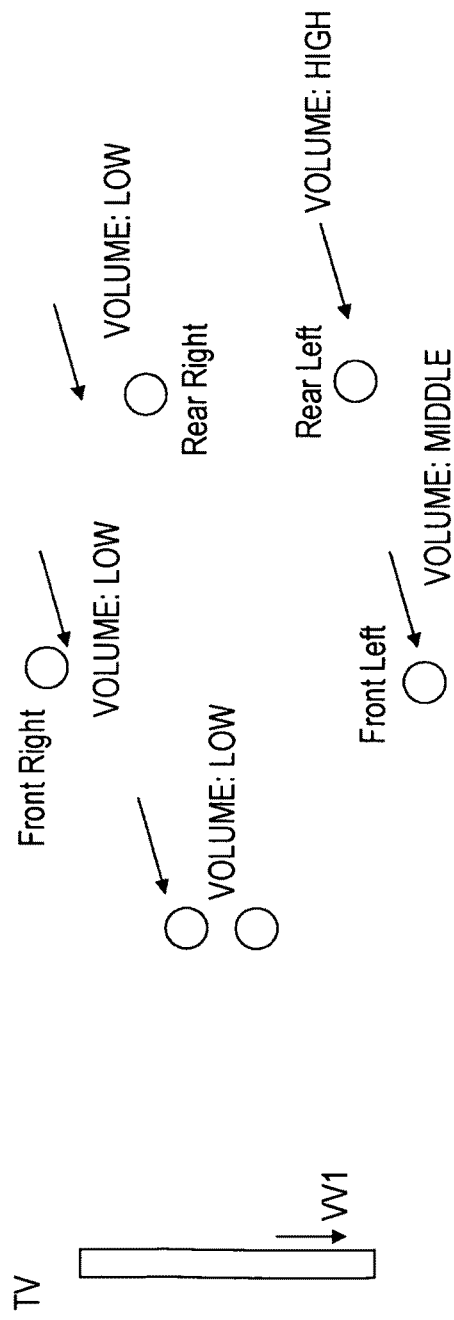
FIG. 73 is a diagram illustrating a speaker output control example of in the event that, with regard to a disparity vector VV1, a video object on the left side toward a television display is greater.

FIG. 73 illustrates a speaker output control example in the event that, with regard to a disparity vector VV1, a video object on the left side is greater toward a television display. With this control example, the speaker volume of Rear Left of the multichannel speaker is set to great, the speaker volume of Front Left is set to middle, and further, the speaker volume of Rear Right is set to small. In this way, the disparity vector of a video content (stereoscopic image data) is applied to another media data such as audio data or the like at the reception side, whereby the viewer is allowed to physically sense stereoscopic effects in an integral manner.

The operation of the bit stream processing unit 201 illustrated in FIG. 72 will briefly be described. The bit stream data BSD output from the digital tuner 204 (see FIG. 71) is supplied to the demultiplexer 220. With this demultiplexer 220, the TS packets of video, audio, disparity vector, subtitle, graphics, and text are extracted from the bit stream data BSD, and are supplied to each decoder.

With the video decoder 221, a video elementary stream is restructured from the video packet extracted from the demultiplexer 220, further subjected to decoding processing, and stereoscopic image data including left eye image data and right eye image data is obtained. This stereoscopic image data is supplied to the video superimposing unit 228. Also, with the disparity vector decoder 225, a disparity vector elementary stream is restructured from the disparity vector packet extracted from the demultiplexer 220, further subjected to decoding processing, and a disparity vector in a predetermined position within an image (see FIG. 8, FIG. 29, etc.).

With the subtitle and graphics decoder 222, a subtitle or graphics elementary stream is restructured from a subtitle or graphics packet extracted at the demultiplexer 220. With the subtitle and graphics decoder 222, the subtitle or graphics elementary stream is further subjected to decoding processing, and subtitle data or graphics data is obtained. This subtitle data or graphics data is supplied to the stereoscopic image subtitle and graphics generating unit 226. The disparity vector obtained at the disparity vector decoder 225 is also supplied to the stereoscopic image subtitle and graphics generating unit 226.

With the stereoscopic image subtitle and graphics generating unit 226, the data of left eye and right eye subtitle information or graphics information to be superimposed on a left eye image and a right eye image respectively is generated. This generation processing is performed based on the subtitle data and graphics data obtained at the decoder 222, and the disparity vector obtained at the decoder 225.

In this case, with the superimposed position within the image, for example, the right eye subtitle information or graphics information is shifted to the horizontal direction as to the left eye subtitle information and left eye graphics information by the horizontal direction component of a disparity vector. The data (bitmap data) of the generated left eye and right eye subtitle information or graphics information is output from this stereoscopic image subtitle graphics generating unit 226.

Also, with the text decoder 223, a text elementary stream from a text TS packet extracted at the demultiplexer 220 is restructured, further subjected to decoding processing, and text data is obtained. This text data is supplied to the stereoscopic image text generating unit 227. The disparity vector obtained at the disparity vector decoder 225 is also supplied to this stereoscopic image text generating unit 227.

With this stereoscopic image text generating unit 227, left eye text information and right eye text information to be superimposed on a left eye image and a right eye image respectively are generated based on the text data obtained at the decoder 223, and the disparity vector obtained at the decoder 225. In this case, the left eye text information and right eye text information are the same text information, but with the superimposed position within the image, the right eye text information is shifted into the horizontal direction as to the left eye text information by the horizontal direction component worth of the disparity vector. The data (bitmap data) of the generated left eye text information and right eye text information is output from this stereoscopic image text generating unit 227.

Note that, in the event that the disparity vector obtained at the disparity vector decoder 225 is included in predetermined sets of disparity information sets, a disparity information set adapted to superposition information can be employed based on identification information (Disparity_Sequence_id) added to each disparity information set. Specifically, with regard to superposition information, such as closed caption information, subtitle information, or the like, suitable disparity can be added using an associated disparity vector.

In addition to the above stereoscopic image data (left eye image data, right eye image data) from the video decoder 221, the data output from the subtitle and graphics generating unit 226 and text degenerating unit 227 is supplied to the video superimposing unit 228. With this video superimposing unit 228, the data generated at the subtitle and graphics generating unit 226 and text generating unit 227 is superimposed on the stereoscopic image data (left eye image data, right eye image data), stereoscopic image data for display Vout is obtained. This stereoscopic image data for display Vout is supplied to the HDMI transmission unit 206 (see FIG. 71) via the video signal processing circuit 205 as transmission image data.

Also, with the audio decoder 224, an audio elementary stream is restructured from an audio TS packet extracted from the demultiplexer 220, further subjected to decoding processing, and audio data is obtained. This audio data is supplied to the multichannel speaker control unit 229. With this multichannel speaker control unit 229, the audio data is subjected to processing for generating audio data of a multichannel speaker for realizing 5.1-ch surround or the like, or the like.

The disparity vector obtained at the disparity vector decoder 225 is also supplied to this multichannel speaker control unit 229. Subsequently, with this multichannel speaker control unit 229, output of the multichannel speaker is controlled based on the disparity vector. The multichannel audio data obtained at this multichannel speaker control unit 229 is supplied to the HDMI transmission unit 206 (see FIG. 71) via the audio signal processing circuit 207 as transmission audio data.

[Application of Disparity to Superposition Information]

Now, description will further be performed regarding application of disparity to superposition information in the stereoscopic image subtitle and graphics generating unit 226 and stereoscopic image text generating unit 227 of the bit stream processing unit 201 illustrated in FIG. 72.

Figure 74:
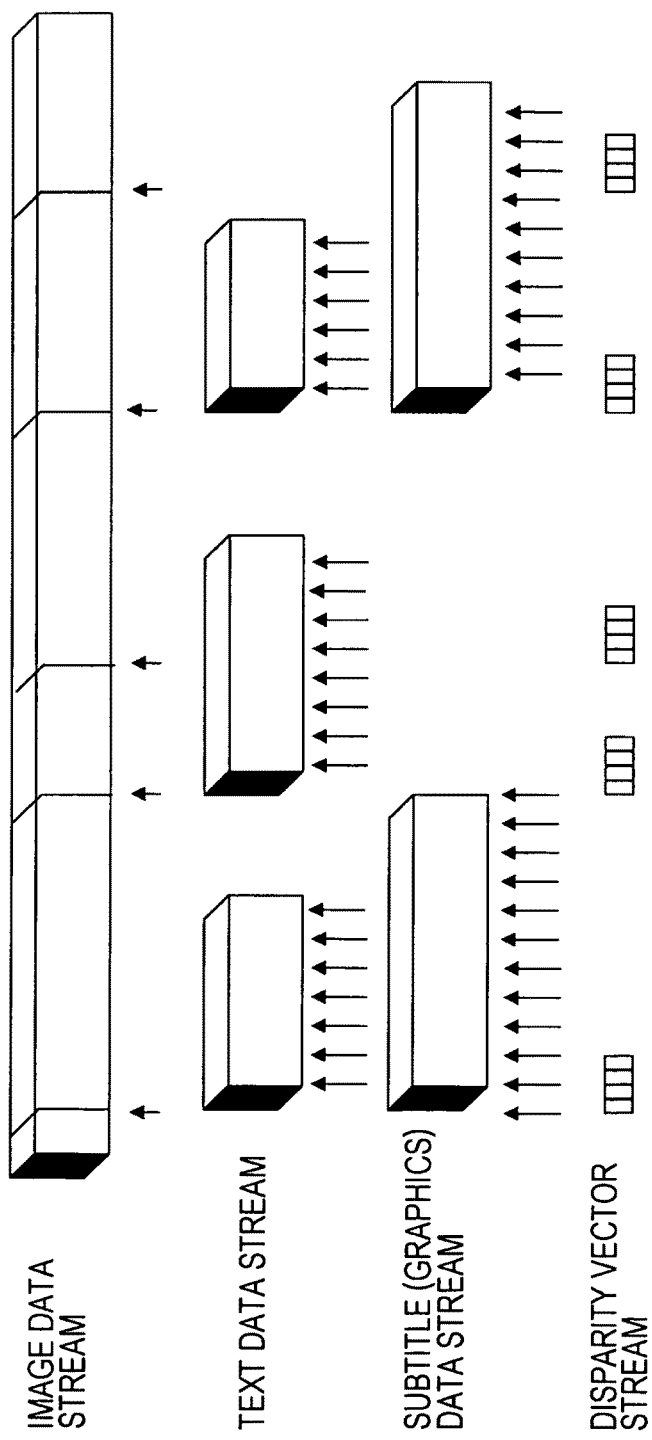
FIG. 74 is a diagram illustrating correspondence relationship between each data stream and a disparity vector to be transmitted from the broadcasting station.
Figure 75:
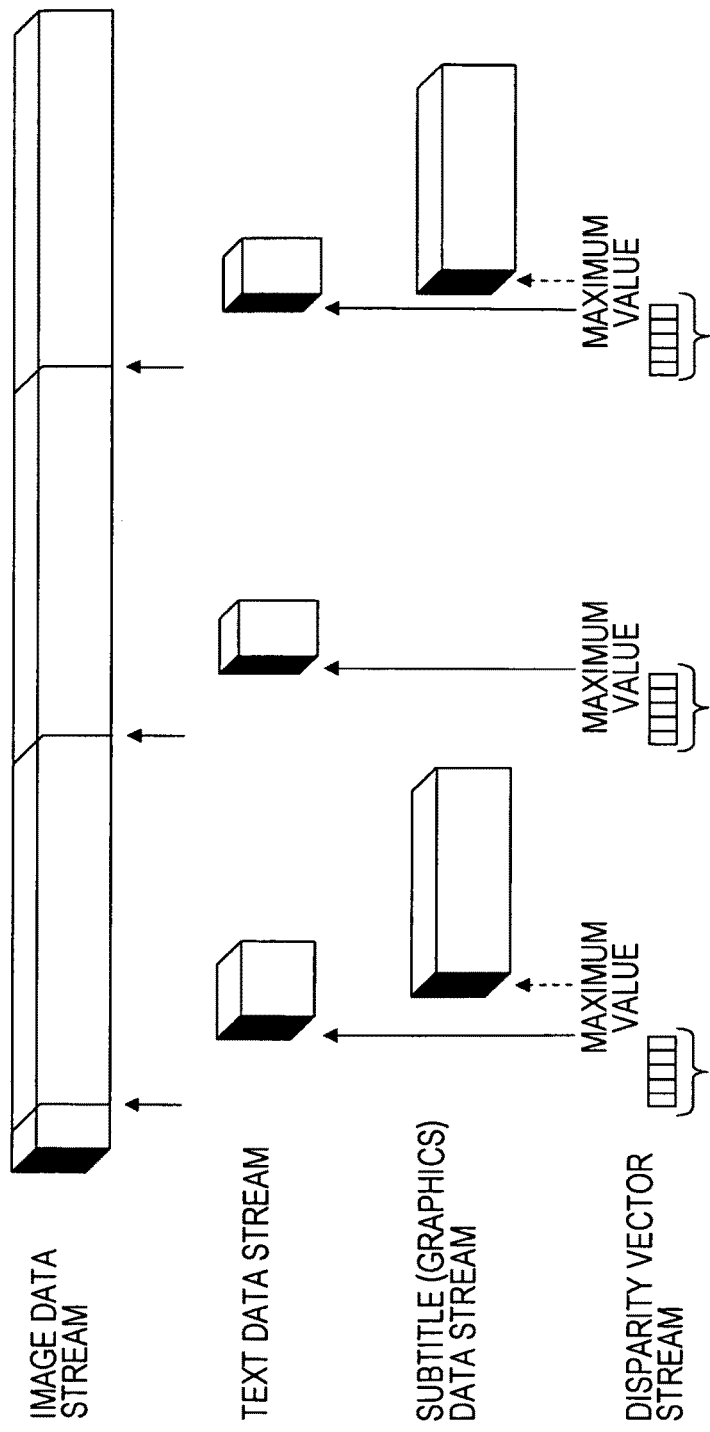
FIG. 75 is a diagram illustrating correspondence relationship between each data stream and a disparity vector to be transmitted from the broadcasting station.

For example, as illustrated in FIG. 74 and FIG. 75, a disparity vector stream including a disparity vector (see FIG. 8, FIG. 29, etc.) is transmitted from the broadcasting station 100 (see FIG. 1) along with an image data stream, a subtitle or graphics data stream, and a text data stream. In this case, a predetermined unit-based disparity vector corresponding to each certain period of time is collectively transmitted in sync with the start timing of each certain period of time of GOP (Group Of Pictures), I (Intra picture) picture, scene, or the like of encoded video. As for the predetermined unit, for example, picture (frame) unit, unit of integral multiple of picture, or the like can be conceived.

For example, with the stereoscopic image subtitle and graphics generating unit 226 and stereoscopic image text generating unit 227, disparity according to a disparity vector (information information) corresponding to superposition information is added for each predetermined unit, during a superposition period of time of the superposition information. An arrow added to the portions of a subtitle (graphics) data stream and text data stream in FIG. 74 represents timing for disparity being added to the superposition information for each predetermined unit. In this way, an arrangement is made wherein disparity is added to the superposition information, whereby disparity to be added to the superposition information can dynamically be changed in conjunction with change in image content.

Also, for example, with the stereoscopic image subtitle and graphics generating unit 226 and stereoscopic image text generating unit 227, disparity according to a predetermined disparity vector (disparity information) selected from superposition period of time worth of disparity vectors is added to superposition information for each predetermined unit, during a superposition period of time of the superposition information. The predetermined disparity vector is, for example, set to disparity information indicating the maximum disparity of the superposition period of time worth of disparity information.

An arrow added to the portions of a subtitle (graphics) data stream and text data stream in FIG. 75 represents timing for disparity being added to the superposition information. In this case, disparity is added to the superposition information at the beginning of the superposition period of time, and hereafter, the superposition information to which the disparity thereof is added is used as superposition information to be superimposed on a left eye image and a right eye image. In this way, an arrangement is made wherein disparity is added to the superposition information, whereby the maximum disparity during the superposition period of time of the superposition information can be added to the superposition information regardless of image content.

Figure 76:
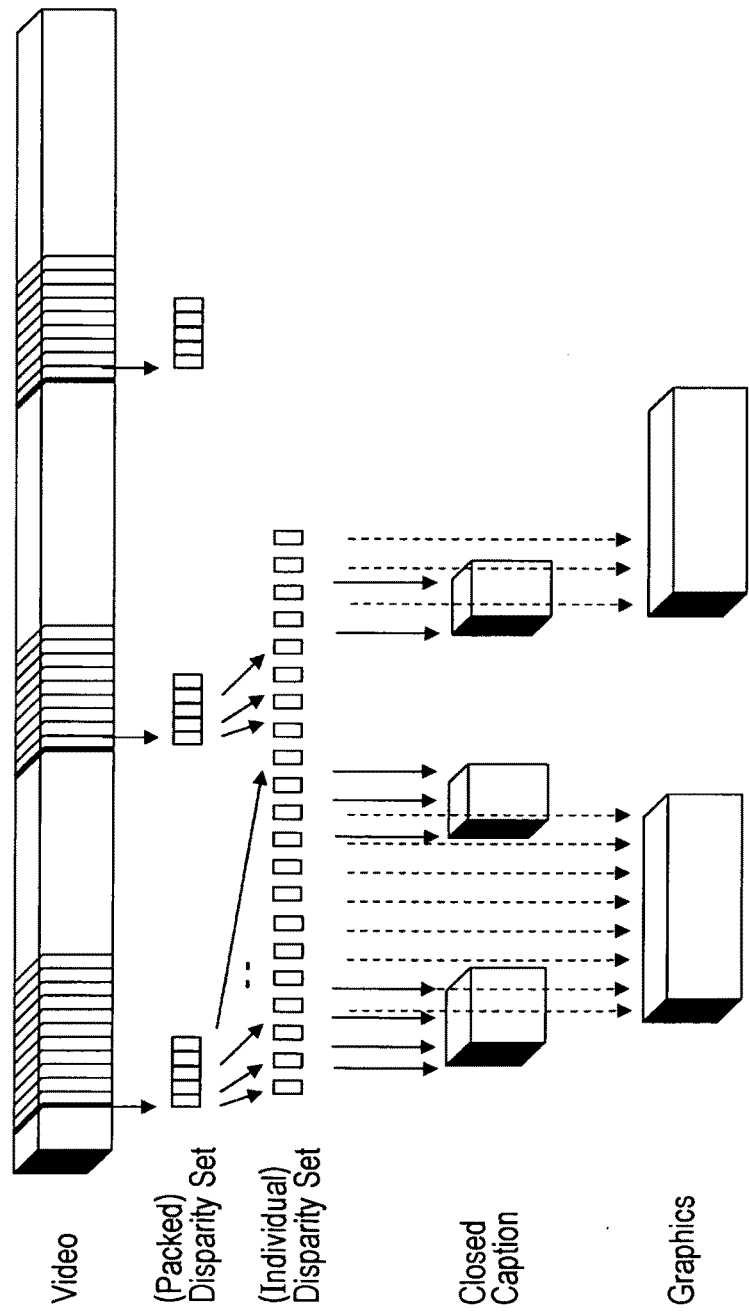
FIG. 76 is a diagram illustrating correspondence relationship of image data, closed caption data, graphics data, and a disparity information set, transmitted from the broadcasting station.

Also, for example, as illustrated in FIG. 76, image data, closed caption data, and graphics data are transmitted from the broadcasting station 100 (see FIG. 1). The disparity information sets (see FIG. 29, FIG. 31, FIG. 33, and FIG. 36) are transmitted as a disparity vector stream. In this case, predetermined unit-based disparity information sets corresponding to each certain period of time are collectively transmitted in sync with the start timing of each certain period of time of GOP (Group Of Pictures), I picture, scene, or the like of encoded video. As for the predetermined unit, for example, picture (frame) unit, unit of integral multiple of picture, or the like can be conceived.

For example, with the stereoscopic image subtitle and graphics generating unit 226 and stereoscopic image text generating unit 227, disparity according to a disparity vector (information information) corresponding to superposition information is added for each predetermined unit, during a superposition period of time of the superposition information. An arrow added to the portions of closed caption data and graphics data in FIG. 76 represents timing for disparity being added to the superposition information for each predetermined unit. In this way, an arrangement is made wherein disparity is added to the superposition information, whereby disparity to be added to the superposition information can dynamically be changed in conjunction with change in image content.

[Another Configuration Example of Bit Stream Processing Unit]

Figure 77:
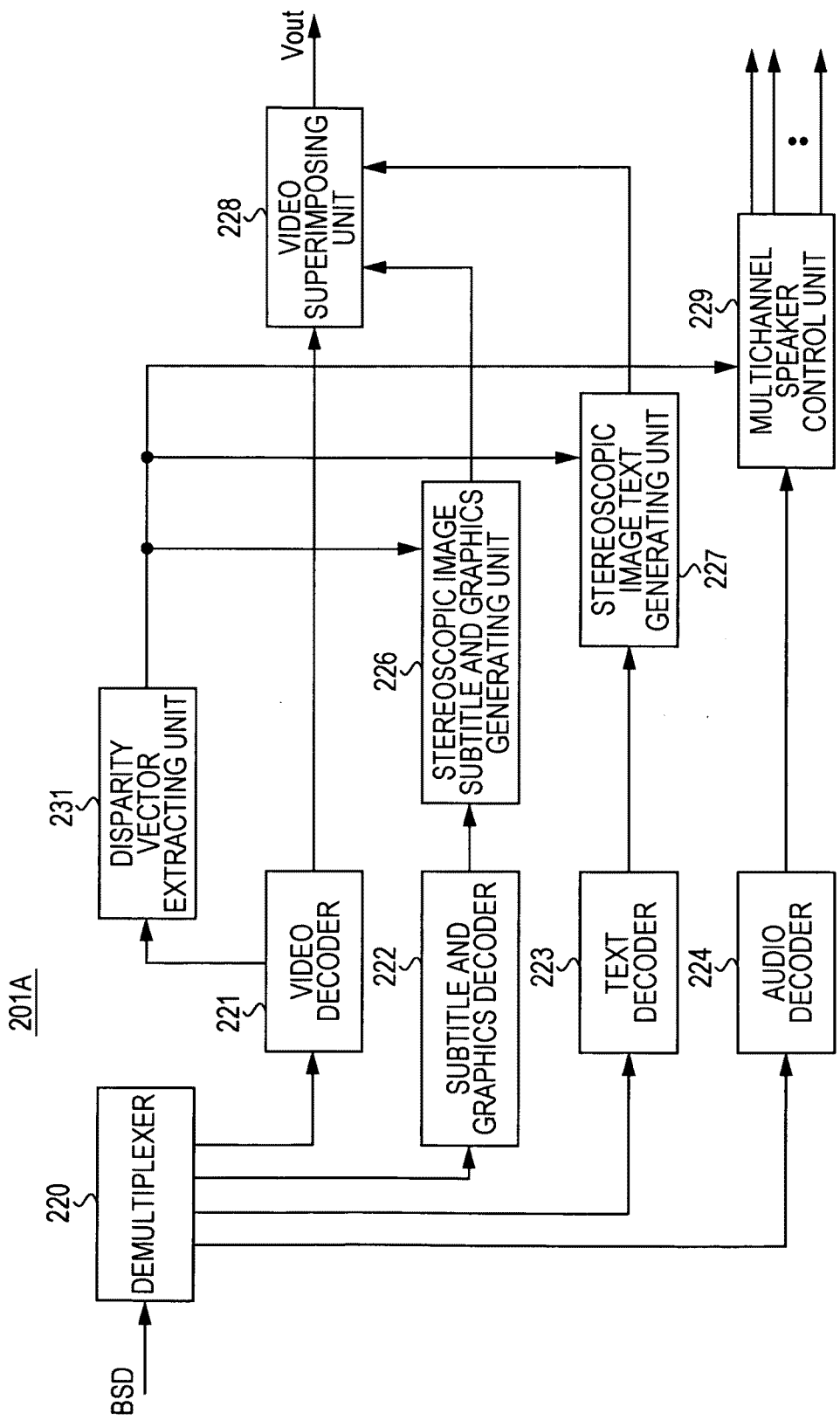
FIG. 77 is a block diagram illustrating another configuration example of the bit stream processing unit making up the set top box.

A bit stream processing unit 201A illustrated in FIG. 77 is configured to correspond to the above transmission data generating units 110A and 110D illustrated in FIG. 13 and FIG. 22. In this FIG. 77, portions corresponding to FIG. 72 are denoted with the same reference numerals, and detailed description thereof will be omitted.

With this bit stream processing unit 201A, instead of the disparity vector decoder 255 of the bit stream processing unit 201 illustrated in FIG. 72, a disparity vector extracting unit 231 is provided. This disparity vector extracting unit 231 extracts from a video stream obtained through the video decoder 221 a disparity vector embedded in a user data region thereof. Subsequently, this disparity vector extracting unit 231 supplies the extracted disparity vector to the stereoscopic image subtitle and graphics generating unit 226, stereoscopic image text generating unit 227, and multichannel speaker control unit 229.

While detailed description will be omitted, others of the bit stream processing unit 201A illustrated in FIG. 77 are configured in the same way as with the bit stream processing unit 201 illustrated in FIG. 72, and operate in the same way.

[Application of Disparity to Superposition Information]

Now, description will further be performed regarding application of disparity to superposition information in the stereoscopic image subtitle and graphics generating unit 226 and stereoscopic image text generating unit 227 of the bit stream processing unit 201A illustrated in FIG. 77.

Figure 78:
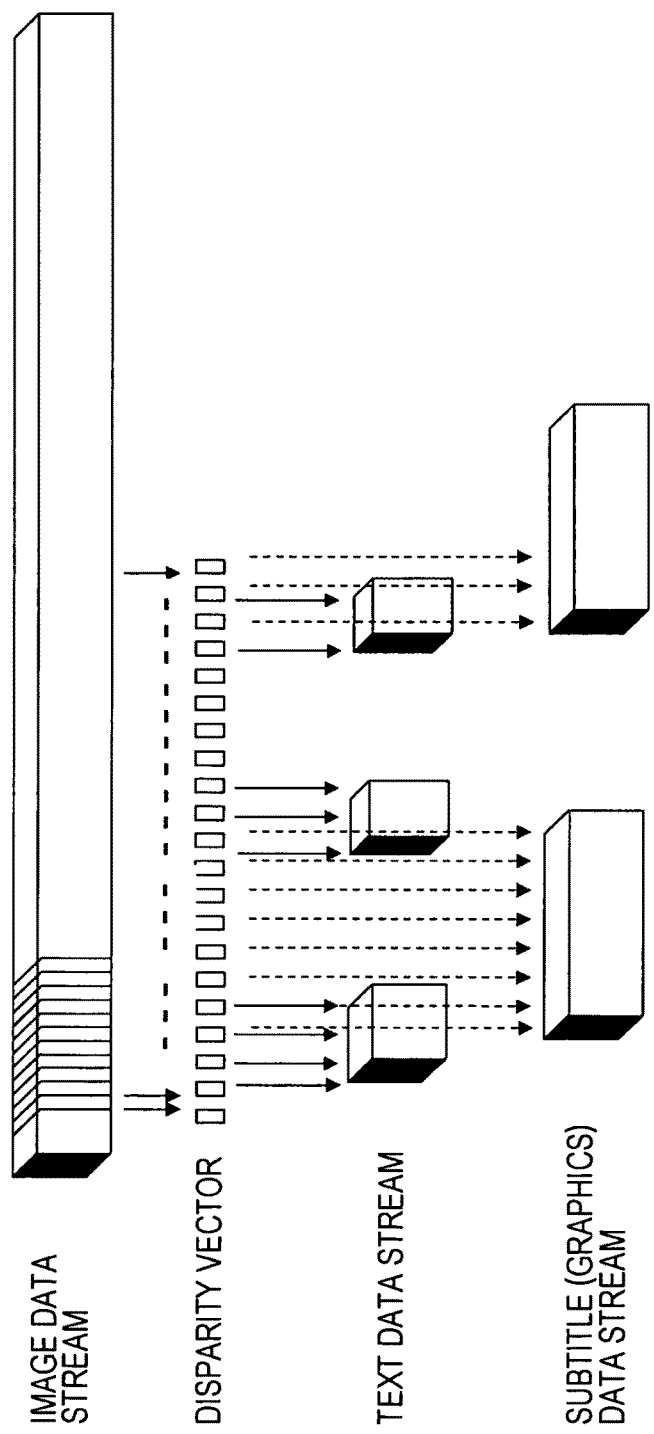
FIG. 78 is a diagram illustrating correspondence relationship between each data stream and a disparity vector to be transmitted from the broadcasting station.

For example, as illustrated in FIG. 78, an image data stream, and a subtitle or graphics data stream, and a text data stream are transmitted from the broadcasting station 100 (see FIG. 1). Subsequently, a disparity vector (see FIG. 8, FIG. 29, etc.) is transmitted by being embedded in an image data stream. In this case, for each predetermined unit of image data, e.g., for each picture of encoded video, a disparity vector corresponding to the predetermined unit thereof is transmitted by being embedded in an image data stream.

With the stereoscopic image subtitle and graphics generating unit 226 and stereoscopic image text generating unit 227, disparity according to a disparity vector (information information) corresponding to superposition information is added for each predetermined unit, during a superposition period of time of the superposition information. An arrow added to the portions of a subtitle (graphics) data stream and text data stream in FIG. 78 represents timing for disparity being added to the superposition information for each predetermined unit. In this way, an arrangement is made wherein disparity is added to the superposition information, whereby disparity to be added to the superposition information can dynamically be changed in conjunction with change in image content.

Figure 79:
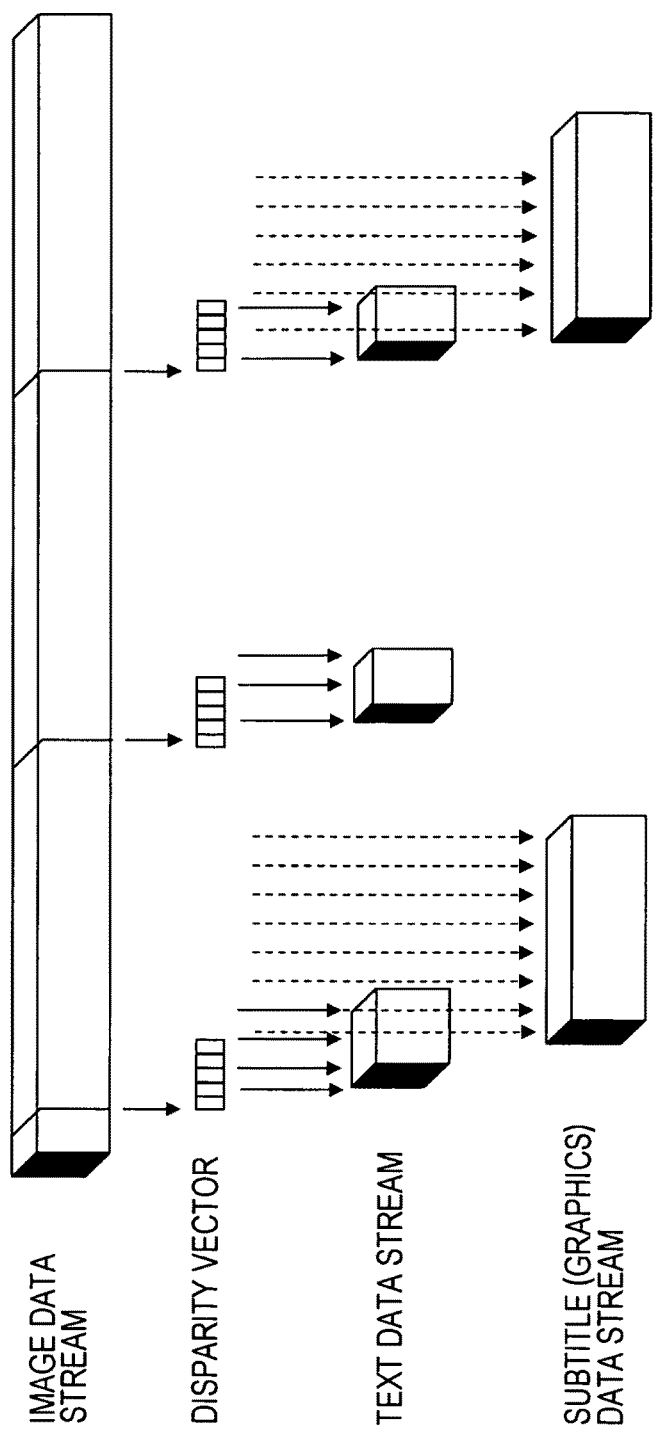
FIG. 79 is a diagram illustrating correspondence relationship between each data stream and a disparity vector to be transmitted from the broadcasting station.
Figure 80:
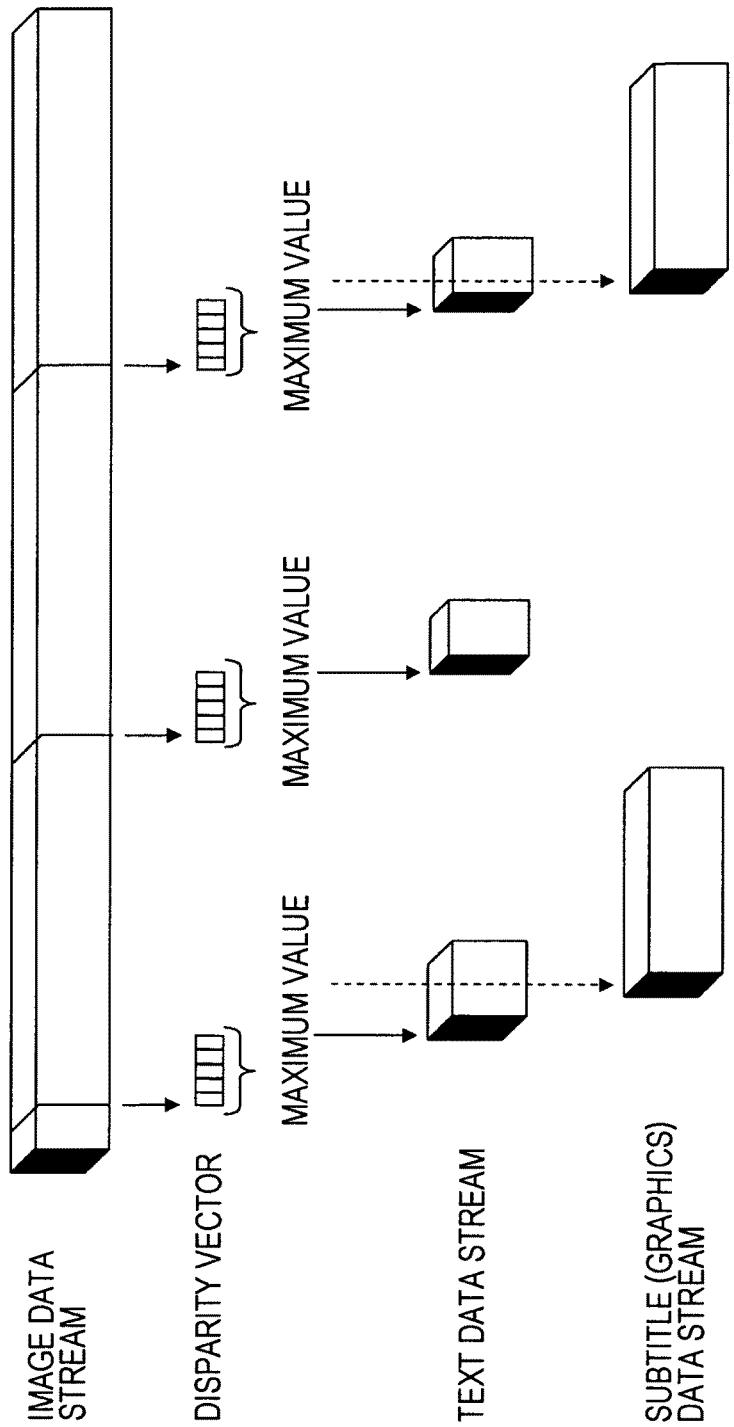
FIG. 80 is a diagram illustrating correspondence relationship between each data stream and a disparity vector to be transmitted from the broadcasting station.

Also, for example, as illustrated in FIG. 79 and FIG. 80, an image data stream, and a subtitle or graphics data stream, and a text data stream are transmitted from the broadcasting station 100 (see FIG. 1). Subsequently, a disparity vector (see FIG. 8, FIG. 29, etc.) is transmitted by being embedded in an image data stream. In this case, predetermined unit-based disparity vectors corresponding to each certain period of time are collectively transmitted in sync with the start timing of each certain period of time of GOP, I picture, scene, or the like of encoded video. As for the predetermined unit, for example, picture (frame) unit, unit of integral multiple of picture, or the like can be conceived.

For example, with the stereoscopic image subtitle and graphics generating unit 226 and stereoscopic image text generating unit 227, disparity according to a disparity vector (information information) corresponding to superposition information is added for each predetermined unit, during a superposition period of time of the superposition information. An arrow added to the portions of a subtitle (graphics) data stream and text data stream in FIG. 79 represents timing for disparity being added to the superposition information for each predetermined unit. In this way, an arrangement is made wherein disparity is added to the superposition information, whereby disparity to be added to the superposition information can dynamically be changed in conjunction with change in image content.

Also, for example, with the stereoscopic image subtitle and graphics generating unit 226 and stereoscopic image text generating unit 227, disparity according to a predetermined disparity vector (disparity information) selected from superposition period of time worth of disparity vectors is added to superposition information for each predetermined unit, during a superposition period of time of the superposition information. The predetermined disparity vector is, for example, the predetermined disparity information is set to disparity information indicating the maximum disparity of the superposition period of time worth of disparity information.

An arrow added to the portions of a subtitle (graphics) data stream and text data stream in FIG. 80 represents timing for disparity being added to the superposition information. In this case, disparity is added to the superposition information at the beginning of the superposition period of time, and hereafter, the superposition information to which the disparity thereof is added is used as superposition information to be superimposed on a left eye image and a right eye image. In this way, an arrangement is made wherein disparity is added to the superposition information, whereby the maximum disparity during the superposition period of time of the superposition information can be added to the superposition information regardless of image content.

Figure 81:
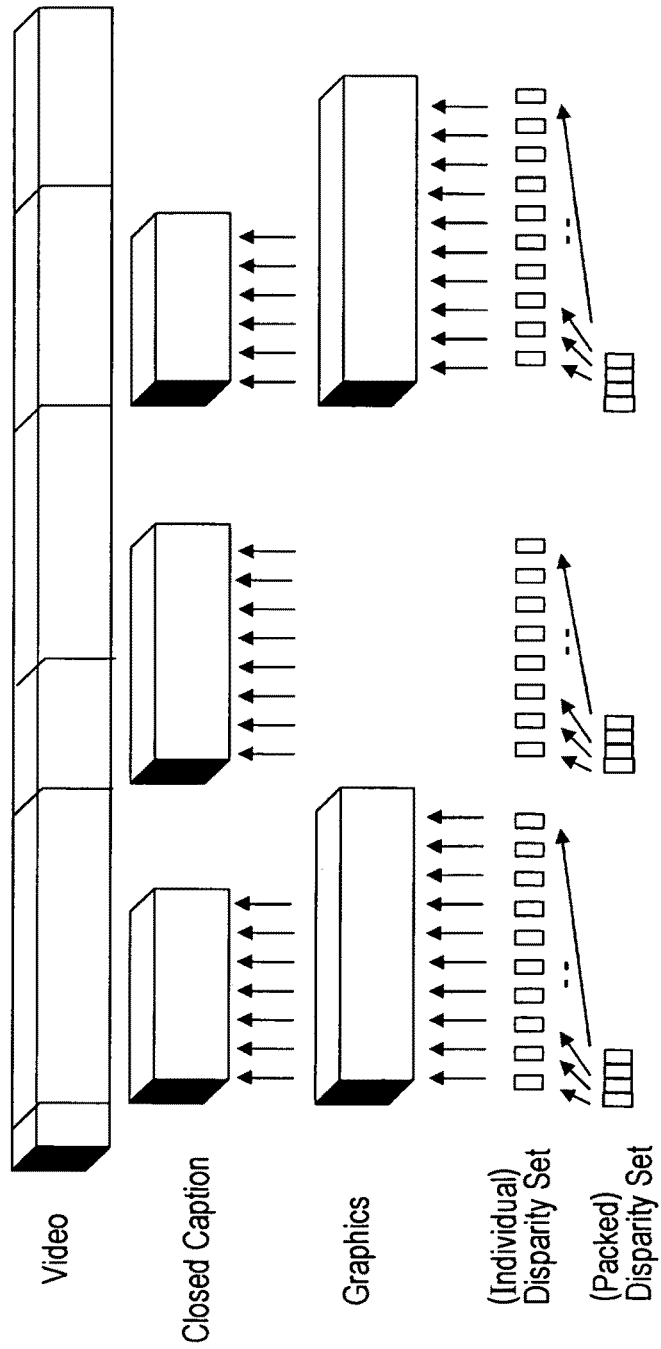
FIG. 81 is a diagram illustrating correspondence relationship of image data, closed caption data, graphics data, and a disparity information set, transmitted from the broadcasting station.

Also, for example, as illustrated in FIG. 81, image data, closed caption data, and graphics data are transmitted from the broadcasting station 100 (see FIG. 1). The disparity information sets (see FIG. 29, FIG. 31, FIG. 33, and FIG. 36) are transmitted by being embedded in an image data stream. In this case, predetermined unit-based disparity information sets corresponding to each certain period of time are collectively transmitted in sync with the start timing of each certain period of time of GOP, I picture, scene, or the like of encoded video. As for the predetermined unit, for example, picture (frame) unit, unit of integral multiple of picture, or the like can be conceived.

For example, with the stereoscopic image subtitle and graphics generating unit 226 and stereoscopic image text generating unit 227, disparity according to a disparity vector (information information) corresponding to superposition information is added for each predetermined unit, during a superposition period of time of the superposition information. An arrow added to the portions of closed caption data and graphics data in FIG. 81 represents timing for disparity being added to the superposition information for each predetermined unit. In this way, an arrangement is made wherein disparity is added to the superposition information, whereby disparity to be added to the superposition information can dynamically be changed in conjunction with change in image content.

[Another Configuration Example of Bit Stream Processing Unit]

Figure 82:
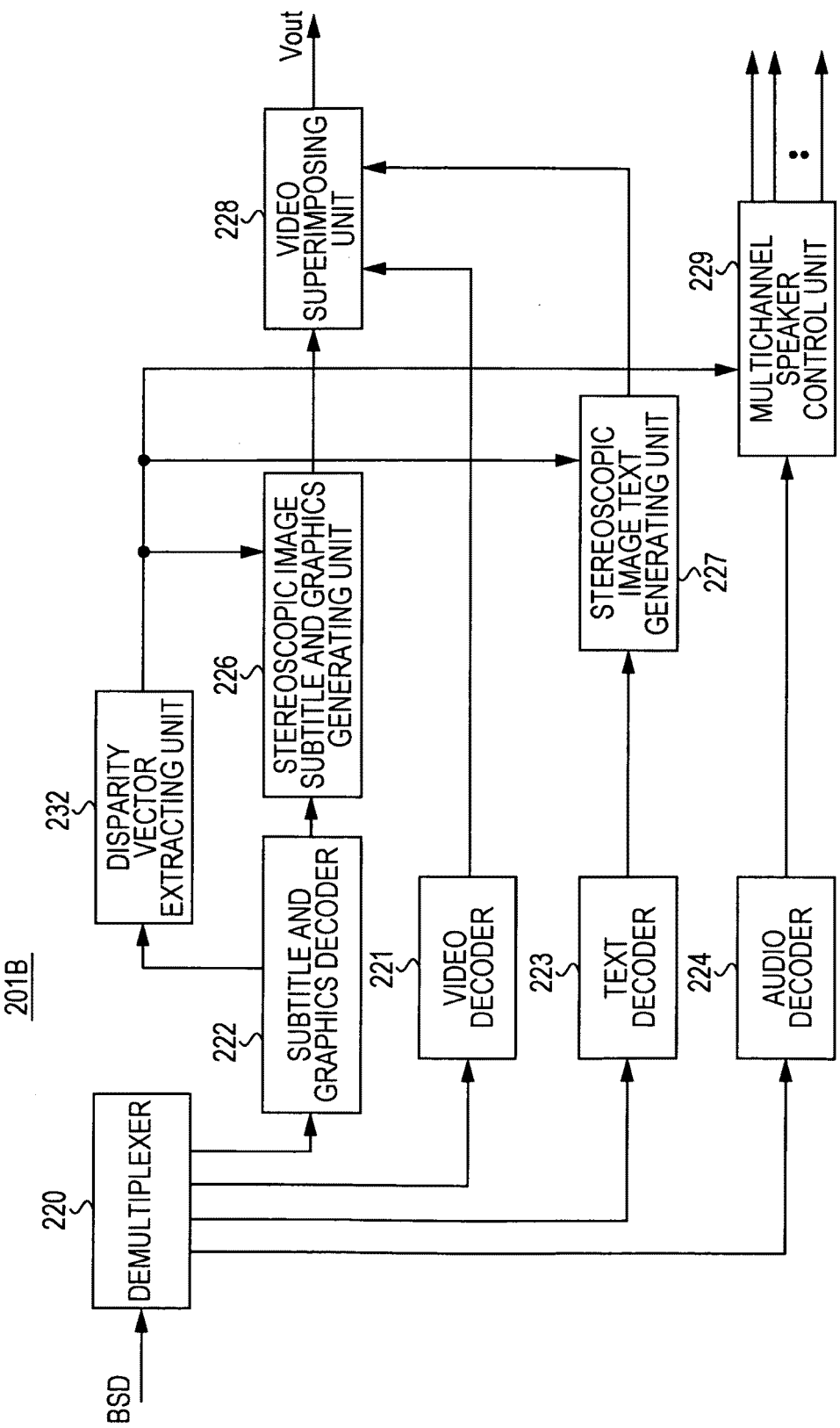
FIG. 82 is a block diagram illustrating another configuration example of the bit stream processing unit making up the set top box.

A bit stream processing unit 201B illustrated in FIG. 82 is configured to correspond to the above transmission data generating unit 110B illustrated in FIG. 15. In this FIG. 82, portions corresponding to FIG. 72 are denoted with the same reference numerals, and detailed description thereof will be omitted.

With this bit stream processing unit 201B, instead of the disparity vector decoder 255 of the bit stream processing unit 201 illustrated in FIG. 72, a disparity vector extracting unit 232 is provided. This disparity vector extracting unit 232 extracts from a subtitle or graphics stream obtained through the subtitle and graphics decoder 222 a disparity vector embedded therein. Subsequently, this disparity vector extracting unit 232 supplies the extracted disparity vector to the stereoscopic image subtitle and graphics generating unit 226, stereoscopic image text generating unit 227, and multichannel speaker control unit 229.

While detailed description will be omitted, others of the bit stream processing unit 201B illustrated in FIG. 72 are configured in the same way as with the bit stream processing unit 201 illustrated in FIG. 72, and operate in the same way. Note that application of disparity to the superposition information in the bit stream processing unit 201B in FIG. 82 is the same as application of disparity to the superposition information in the above bit stream processing unit 201A in FIG. 77 (see FIG. 78 through FIG. 81).

[Another Configuration of Bit Stream Processing Unit]

Figure 83:
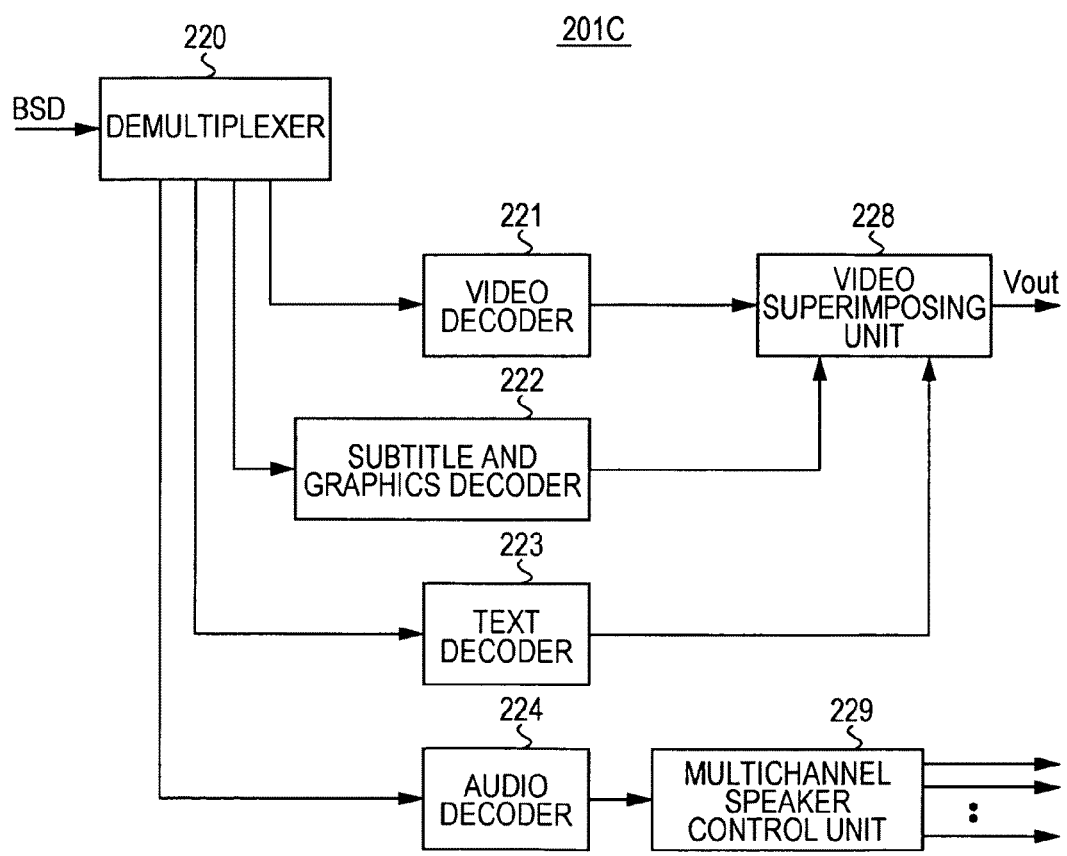
FIG. 83 is a block diagram illustrating another configuration example of the bit stream processing unit making up the set top box.

A bit stream processing unit 201C illustrated in FIG. 83 is configured to correspond to the above transmission data generating unit 110C illustrated in FIG. 21. In this FIG. 83, portions corresponding to FIG. 72 are denoted with the same reference numerals, and detailed description thereof will be omitted.

This bit stream processing unit 201C is a unit obtained by removing the disparity vector decoder 255, stereoscopic image subtitle and graphics generating unit 226, and stereoscopic image text generating unit 227 from the bit stream processing unit 201 illustrated in FIG. 72. In this case, the disparity vector is reflected on the data of subtitle information, graphics information, and text information beforehand.

The transmitted subtitle data or graphics data includes, as described above, the data of left eye subtitle information or graphics information to be superimposed on a left eye image, and the data of right eye subtitle information or graphics information to be superimposed on a right eye image. Similarly, the transmitted text data includes, as described above, the data of left eye text information to be superimposed on a left eye image, and the data of right eye text information to be superimposed on a right eye image. Accordingly, the necessity for the disparity vector decoder 255, stereoscopic image subtitle and graphics generating unit 226, and stereoscopic image text generating unit 227 is eliminated.

Note that the text data obtained at the text decoder 223 is code data (character code), so processing for converting this into bitmap data is needed. This processing is performed, for example, on the final stage of the text decoder 223, or on the input stage of the video superimposing unit 228.

[Another Configuration Example of Set Top Box]

Figure 84:
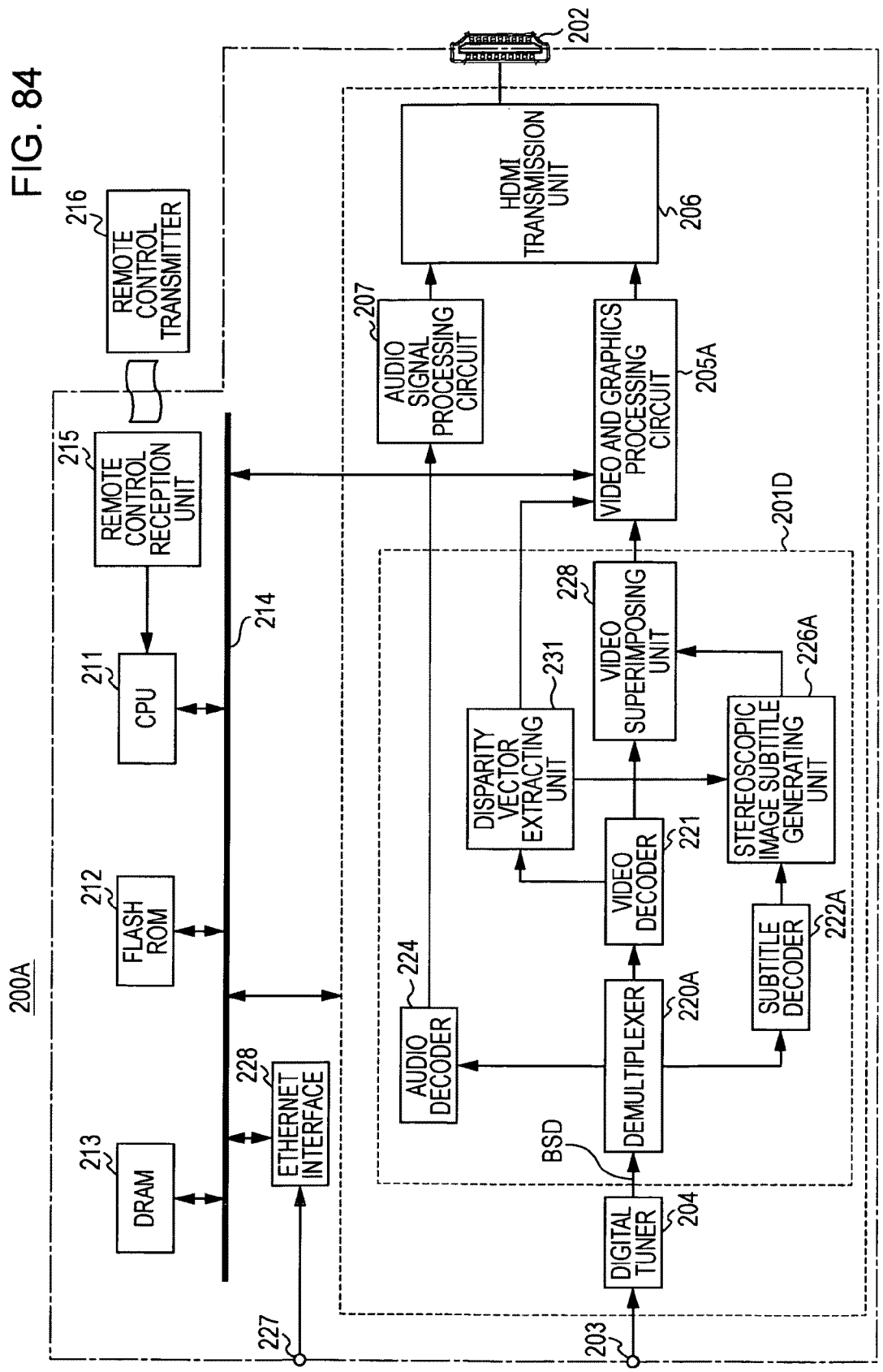
FIG. 84 is a block diagram illustrating another configuration example of the set top box.

FIG. 84 illustrates another configuration example of the set top box 200A. In this FIG. 84, portions corresponding to FIG. 71 and FIG. 77 are denoted with the same reference numerals, and detailed description thereof will be omitted as appropriate. This set top box 200A includes a bit stream processing unit 201D, an HDMI terminal 202, an antenna terminal 203, a digital tuner 204, a video and graphics processing circuit 205A, an HDMI transmission unit 206, and an audio signal processing circuit 207. Also, this set top box 200A includes a CPU 211, flash ROM 212, DRAM 213, internal bus 214, a remote control reception unit 215, a remote control transmitter 216, a network terminal 217, and an Ethernet interface 218. Note that "Ethernet" is a registered trademark.

The bit stream processing unit 201D extracts stereoscopic image data (left eye image data, right eye image data), audio data, superposition information data, disparity information (disparity vector), and so forth from the bit stream data BSD obtained at the digital tuner 204. With this example, superposition information data is subtitle data. This bit stream processing unit 201D is configured generally in the same way as with the bit stream processing unit 201A illustrated in FIG. 77.

The bit stream processing unit 201D includes a demultiplexer 220A, a video decoder 221, a subtitle decoder 222A, and an audio decoder 224. Also, this bit stream processing unit 210D includes a stereoscopic image subtitle generating unit 226A, a video superimposing unit 228, and a disparity vector extracting unit 231. The demultiplexer 220A extracts the packets of video, audio, and a subtitle from the bit stream data BSD, and transmits to each decoder.

The video decoder 221 restructures a video elementary stream from the video packet extracted at the demultiplexer 220A, performs decoding processing, and obtains stereoscopic image data including left eye image data and right eye image data. The subtitle decoder 222A restructures a subtitle elementary stream from a subtitle packet extracted at the demultiplexer 220A. Subsequently, this subtitle decoder 222A further performs decoding processing to obtain subtitle data. The audio decoder 224 restructures an audio elementary stream from an audio packet extracted at the demultiplexer 220A, performs decoding processing, obtains audio data, and outputs to the outside of the bit stream processing unit 201.

The disparity vector extracting unit 231 extracts from a video stream obtained through the video decoder 221 a disparity vector (disparity information set) embedded in a user data region thereof. Subsequently, this disparity vector extracting unit 231 supplies the extracted disparity vector to the stereoscopic image subtitle generating unit 226, and also outputs to the outside of the bit stream processing unit 201D.

The stereoscopic image subtitle generating unit 226A generates left eye and right eye subtitle information to be superimposed on a left eye image and a right eye image. This generation processing is performed based on the subtitle data obtained at the subtitle decoder 222A, and the disparity vector (disparity information set) supplied from the disparity vector extracting unit 231. In this case, the left eye and left eye subtitle information are the same information. However, with the superimposed position within the image, for example, the right eye subtitle information is shifted to the horizontal direction as to the left eye subtitle information by the horizontal direction component worth of the disparity vector. Subsequently, this stereoscopic image subtitle generating unit 226A outputs the data (bitmap data) of the left eye and right eye subtitle information.

The video superimposing unit 228 superimposes the data of the left eye and right eye subtitle information generated at the subtitle generating unit 226A on the stereoscopic image data (left eye image data, right eye image data) obtained at the video decoder 221 to obtain stereoscopic image data for display. Note that superposition of the superposition information data to the stereoscopic image data (left eye image data, right eye image data) is started by the timestamp of the system layer. Subsequently, this video superimposing unit 228 outputs the stereoscopic image data for display to the outside of the bit stream processing unit 201D.

An Ethernet interface 228 is connected to an unshown network such as the Internet or the like via a network terminal 227. The Ethernet interface 228 can also obtain, in response to the user's operations, various types of information via the network, for example, such as information of weather forecast, share prices, or the like, to be graphically displayed according to Widget. This Ethernet interface 228 is connected to the internal bus 214.

The video and graphics processing unit 205A subjects the stereoscopic image data output from the bit stream processing unit 201D to image quality adjustment processing according to need. Also, this video and graphics processing unit 205A superimposes, for example, the data of graphics information according to Widget on the stereoscopic image data for display output from the bit stream processing unit 201D.

The above disparity vector (disparity information set) output from the bit stream processing unit 201D is supplied to this video and graphics processing unit 205A. The video and graphics processing unit 205A adds disparity to the same graphics information to be superimposed on a left eye image and a right eye image based on this disparity vector (disparity information set). Thus, graphics information subjected to disparity adjustment according to perspective of each object within the image can be employed as the same graphics information to be superimposed on a left eye image and a right eye image, and consistency of perspective between objects within the image can be maintained with display of this graphics information.

The video and graphics processing unit 205A supplies the stereoscopic image data for display after processing thereof to the HDMI transmission unit 206. The audio signal processing circuit 207 subjects the audio data output from the bit stream processing unit 201D to audio quality adjustment processing or the like according to need, and supplies the audio data after processing thereof to the HDMI transmission unit 206. The HDMI transmission unit 206 outputs the image (video) and audio data of baseband from the HDMI terminal 202 by communication conforming to the HDMI. In this case, the HDMI transmission unit 206 subject, in order to transmit by the TMDS channel of the HDMI, the image and audio data to packing, and outputs to the HDMI terminal 202.

While detailed description will be omitted, the others of the set top box 200A illustrated in FIG. 84 are configured in the same way as with the set top box 200 illustrated in FIG. 71.

The operation of the set top box 200A illustrated in FIG. 84 will roughly be described. The television broadcasting signal input for the antenna terminal 203 is supplied to the digital tuner 204. With this digital tuner 204, the television broadcasting signal is processed, and predetermined bit stream data BSD corresponding to the user's selected channel is obtained. This bit stream data BSD is supplied to the bit stream processing unit 201D.

With this bit stream processing unit 201D, stereoscopic image data (left eye image data, right eye image data), audio data, subtitle data, disparity vector (disparity information set), and so forth are extracted. Also, with this bit stream processing unit 201D, the data of subtitle information is synthesized as to stereoscopic image data, and stereoscopic image data for display is generated.

In this case, with the bit stream processing unit 201D, based on the disparity vector, disparity is added to the same subtitle information to be superimposed on a left eye image and a right eye image. Thus, subtitle information subjected to disparity adjustment according to perspective of each object within the image can be employed as the same subtitle information to be superimposed on a left eye image and a right eye image, and with the display of this subtitle information, consistency of perspective between objects within the image is maintained.

The stereoscopic image data for display generated at the bit stream processing unit 201D is subjected to image quality adjustment at the video and graphics processing circuit 205A according to need. Also, with this video and graphics processing circuit 205A, according to need, the data of graphics information according to Widget is synthesized as to the stereoscopic image data generated at the bit stream processing unit 201D.

In this case, with the video and graphics processing circuit 205A, based on the disparity vector (disparity information set) supplied from the bit stream processing unit 201D, disparity is added to the same graphics information to be superimposed on a left eye image and a right eye image. Thus, graphics information subjected to disparity adjustment according to perspective of each object within the image can be employed as the same graphics information to be superimposed on a left eye image and a right eye image, and with display of this graphics information, consistency of perspective between objects within the image is maintained.

The stereoscopic image data for display obtained from the video and graphics processing circuit 205A is supplied to the HDMI transmission unit 206. Also, the audio data obtained at the bit stream processing unit 201D is subjected to audio quality adjustment processing at the audio signal processing circuit 207 according to need, and then supplied to the HDMI transmission unit 206. The stereoscopic image data and audio data supplied to the HDMI transmission unit 206 are transmitted from the HDMI terminal 202 to the HDMI cable 400 by the TMDS channel of the HDMI.

With the set top box 200A illustrated in FIG. 84, based on the disparity vector (disparity information set) extracted at the disparity vector extracting unit 231 of the bit stream processing unit 201D, disparity is added to the same subtitle information to be superimposed on a left eye image and a right eye image. Also, with the video and graphics processing circuit 205A, based on the disparity vector (disparity information set) thereof, disparity is added to the same graphics information to be superimposed on a left eye image and a right eye image. Accordingly, with regard to not only subtitle information to be transmitted from the broadcasting station but also graphics information generated within this set top box 200A, consistency of perspective between objects within the image can be maintained in the display thereof.

Figure 85:
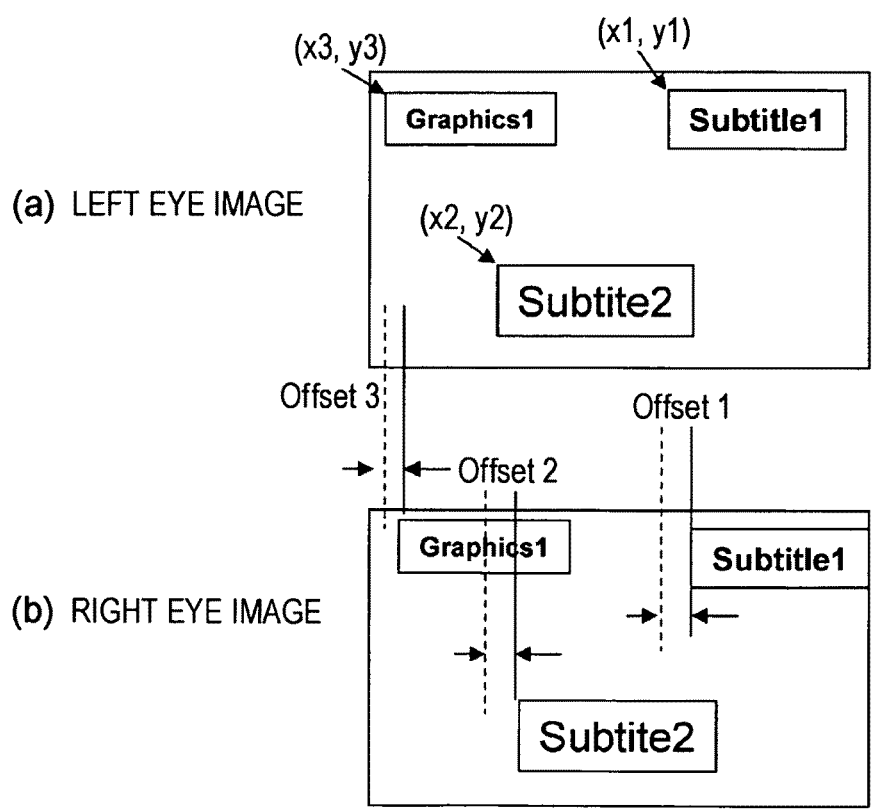
FIG. 85 is a diagram illustrating an example wherein subtitle information and graphics information are superimposed on a left eye image and a right eye image.

FIG. 85 illustrates a superposition example of subtitle information and graphics information as to a left eye image and a right eye image in the set top box 200A illustrated in FIG. 84. (a) in FIG. 85 illustrates a left eye image. With the bit stream processing unit 201D, subtitle information "Subtitle 1" is superimposed in the position of (x1, y1), and subtitle information "Subtitle 1" is superimposed in the position of (x2, y2). Also, with the video and graphics processing circuit 205A, graphics information "Graphics 1" is superimposed in the position of (x3, y3).

(b) in FIG. 85 illustrates a right eye image. With the bit stream processing unit 201D, subtitle information "Subtitle 1" is superimposed in a position shifted by offset 1 (Offset 1) as to the superimposed position of the left eye image based on the corresponding disparity vector. Similarly, with this bit stream processing unit 201D, subtitle information "Subtitle 2" is superimposed in the position shifted by offset 2 (Offset 2) as to the superimposed position of the left eye image based on the corresponding disparity vector. Also, with the video and graphics processing circuit 205A, graphics information "Graphics 1" is superimposed in a position shifted by offset 3 (Offset 3) as to the superposition of the left eye image.

Note that, with the set top box 200A illustrated in FIG. 84, subtitle information is handled at the bit stream processing unit 201D, and also graphics information is handled at the video and graphics processing unit 205A, but other superposition information can also be handled in the same way.

[Description of Television Receiver]

Returning to FIG. 1, the television receiver 300 receives stereoscopic image data transmitted from the set top box 200 via the HDMI cable 400. This television receiver 300 includes a 3D signal processing unit 301. This 3D signal processing unit 301 subjects the stereoscopic image data to processing (decoding processing) corresponding to the transmission method to generate left eye image data and right eye image data. Specifically, this 3D signal processing unit 301 performs processing contrary to the video framing unit 112 in the transmission data generating units 110, 110A, 110B, 110C, 110D, and 110E illustrated in FIG. 2, FIG. 13, FIG. 15, FIG. 21, FIG. 22, and FIG. 62. Subsequently, this 3D signal processing unit 301 obtains left eye image data and right eye image data making up the stereoscopic image data.

[Configuration Example of Television Receiver]

Figure 86:
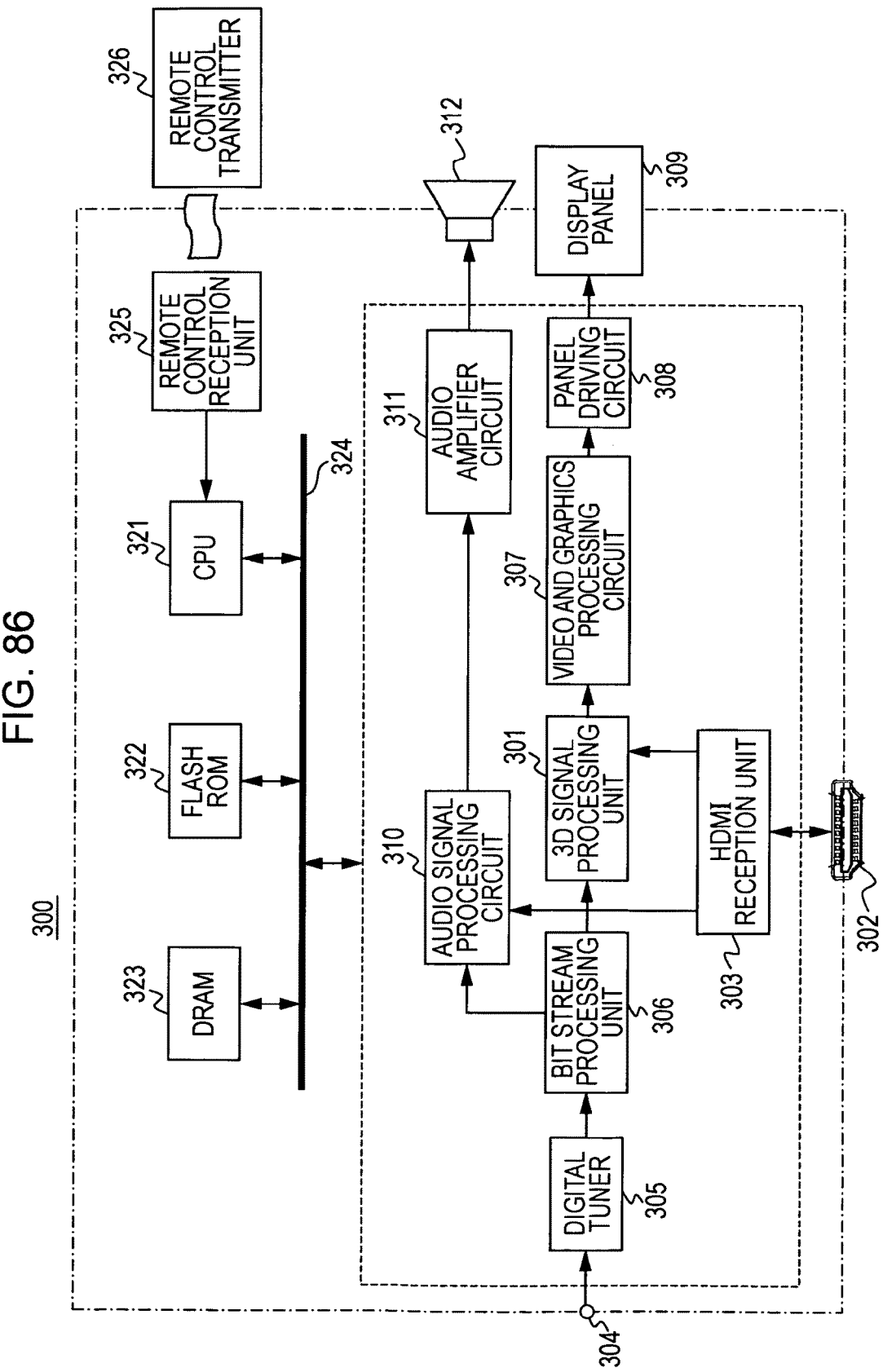
FIG. 86 is a diagram illustrating a configuration example of a television receiver making up the stereoscopic image display system.

A configuration example of the television receiver 300 will be described. FIG. 86 illustrates a configuration example of the television receiver 300. This television receiver 300 includes a 3D signal processing unit 301, an HDMI terminal 302, an HDMI reception unit 303, an antenna terminal 304, a digital tuner 305, and a bit stream processing unit 306.

Also, this television receiver 300 includes a video and graphics processing circuit 307, a panel driving circuit 308, a display panel 309, an audio signal processing circuit 310, an audio amplifier circuit 311, and a speaker 312. Also, this television receiver 300 includes a CPU 321, flash ROM 322, DRAM 323, internal bus 324, a remote control reception unit 325, and a remote control transmitter 326.

The antenna terminal 304 is a terminal for inputting a television broadcasting signal received at a reception antenna (not illustrated). The digital tuner 305 processes the television broadcasting signal input to the antenna terminal 304, and outputs predetermined bit stream data (transport stream) corresponding to the user's selected channel.

The bit stream processing unit 306 is configured in the same way as with the bit stream processing unit 201 of the set top box 200 illustrated in FIG. 71. This bit stream processing unit 306 extracts stereoscopic image data (left eye image data, right eye image data), audio data, superposition information data, disparity vector (disparity information), and so forth. The superposition information data is subtitle data, graphics data, text data (including closed caption data), or the like. This bit stream processing unit 306 synthesizes the superposition information as to the stereoscopic image data to obtain stereoscopic image data for display. Also, the bit stream processing unit 306 outputs audio data.

The HDMI reception unit 303 receives uncompressed image data and audio data supplied to the HDMI terminal 302 via the HDMI cable 400 by communication conforming to the HDMI. This HDMI reception unit 303 of which the version is, for example, HDMI 1.4, is in a state in which the stereoscopic image data can be handled. The details of this HDMI reception unit 303 will be described later.

The 3D signal processing unit 301 subjects the stereoscopic image data received at the HDMI reception unit 303 or obtained at the bit stream processing unit 306 to decoding processing to generate left eye image data and right eye image data. In this case, the 3D signal processing unit 301 subjects the stereoscopic image data obtained at the bit stream processing unit 306 to decoding processing corresponding to the transmission method (see FIG. 4). Also, the 3D signal processing unit 301 subjects the stereoscopic image data received at the HDMI reception unit 303 to decoding processing corresponding to a later-described TMDS transmission data structure.

The video and graphics processing circuit 307 generates image data for displaying a stereoscopic image based on the left eye image data and right eye image data generated at the 3D signal processing unit 301. Also, the video and graphics processing circuit 307 subjects the image data to image quality adjustment processing according to need. Also, the video and graphics processing circuit 307 synthesizes the data of superposition information, such as a menu, program listing, or the like, as to the image data according to need. The panel driving circuit 308 drives the display panel 309 based on the image data output from the video and graphics processing circuit 307. The display panel 309 is configured of, for example, an LCD (Liquid Crystal Display), PDP (Plasma Display Panel), or the like.

The audio signal processing circuit 310 subjects the audio data received at the HDMI reception unit 303 or obtained at the bit stream processing unit 306 to necessary processing such as D/A conversion or the like. The audio amplifier circuit 311 amplifies the audio signal output from the audio signal processing circuit 310, supplies to the speaker 312.

The CPU 321 controls the operation of each unit of the television receiver 300. The flash ROM 322 performs storing of control software and storing of data. The DRAM 323 makes up the work area of the CPU 321. The CPU 321 loads the software and data read out from the flash ROM 322 to the DRAM 323, starts up the software, and controls each unit of the television receiver 300.

The remote control unit 325 receives the remote control signal (remote control code) transmitted from the remote control transmitter 326, and supplies to the CPU 321. The CPU 321 controls each unit of the television receiver 300 based on this remote control code. The CPU 321, flash ROM 322, and DRAM 323 are connected to the internal bus 324.

The operation of the television receiver 300 illustrated in FIG. 86 will briefly be described. The HDMI reception unit 303 receives the stereoscopic image data and audio data transmitted from the set top box 200 connected to the HDMI terminal 302 via the HDMI cable 400. This stereoscopic image data received at this HDMI reception unit 303 is supplied to the 3D signal processing unit 301. Also, the audio data received at this HDMI reception unit 303 is supplied to the audio signal processing unit 310.

The television broadcasting signal input to the antenna terminal 304 is supplied to the digital tuner 305. With this digital tuner 305, the television broadcasting signal is processed, and predetermined bit stream data (transport stream) corresponding to the user's selected channel is output.

The bit stream data output from the digital tuner 305 is supplied to the bit stream processing unit 306. With this bit stream processing unit 306, stereoscopic image data (left eye image data, right eye image data), audio data, superposition information data, disparity vector (disparity information), and so forth are extracted from the bit stream data. Also, with this bit stream processing unit 306, the data of superposition information (closed caption information, subtitle information, graphics information, or text information) is synthesized as to the stereoscopic image data, and stereoscopic image data for display is generated.

The stereoscopic image data for display generated at the bit stream processing unit 306 is supplied to the 3D signal processing unit 301. Also, the audio data obtained at the bit stream processing unit 306 is supplied to the audio signal processing circuit 310.

With the 3D signal processing unit 301, the stereoscopic image data received at the HDMI reception unit 303 or obtained at the bit stream processing unit 306 is subjected to decoding processing, and left eye image data and right eye image data are generated. The left eye image data and right eye image data are supplied to the video and graphics processing circuit 307. With this video and graphics processing circuit 307, based on the left eye image data and right eye image data, image data for displaying a stereoscopic image is generated, and image quality adjustment processing, or synthesizing processing of superposition information data is also performed according to need.

The image data obtained at this video and graphics processing circuit 307 is supplied to the panel driving circuit 308. Therefore, a stereoscopic image is displayed by the display panel 309. For example, a left image according to left eye image data, and a right image according to right eye image data are alternately displayed in a time-sharing manner. The viewer can view the left eye image alone by the left eye, and the right eye image alone by the right eye, and consequently can sense the stereoscopic image by wearing shutter glasses wherein the left eye shutter and right eye shutter are alternately opened in sync with display of the display panel 309.

Also, with the audio signal processing circuit 310, the audio data received at the HDMI reception unit 303 or obtained at the bit stream processing unit 306 is subjected to necessary processing such as D/A conversion or the like. This audio data is amplified at the audio amplifier circuit 311, and then supplied to the speaker 312. Therefore, audio corresponding to the display image of the display panel 309 is output from the speaker 312.

[Configuration Example of HDMI Transmission Unit and HDMI Reception Unit]

Figure 87:
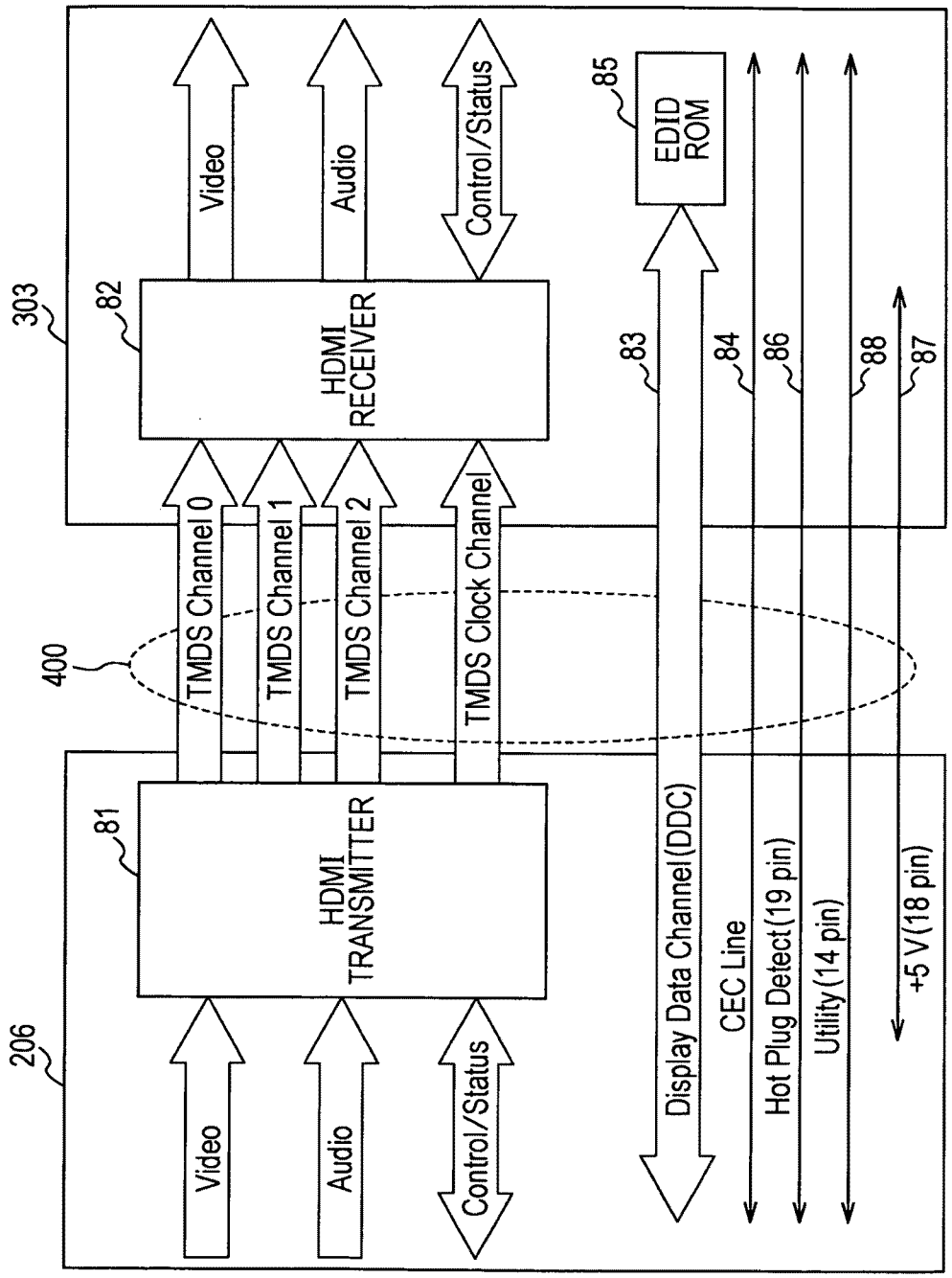
FIG. 87 is a block diagram illustrating a configuration example of an HDMI transmission unit (HDMI source) and an HDMI reception unit (HDMI sink).

FIG. 87 illustrates, with the stereoscopic image display system 10 in FIG. 1, a configuration example of the HDMI transmission unit (HDMI source) 206 of the set top box 200, and the HDMI reception unit (HDMI sink) 303 of the television receiver 300.

The HDMI transmission unit 206 transmits differential signals corresponding to the pixel data of uncompressed one screen worth of image to the HDMI reception unit 303 in one direction during an effective image section (hereafter, also referred to as "active video section"). Here, the effective image section is a section obtained by removing the horizontal blanking section and the vertical blanking section from a section between a certain vertical synchronizing signal and the next vertical synchronizing signal. Also, the HDMI transmission unit 206 transmits differential signals corresponding to the audio data, control data, other auxiliary data, and so forth, following at least an image, to the HDMI reception unit 303 in one direction using multiple channels during the horizontal blanking section or vertical blanking section.

The following transmission channels are provided as the transmission channels of the HDMI system made up of the HDMI transmission unit 206 and the HDMI reception unit 303. Specifically, there are three TMDS channels #0 through #2 serving as transmission channels for serially transmitting pixel data and audio data from the HDMI transmission unit 206 to the HDMI reception unit 303 in one direction in sync with pixel clock. Also, there is a TMDS clock channel serving as a transmission channel for transmitting pixel clock.

The HDMI transmission unit 206 includes an HDMI transmitter 81. The transmitter 81 converts, for example, the pixel data of an uncompressed image into corresponding differential signals, and serially transmits to the HDMI reception unit 303 connected via the HDMI cable 400 in one direction by the three TMDS channels #0, #1, and #2 which are multiple channels.

Also, the transmitter 81 converts audio data following an uncompressed image, further necessary control data and other auxiliary data, and so forth into corresponding differential signals, and serially transmits to the HDMI reception unit 303 in one direction by the three TMDS channels #0, #1, and #2.

Further, the transmitter 81 transmits pixel clock in sync with pixel data transmitted by the three TMDS channels #0,

1, and #2 to the HDMI reception unit 303 connected via the HDMI cable 400 using the TMDS clock channel. Here, with one TMDS channel #i (i=0, 1, 2), 10-bit pixel data is transmitted during one clock of the pixel clock.

The HDMI reception unit 303 receives the differential signal corresponding to the pixel data transmitted from the HDMI transmission unit 206 in one direction during an active video section using the multiple channels. Also, this HDMI reception unit 303 receives the differential signals corresponding to the audio data and control data transmitted from the HDMI transmission unit 206 in one direction during the horizontal blanking section or vertical blanking section using the multiple channels.

Specifically, the HDMI reception unit 303 includes an HDMI receiver 82. This HDMI receiver 82 receives the differential signal, and the differential signals corresponding to the audio data and control data, transmitted from the HDMI transmission unit 206 in one direction, using the TMDS channels #0, #1, and #2. In this case, the HDMI receiver receives the differential signals in sync with the pixel clock transmitted from the HDMI transmission unit 206 by the TMDS clock channel.

The transmission channels of the HDMI system include, in addition to the above TMDS channels #0 through #2 and the TMDS clock channel, transmission channels called as a DDC (Display Data Channel) 83 and a CEC line 84. The DDC 83 is made up of unshown two signal lines included in the HDMI cable 400. The DDC 83 is used for the HDMI transmission unit 206 reading out E-EDID (Enhanced Extended Display Identification Data) from the HDMI reception unit 303.

Specifically, the HDMI reception unit 303 includes EDID ROM (Read Only Memory) 85 in which the E-EDID that is performance information relating to the self performance (Configuration/capability) in addition to the HDMI receiver 81. The HDMI transmission unit 206 reads out the E-EDID via the DDC 83 from the HDMI reception unit 303 connected via the HDMI cable 400, for example, in response to a request from the CPU 211 (see FIG. 71).

The HDMI transmission unit 206 transmits the read E-EDID to the CPU 211. The CPU 211 stores this E-EDID in the flash ROM 212 or DRAM 213. The CPU 211 recognizes the performance settings of the HDMI reception unit 303 based on the E-EDID. For example, the CPU 211 recognizes whether or not the television receiver 300 included in the HDMI reception unit 303 can handle stereoscopic image data, and in the event that stereoscopic image data can be handled, further recognizes what kind of TMDS transmission data structure can be handled.

The CEC line 84 is made up of unshown one signal line included in the HDMI cable 400, and is used for performing bidirectional communication of data for control between the HDMI transmission unit 206 and the HDMI reception unit 303. This CEC line 84 makes up a control data line.

Also, the HDMI cable 400 includes a line 86 connected to a pin called as HPD (Hot Plug Detect). The source device can detect connection of the sink device by taking advantage of this line 86. Note that this HPD line 86 is also used as an HEAC− line making up a bidirectional communication path. Also, the HDMI cable 400 includes a line (power supply line) 87 used for supplying power from the source device to the sink device. Further, the HDMI cable 400 includes a utility line 88. This utility line 88 is used as HEAC+ line making up the bidirectional communication path.

Figure 88:
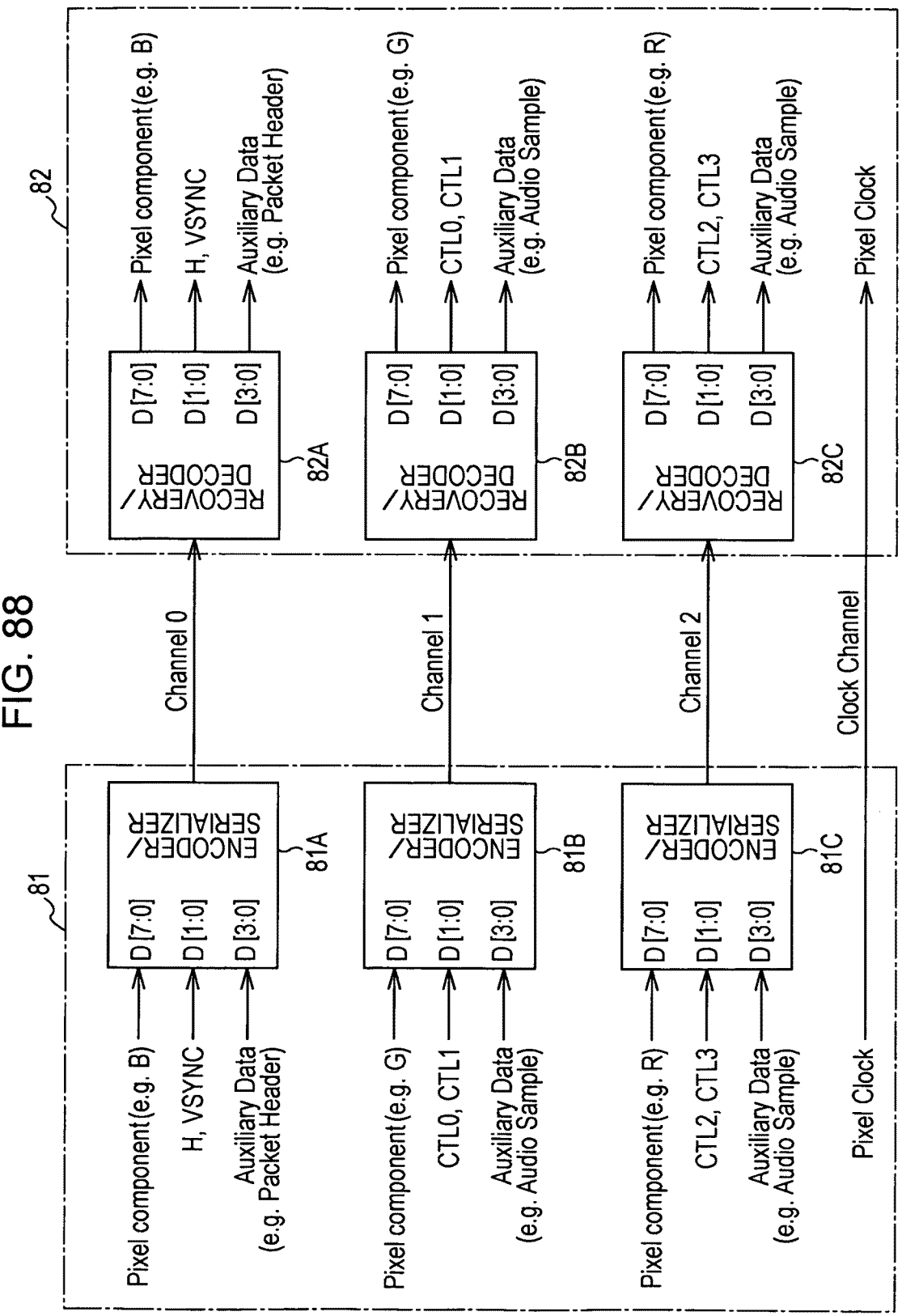
FIG. 88 is a block diagram illustrating a configuration example of an HDMI transmitter making up the HDMI transmission unit, and an HDMI receiver making up the HDMI reception unit.

FIG. 88 illustrates a configuration example of the HDMI transmitter 81 and HDMI receiver 82 in FIG. 87. The HDMI transmitter 81 includes three encoders/serializers 81A, 81B, and 81C corresponding to the three TMDS channels #0, #1, and #2 respectively. Subsequently, each of the encoders/serializers 81A, 81B, and 81C encodes image data, auxiliary data, and control data supplied thereto, converts parallel data into serial data, and transmits by a differential signal. Now, in the event that the image data includes, for example, three components of R, G, and B, the B component is supplied to the encoder/serializer 81A, the G component is supplied to the encoder/serializer 81B, and the R component is supplied to the encoder/serializer 81C.

Also, examples of the auxiliary data include audio data and a control packet, the control packet is supplied, for example, to the encoder/serializer 81A, and the audio data is supplied to the encoders/serializers 81B and 81C. Further, as the control data, there are a 1-bit vertical synchronizing signal (VSYNC), a 1-bit horizontal synchronizing signal (HSYNC), and control bits CTL0, CTL1, CTL2, and CTL3 each made up of one 1 bit. The vertical synchronizing signal and horizontal synchronizing signal are supplied to the encoder/serializer 81A. The control bits CTL0 and CTL1 are supplied to the encoder/serializer 81B, and the control bits CTL2 and CTL3 are supplied to the encoder/serializer 81C.

The encoder/serializer 81A transmits the B component of the image data, vertical synchronizing signal, horizontal synchronizing signal, and auxiliary data, supplied thereto, in a time-sharing manner. Specifically, the encoder/serializer 81A takes the B component of the image data supplied thereto as parallel data in increments of 8 bits that is a fixed number of bits. Further, the encoder/serializer 81A encodes the parallel data thereof, converts into serial data, and transmits using the TMDS channel #0.

Also, the encoder/serializer 81A encodes the 2-bit parallel data of the vertical synchronizing signal and horizontal synchronizing signal supplied thereto, converts into serial data, and transmits using the TMDS channel #0. Further, the encoder/serializer 81A takes the auxiliary data supplied thereto as parallel data in increments of 4 bits. Subsequently, the encoder/serializer 81A encodes the parallel data thereof, converts into serial data, and transmits using the TMDS channel #0.

The encoder/serializer 81B transmits the G component of the image data, control bits CTL0 and CTL1, and auxiliary data, supplied thereto, in a time-sharing manner. Specifically, the encoder/serializer 81B takes the G component of the image data supplied thereto as parallel data in increments of 8 bits that is a fixed number of bits. Further, the encoder/serializer 81B encodes the parallel data thereof, converts into serial data, and transmits using the TMDS channel #1.

Also, the encoder/serializer 81B encodes the 2-bit parallel data of the control bits CTL0 and CTL1 supplied thereto, converts into serial data, and transmits using the TMDS channel #1. Further, the encoder/serializer 81B takes the auxiliary data supplied thereto as parallel data in increments of 4 bits. Subsequently, the encoder/serializer 81B encodes the parallel data thereof, converts into serial data, and transmits using the TMDS channel #1.

The encoder/serializer 81C transmits the R component of the image data, control bits CTL2 and CTL3, and auxiliary data, supplied thereto, in a time-sharing manner. Specifically, the encoder/serializer 81C takes the R component of the image data supplied thereto as parallel data in increments of 8 bits that is a fixed number of bits. Further, the encoder/serializer 81C encodes the parallel data thereof, converts into serial data, and transmits using the TMDS channel #2.

Also, the encoder/serializer 81C encodes the 2-bit parallel data of the control bits CTL2 and CTL3 supplied thereto, converts into serial data, and transmits using the TMDS channel #2. Further, the encoder/serializer 81C takes the auxiliary data supplied thereto as parallel data in increments of 4 bits. Subsequently, the encoder/serializer 81C encodes the parallel data thereof, converts into serial data, and transmits using the TMDS channel #2.

The HDMI receiver 82 includes three recoveries/decoders 82A, 82B, and 82C corresponding to the three TMDS channels #0, #1, and #2 respectively. Subsequently, each of the recoveries/decoders 82A, 82B, and 82C receives image data, auxiliary data, and control data transmitted by differential signals using the TMDS channels #0, #1, and #2. Further, each of the recoveries/decoders 82A, 82B, and 82C converts the image data, auxiliary data, and control data from serial data to parallel data, and further decodes and outputs these.

Specifically, the recovery/decoder 82A receives the B component of the image data, vertical synchronizing signal, horizontal synchronizing signal, and auxiliary data, transmitted by differential signals using the TMDS channel #0. Subsequently, the recovery/decoder 82A converts the B component of the image data, vertical synchronizing signal, horizontal synchronizing signal, and auxiliary data thereof from serial data to parallel data, and decodes and outputs these.

The recovery/decoder 82B receives the G component of the image data, control bits CTL0 and CTL1, and auxiliary data, transmitted by differential signals using the TMDS channel #1. Subsequently, the recovery/decoder 82B converts the G component of the image data, control bits CTL0 and CTL1, and auxiliary data thereof from serial data to parallel data, and decodes and outputs these.

The recovery/decoder 82C receives the R component of the image data, control bits CTL2 and CTL3, and auxiliary data, transmitted by differential signals using the TMDS channel #2. Subsequently, the recovery/decoder 82C converts the R component of the image data, control bits CTL2 and CTL3, and auxiliary data thereof from serial data to parallel data, and decodes and outputs these.

Figure 89:
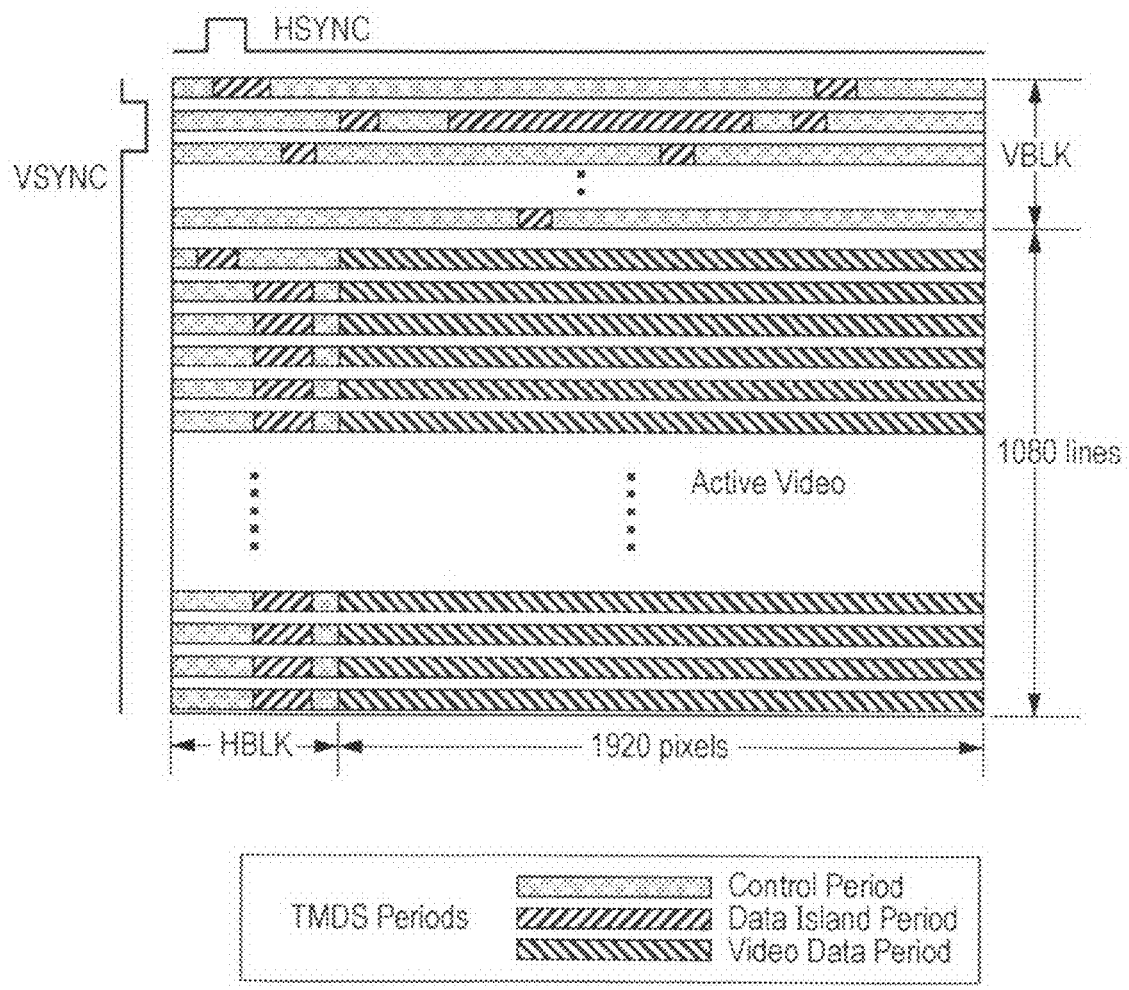
FIG. 89 is a diagram illustrating a configuration example of TMDS transmission data (in the event that image data with width×length being 1920 pixels×1080 lines).

FIG. 89 illustrates a structure example of the TMDS transmission data. This FIG. 89 illustrates the sections of various types of transmission data in the event that image data with width×length of 1920 pixels×1080 lines is transmitted using the TMDS channels #0, #1, and #2.

With a video field (Video Field) where transmission data is transmitted using the three TMDS channels #0, #1, and #2 of the HDMI, there are three types of sections according to the type of transmission. These three types of sections are a video data section (Vide Data period), a data island section (Data Island period), and a control section (Control period).

Here, a video field section is a section from the leading edge (active edge) of a certain vertical synchronizing signal to the leading edge of the next vertical synchronizing signal. This video field section is divided into a horizontal blanking period (horizontal blanking), a vertical blanking period (vertical blanking), and an, active video section (Active Video). This active video section is a section obtained by removing the horizontal blanking period and the vertical blanking period from the video field section.

The video data section is assigned to the active video section. With this video data section, the data of 1920 pixels× 1080 lines worth of effective pixels (Active pixels) making up uncompressed one screen worth of image data is transmitted.

The data island section and control section are assigned to the horizontal blanking period and vertical blanking period. With the data island section and control section, auxiliary data (Auxiliary data) is transmitted. That is to say, the data island section is assigned to a portion of the horizontal blanking period and vertical blanking period. With this data island section, of the auxiliary data, data not relating to control, e.g., the packet of audio data, and so forth are transmitted.

The control section is assigned to another portion of the horizontal blanking period and vertical blanking period. With this control section, of the auxiliary data, data relating to control, e.g., the vertical synchronizing signal and horizontal synchronizing signal, control packet, and so forth are transmitted.

FIG. 90 illustrates an example of the pin alignment of the HDMI terminal. The pin alignment illustrated in FIG. 90 is called as type A (type-A). TMDS data #i+ and TMDS data #i− that are the differential signal of the TMDS channel #i are transmitted by two lines that are differential lines. These two lines are connected to pins to which the TMDS Data #i+ is assigned (pins having a pin number of 1, 4, or 7), and pins to which the TMDS Data is assigned (pins having a pin number of 3, 6, or 9).

Also, the CEC line 84 where a CEC signal that is data for control is transmitted is connected to a pin of which the pin number is 13. Also, a line where an SDA (Serial Data) signal such as the E-EDID or the like is transmitted is connected to a pin of which the pin number is 16. A line where an SCL (Serial Clock) signal that is a clock signal to be used for synchronization at the time of transmission/reception of the SDA signal is transmitted is connected to a pin of which the pin number is 15. The above DDC 83 is configured of a line where the SDA signal is transmitted, and a line where the SCL signal is transmitted.

Also, the HDP line (HEAC− line) 86 for the source device detecting connection of the sink device as described above is connected to a pin of which the pin number is 19. Also, the utility line (HEAC+ line) 88 is connected to a pin of which the pin number is 14. Also, the line 87 for supplying power supply as described above is connected to a pin of which the pin number is 18.

[E-EDID Structure]

As described above, the HDMI transmission unit 206 reads out the E-EDID via the DDC 83 from the HDMI reception unit 303 connected via the HDMI cable 400, for example, in response to a request from the CPU 211 (see FIG. 71). Subsequently, the CPU 211 recognizes, based on this E-EDID, whether or not the performance settings of the HDMI reception unit 303, e.g., handling of stereoscopic image data is available.

Figure 91:
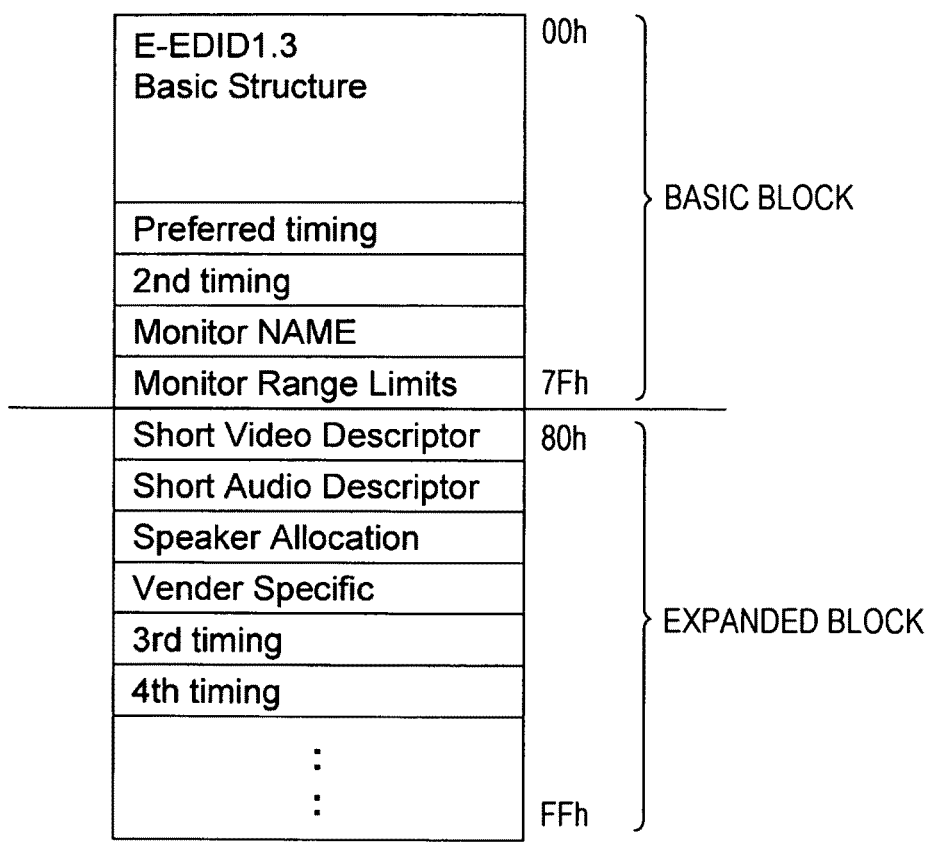
FIG. 91 is a diagram illustrating a data structure example of E-EDID.

FIG. 91 illustrates a data structure example of the E-EDID. The E-EDID is made up of a basic block and an extended block. With the basic block, data stipulated by the E-EDID1.3 standard represented with "E-EDID1.3 Basic Structure" is disposed on the head. With the basic block, subsequently, timing information for keeping compatible with the conventional EDID represented with "Preferred timing" is disposed. Also, with the basic block, subsequently, timing information different from "Preferred timing" for keeping compatible with the conventional EDID represented with "2nd timing" is disposed.

Also, with the basic block, subsequently to the "2nd timing", information indicting the name of a display device represented with "Monitor NAME" is disposed. With the basic block, subsequently, information indicating the number of displayable pixels regarding a case where the aspect ratio is 4:3 and 16:9 is disposed.

"Short Video Descriptor" is disposed in the head of the extended block. This is information indicating a displayable image size (resolution), a frame rate, and whether interlaced or progressive. Subsequently, "Short Audio Descriptor" is disposed. This is information such as a playable audio codec method, a sampling frequency, a cutoff band, the number of codec bits, and so forth. Subsequently, information relating to left and right speakers represented with "Speaker Allocation" is disposed.

Also, with the extended block, subsequently to "Speaker Allocation", data defined uniquely by a maker represented with "Vender Specific" is disposed. With the extended block, timing information for keeping compatible with the conventional EDID represented with "3rd timing" is disposed. With the extended block, further subsequently, timing information for keeping compatible with the conventional EDID represented with "4th timing" is disposed.

FIG. 92 illustrates a data structure example of a Vender Specific region (HDMI Vendor Specific Data Block). With this Vender Specific region, the 0'th block through the N'th block that are 1-byte blocks are provided.

With the 0'th block, a header indicating the data region of the data "Vender Specific" represented with "Vender-Specific tag code (=3)" is disposed. Also, with this 0'th block, information indicating the length of the data "Vender Specific" represented with "Length (=N)" is disposed. Also, with the first block through the third block, information indicting a number "0x0000C3" registered as for HDMI (R) represented with "24bit IEEE Registration Identifier (0x000C3) LSB first" is disposed. Further, with the fourth block and the fifth block, information indicating the 24-bit physical address of the sink device, represented with each of "A", "B", "C", and "D" is disposed.

With the sixth block, a flag indicating a function to which the sink device can handle, represented with "Supports-AI" is disposed. Also, with this sixth block, each of the information specifying the number of bits per one pixel, represented with each of "DC-48bit", "DC-36bit", and "DC-30bit" is disposed. Also, with this sixth block, a flag indicating whether or not the sink device can handle transmission of an image of YCbCr4:4:4, represented with "DC-Y444" is disposed. Further, with this sixth block, a flag indicating whether or not the sink device can handle dual DVI (Digital Visual Interface), represented with "DVI-Dual" is disposed.

Also, with the seventh block, information indicating the maximum frequency of the TMDS pixel clock represented with "Max-TMDS-Clock" is disposed. Also, with the sixth bit and seventh bit of the eighth block, a flag indicating whether or not there is delay information of video and audio represented with "Latency" is disposed. Also, with the fifth bit of the eighth block, a flag indicating whether or not handling of an additional HDMI video format (3D, 4 k×2 k) represented with "HDMI_Video_present" is available is disposed.

Also, with the ninth block, the delay time data of progressive video represented with "Video Latency" is disposed, and with the tenth block, the delay time data of audio accompanying progressive video, represented with "Audio Latency" is disposed. Also, with the eleventh block, the delay time data of interlaced video, represented with "Interlaced Video Latency" is disposed. Further, with the twelfth block, the delay time data of audio accompanying interlaced video, represented with "Interlaced Audio Latency" is disposed.

Also, with the seventh bit of the thirteenth block, a flag indicating whether or not handling of 3D image data represented with "3D_present" is available is disposed. Also, with the seventh bit through the fifth bit of the fourteenth block, block size information indicating a data structure that can be handled other than a mandatory 3D data structure disposed in the unshown fifteenth block and thereafter, represented with "HDMI_VIC_LEN" is disposed. Also, with the fourth bit through the 0'th bit of the fourteenth block, block size information indicating 4 k×2 k video format that can be handled, disposed in the unshown fifteenth block and thereafter, represented with "HDMI_3D_LEN" is disposed.

[TMDS Transmission Data Structure of Stereoscopic Image Data]

Figure 93:
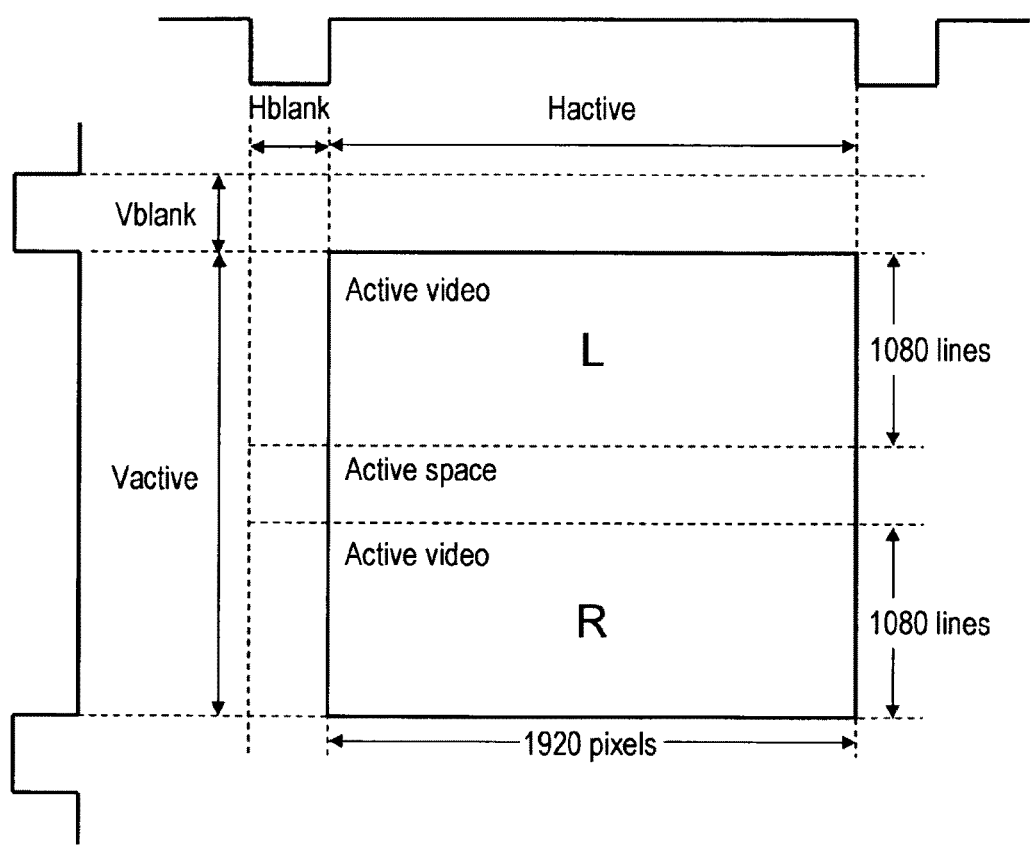
FIG. 93 is a diagram illustrating a 3D video format according to a frame packing method that is one of TMDS transmission data structures of stereoscopic image data.

FIG. 93 illustrates the 3D video format (3D Video Format) of the frame packing (Frame packing) method that is one of the TMDS transmission data structures of stereoscopic image data. This 3D video format is a format for transmitting the left eye (L) and right eye (R) image data of the progressive method as stereoscopic image data.

With this 3D video format, transmission of image data of 1920×1080 p and 1080×720 p pixel formats is performed as the left eye (L) and right eye (R) image data. Note that FIG. 93 illustrates an example wherein each of the left eye (L) and right eye (R) image data is 1920 lines×1080 pixels.

According to this 3D video format, transmission data with a video field section including a horizontal blanking period (Hblank), a vertical blanking period (Vblank), and an active video section (Hactive×Vactive), delimited by a vertical synchronizing signal, as an unit is generated. With this 3D video format, an active video section includes two active video regions (Active video), and one active space region (Active space) therebetween. The left eye (L) image data is disposed in the first active video region, and the right eye (R) image data is disposed in the second active video region.

Figure 94:
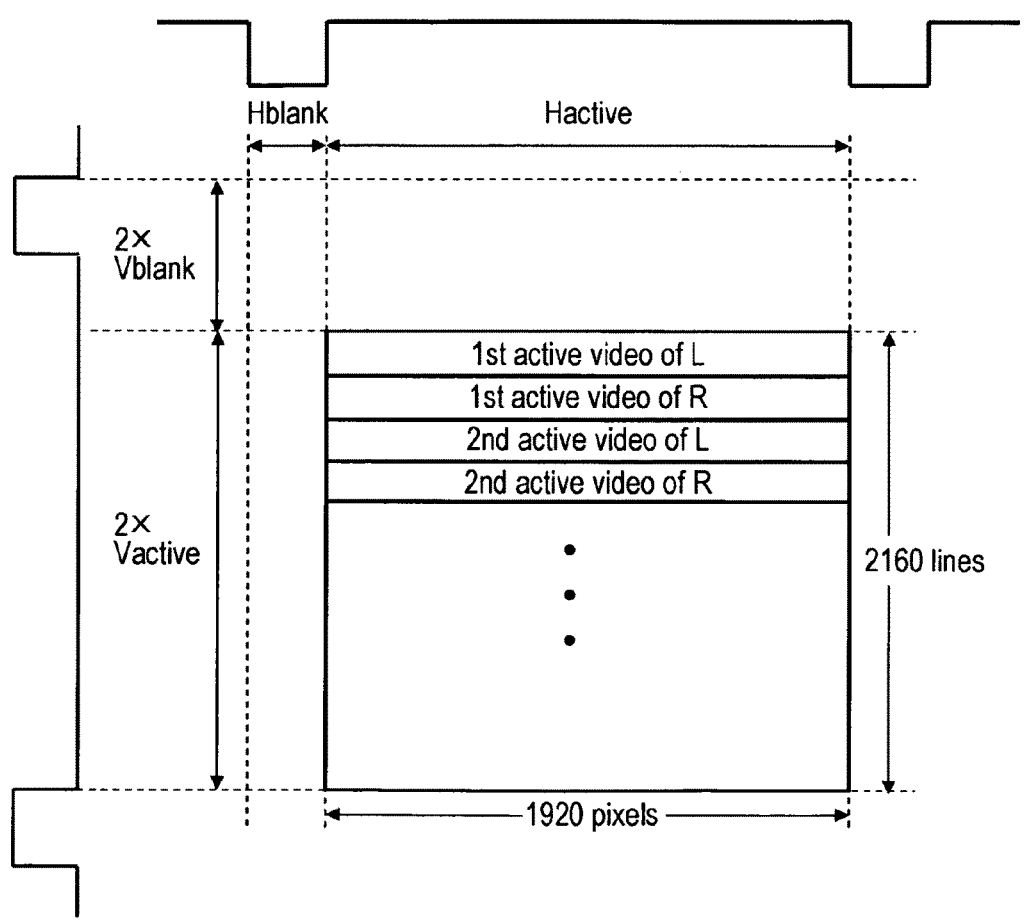
FIG. 94 is a diagram illustrating a 3D video format according to a line alternative method that is one of TMDS transmission data structures of stereoscopic image data.

FIG. 94 illustrates the 3D video format (3D Video Format) of the line alternative (Line alternative) method that is one of the TMDS transmission data structures of stereoscopic image data. This 3D video format is a format for transmitting the left eye (L) and right eye (R) image data of the progressive method as stereoscopic image data. With this 3D video format, transmission of image data of a 1920×1080 p pixel format is performed as the left eye (L) and right eye (R) image data.

According to this 3D video format, transmission data with a video field section including a horizontal blanking period (Hblank), a vertical blanking period (2×Vblank), and an active video section (Hactive×2V active), delimited by a vertical synchronizing signal, as an unit is generated. With this 3D video format, one line worth of left eye image data, and one line worth of right eye image data are alternately disposed in an active video section.

Figure 95:
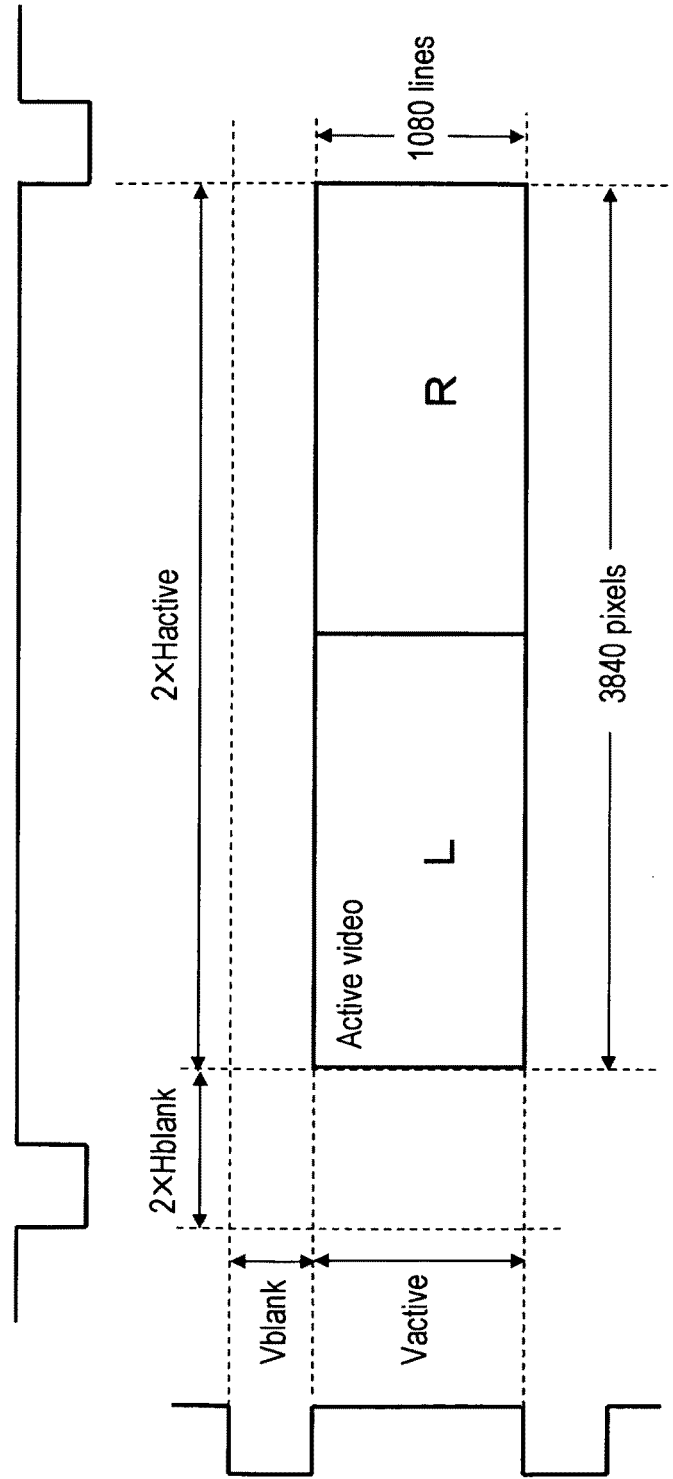
FIG. 95 is a diagram illustrating a 3D video format according to a side-by-side (Full) method that is one of TMDS transmission data structures of stereoscopic image data.

FIG. 95 illustrates the 3D video format (3D Video Format) of the side by side (side-bay-side) (Full) method that is one of the TMDS transmission data structures of stereoscopic image data. This 3D video format is a format for transmitting the left eye (L) and right eye (R) image data of the progressive method as stereoscopic image data. With this 3D video format, transmission of image data of a 1920×1080 p pixel format is performed as the left eye (L) and right eye (R) image data.

According to this 3D video format, transmission data with a video field section including a horizontal blanking period (2×Hblank), a vertical blanking period (Vblank), and an active video section (2Hactive×Vactive), delimited by a vertical synchronizing signal, as an unit is generated. With this 3D video format, left eye image data (L) is disposed in the first half of the horizontal direction, and right eye image data (R) is disposed is in the second half of the horizontal direction, during an active video section.

Note that, while detailed description will be omitted, with the HDMI1.4, in addition to the above 3D video formats illustrated in FIG. 93 through FIG. 95, the 3D video formats serving as the TMDS transmission data structures of stereoscopic image data is defined. For example, there are provided the frame packing (Frame packing for interlaced format)

method, field alternative (Field alternative) method, side by side (side-bay-side) (Half) method, and so forth.

As described above, with the stereoscopic image display system 10 illustrated in FIG. 1, based on the disparity information of the other as to one of a left eye image and a right eye image, disparity is added to the same superposition information (closed caption information, subtitle information, graphics information, text information, etc.) to be superimposed on the left eye image and the right eye image. Therefore, superposition information subjected to disparity adjustment according to perspective of each object within the image can be employed as the same superposition information to be superimposed on the left eye image and the right eye image, and with display of the superposition information, consistency of the perspective between objects within the image can be maintained.

2. Modification

Note that with the above embodiment, in order to associate one component element ID with multiple disparity vectors, the information of "number_of_multiple_link" is disposed within the DHI (FIG. 54, FIG. 55). According to this "number_of_multiple_link", the number of disparity vectors to be associated with a component element ID is specified beforehand. However, for example, a method can be conceived wherein one component element ID is associated with multiple disparity vectors by adding a connection flag (Connect_flag) to a partition position ID (Partition_position_id).

Figure 96:
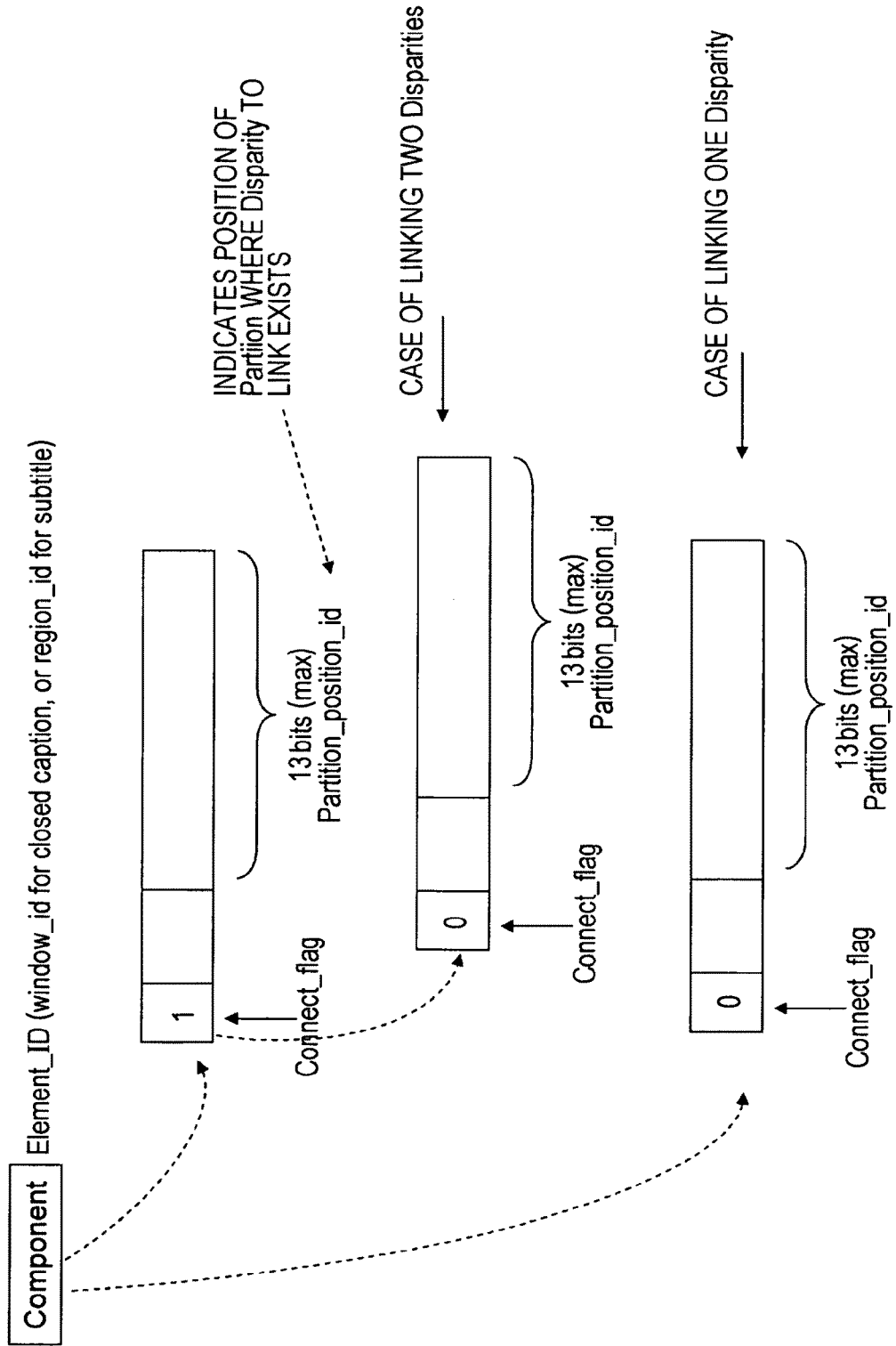
FIG. 96 is a diagram for describing another method for associating a component element ID with a disparity vector.

FIG. 96 illustrates an example of a method for associating a component element ID with a disparity vector. Here, the component element ID of closed caption information is a window ID (window_id). Also, the component element ID of subtitle information is region ID (region_id). In order to associate an component element ID with a disparity vector, the component element ID is associated with, for example, a partition position ID of the maximum 13 bits indicating a screen region to which the disparity vector belongs.

This partition position ID is added with a 1-bit connection flag (Connect_flag). In the event of associating one component element ID with one disparity vector, as illustrated in FIG. 96, this component element ID is associated with one partition position ID. In this case, the connection flag added to this one partition position ID is set to "0", which indicates that there is no associated partition position ID after this.

Also, in the event of associating one component element ID with two disparity vectors, as illustrated in FIG. 96, this component element ID is associated with two partition position IDs. In this case, the connection flag added to the first partition position ID is set to "1", which indicates that there is further an associated partition position ID after this. Subsequently, the connection flag added to the second partition position ID is set to "0", which indicates that there is no associated partition position ID after this.

Note that, though not illustrated in FIG. 96, in the event of associating one component element ID with three or more disparity vectors, this is the same as with the case of associating one component element ID with two disparity vectors. The connection flags added to up to the last partition position ID but one are set to "1", and only the connection flag added to the last partition position ID is set to "0".

Figure 97:
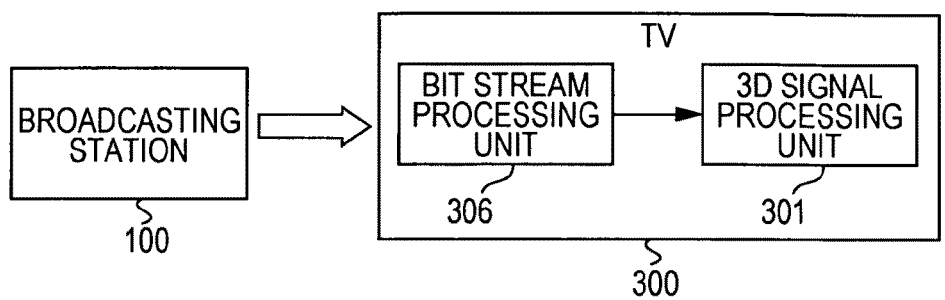
FIG. 97 is a diagram illustrating another configuration example of the stereoscopic image display system.
Figure 98:
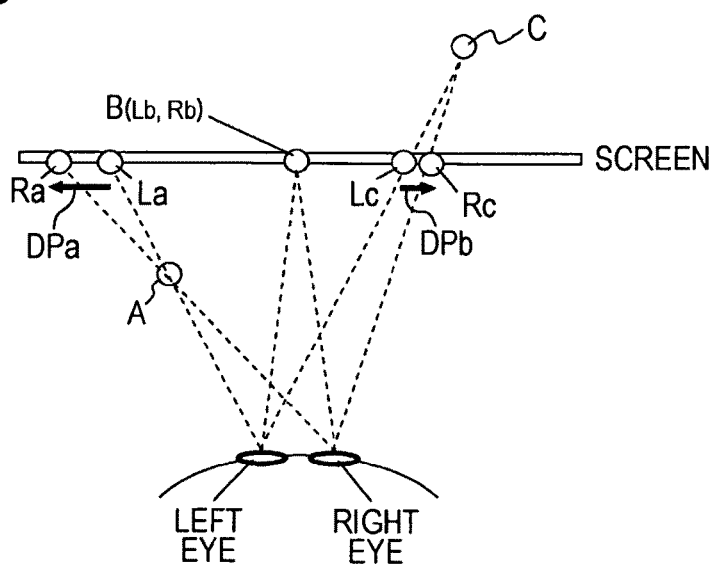
FIG. 98 is a diagram illustrating relationship between the display positions of the left and right images of an object on a screen, and the playback position of the stereoscopic image thereof with stereoscopic image display taking advantage of binocular disparity.

Also, with the above embodiment, an example has been illustrated wherein the stereoscopic image display system 10 is configured of the broadcasting station 100, set top box 200, and television receiver 300. However, the television receiver 300 includes, as illustrated in FIG. 86, the bit stream processing unit 201 having the same function as with the bit stream processing unit 201 within the set top box 200. Accordingly, as illustrated in FIG. 97, a stereoscopic image display system 10A configured of the broadcasting station 100 and television receiver 300 can also be conceived.

Also, with the above embodiment, an example has been illustrated wherein a data stream (bit stream data) including stereoscopic image data is broadcasted from the broadcasting station. However, it goes without saying that the present invention may also be applied to a system having an arrangement wherein this data stream is distributed to a reception terminal by taking advantage of a network such as the Internet or the like.

Also, with the above embodiment, an example has been illustrated wherein the set top box 200 and the television receiver 300 are connected by the HDMI digital interface. However, it goes without saying that the present invention may also be applied to a case where these are connected by a digital interface similar to the HDMI digital interface (including wireless other than cable).

INDUSTRIAL APPLICABILITY

The present invention may be applied to a stereoscopic image display system for displaying an image by superimposing superposition information, such as closed caption information, subtitle information, graphics information, text information, or the like, on the image, or the like.

REFERENCE SIGNS LIST

10, 10A stereoscopic image display system
100 broadcasting station
110, 110A through 110E transmission data generating unit
111L, 111R camera
112 video framing unit
113 video encoder
113a stream formatter
114 disparity vector detecting unit
115 disparity vector encoder
116 microphone
117 audio encoder
118 subtitle and graphics generating unit
119 subtitle and graphics encoder
119a stream formatter
120 text generating unit
121 text encoder
122 multiplexer
124 subtitle and graphics processing unit
125 text processing unit
130 data extracting unit
130a data recording medium
131 disparity information set creating unit
200, 200A set top box
201, 201A, 201B, 201C, 201D bit stream processing unit
202 HDMI terminal
203 antenna terminal
204 digital tuner
205 video signal processing circuit
205A video and graphics processing unit
206 HDMI transmission unit
207 audio signal processing circuit
211 CPU
212 flash ROM
213 DRAM
214 internal bus
215 remote control reception unit
216 remote control transmitter 220, 220A demultiplexer
221 video decoder
222 subtitle and graphics decoder
222A
223 text decoder
224 audio decoder
225 subtitle decoder
disparity vector decoder
226 stereoscopic image data subtitle and graphics generating unit
226A stereoscopic subtitle generating unit
227 stereoscopic image text generating unit
228 video superimposing unit
229 multi-channel speaker control unit
231 disparity vector extracting unit
232 disparity vector extracting unit
300 television receiver
301 3D signal processing unit
302 HDMI terminal
303 HDMI reception unit
304 antenna terminal
305 digital tuner
306 bit stream processing unit
307 video and graphics processing circuit
308 panel driving circuit
309 display panel
310 audio signal processing circuit
311 audio amplifier circuit
312 speaker
321 CPU
322 flash ROM
323 DRAM
324 internal bus
325 remote control reception unit
326 remote control transmitter
400 HDMI cable

The invention claimed is:

1. A stereoscopic image data transmission device comprising:
a disparity information creating unit configured to create predetermined sets of disparity information sets; and
a data transmission unit configured to transmit said predetermined sets of disparity information sets created at said disparity information creating unit along with stereoscopic image data including left eye image data and right eye image data;
wherein each set of said disparity information sets includes disparity information belonging to a predetermined number of screen regions of an image for providing disparity to superposition information to be superimposed on the image made up of said left eye image data and said right eye image data; and
wherein each set of said disparity information sets is added with identification information indicating a type of said superposition information regarding which disparity information included in this disparity information set should be used,
in which the disparity information indicates to shift the superposition position in a direction among a plurality of directions and by an amount among a plurality of amounts.

2. The stereoscopic image data transmission device according to claim 1, wherein said disparity information sets are added with table information indicating correspondence relationship between one of the predetermined number of screen regions regarding which type of superposition information indicated by said identification information should be displayed and disparity information to be used for providing disparity to said superposition information to be displayed on this region.

3. The stereoscopic image data transmission device according to claim 1, wherein said disparity information sets are added with information indicating at least one of the predetermined number of screen regions to which said predetermined number of sets of disparity information belongs.

4. The stereoscopic image data transmission device according to claim 3, wherein information indicating said screen region is information indicating a number of screen partitions and each set of disparity information sets corresponds to at least one of the number of screen partitions.

5. The stereoscopic image data transmission device according to claim 3, wherein information indicating said screen region is information indicating a size of the predetermined number of screen regions.

6. The stereoscopic image data transmission device according to claim 1, wherein each set of said disparity information sets created at said disparity information creating unit is predetermined unit-based disparity information set of said image data; and
wherein said data transmission unit sections said image data for each certain period of time, and transmits said predetermined unit-based disparity information set corresponding to image data for each certain period of time prior to transmission of this image data for each certain period of time; and
wherein said predetermined unit-based disparity information set corresponding to the image data for each certain period of time is added with time information indicating timing for using this disparity information set.

7. The stereoscopic image data transmission device according to claim 1, wherein said data transmission unit transmits each set of said disparity information sets created at said disparity information set creating unit by including this in a user data region within a header portion of the data stream of said stereoscopic image data.

8. The stereoscopic image data transmission device according to claim 1, wherein the disparity information belonging to a predetermined number of screen regions is a disparity vector.

9. The stereoscopic image data transmission device according to claim 1, wherein the identification information is a disparity sequence ID.

10. The stereoscopic image data transmission device according to claim 9, wherein the disparity sequence ID indicates whether the disparity information set is a general-purpose disparity information set or a disparity information set for a particular service application.

11. A stereoscopic image data transmission method comprising:
a disparity information creating step arranged to create predetermined sets of disparity information sets; and
a data transmission step arranged to transmit said predetermined sets of disparity information sets created in said disparity information creating step along with stereoscopic image data including left eye image data and right eye image data;
wherein each set of said disparity information sets includes disparity information belonging to a predetermined number of screen regions of an image for providing disparity to superposition information to be superimposed on the image made up of said left eye image data and said right eye image data; and
wherein each set of said disparity information sets is added with identification information indicating a type of said superposition information regarding which disparity information included in this disparity information set should be used, in which the disparity information indicates to shift the superposition position in a direction among a plurality of directions and by an amount among a plurality of amounts.

12. A stereoscopic image data reception device comprising:

a data reception unit configured to receive predetermined sets of disparity information sets, which includes stereoscopic image data including left eye information data and right eye information data, and disparity information belonging to a predetermined number of screen regions of an image for providing disparity to superposition information to be superimposed on the image made up of said left eye image data and said right eye image data, and also to which identification information indicating a type of said superposition information that uses said disparity information is added; and an image data processing unit configured to provide disparity to superposition information to be superimposed on an image made up of said left eye image data and said right eye image data included in said stereoscopic image data received at said data reception unit using disparity information included in a disparity information set corresponding to the type of this superposition information out of said predetermined sets of disparity information sets received at said data reception unit based on said identification information to obtain the data of a left eye image on which said superposition information is superimposed, and the data of a right eye image on which said superposition information is superimposed, in which the disparity information indicates to shift the superposition position in a direction among a plurality of directions and by an amount among a plurality of amounts.

13. The stereoscopic image data reception device according to claim 12, wherein said disparity information sets are added with table information indicating correspondence relationship between one of the predetermined screen regions regarding which type of superposition information indicated by said identification information should be displayed and disparity information to be used for providing disparity to said superposition information to be displayed on this region.

14. The stereoscopic image data reception device according to claim 12, wherein said disparity information sets are added with information indicating at least one of the predetermined number of screen regions to which said predetermined number of sets of disparity information belongs.

15. The stereoscopic image data transmission device according to claim 14, wherein information indicating said screen region is information indicating a number of screen partitions and each set of disparity information sets corresponds to at least one of the number of screen partitions.

16. The stereoscopic image data transmission device according to claim 14, wherein information indicating said screen region is information indicating a size of the predetermined number of screen regions.

17. The stereoscopic image data reception device according to claim 9, wherein said disparity information sets to be received at said data reception unit are predetermined unit-based disparity information sets of said image data;

and wherein said data reception unit sections said image data for each certain period of time, and receives said predetermined unit-based disparity information set corresponding to image data for each certain period of time prior to transmission of this image data for each certain period of time; and wherein said predetermined unit-based disparity information set corresponding to the image of each certain period of time is added with time information indicating timing for using this disparity information set; and wherein said data processing unit provides disparity according to disparity information included in the corresponding disparity information set to said superposition information for each predetermined unit of said image data within a superposition period of said superposition information.

18. The stereoscopic image data reception device according to claim 12, wherein the identification information is a disparity sequence ID.

19. The stereoscopic image data reception device according to claim 18, wherein the disparity sequence ID indicates whether the disparity information set is a general-purpose disparity information set or a disparity information set for a particular service application.

20. A stereoscopic image data reception method comprising:

a data reception step arranged to receive predetermined sets of disparity information sets, which includes stereoscopic image data including left eye information data and right eye information data, and disparity information belonging to a predetermined number of screen regions of an image for providing disparity to superposition information to be superimposed on the image made up of said left eye image data and said right eye image data, and also to which identification information indicating a type of said superposition information that uses said disparity information is added; and an image data processing step arranged to provide disparity to superposition information to be superimposed on an image made up of said left eye image data and said right eye image data included in said stereoscopic image data received in said data reception step using disparity information included in a disparity information set corresponding to the type of this superposition information out of said predetermined sets of disparity information sets received in said data reception step based on said identification information to obtain the data of a left eye image on which said superposition information is superimposed, and the data of a right eye image on which said superposition information is superimposed, in which the disparity information indicates to shift the superposition position in a direction among a plurality of directions and by an amount among a plurality of amounts.

\* \* \* \* \*